(12) United States Patent
Siskind et al.

(10) Patent No.: US 8,739,137 B2
(45) Date of Patent: May 27, 2014

(54) AUTOMATIC DERIVATIVE METHOD FOR A COMPUTER PROGRAMMING LANGUAGE

(75) Inventors: Jeffrey Mark Siskind, West Lafayette, IN (US); Barak Avrum Pearlmutter, Dublin (IL)

(73) Assignee: Purdue Research Foundation, West Lafayette, IN (US)

( * ) Notice: Subject to any disclaimer, the term of this patent is extended or adjusted under 35 U.S.C. 154(b) by 1583 days.

(21) Appl. No.: 11/875,691

(22) Filed: Oct. 19, 2007

(65) Prior Publication Data
US 2009/0077543 A1 Mar. 19, 2009

Related U.S. Application Data

(60) Provisional application No. 60/862,103, filed on Oct. 19, 2006.

(51) Int. Cl.
*G06F 9/45* (2006.01)
(52) U.S. Cl.
USPC ............................ 717/136; 717/137; 717/140
(58) Field of Classification Search
USPC .................................................. 717/136–140
See application file for complete search history.

(56) References Cited

U.S. PATENT DOCUMENTS

| | | | |
|---|---|---|---|
| 3,646,523 A * | 2/1972 | Berkling | 717/143 |
| 6,223,341 B1 | 4/2001 | Bittner et al. | |
| 6,397,380 B1 | 5/2002 | Bittner et al. | |
| 6,483,514 B1 | 11/2002 | Duff | |
| 6,718,291 B1 | 4/2004 | Shapiro et al. | |
| 6,895,574 B2 | 5/2005 | Walster | |
| 6,915,320 B2 | 7/2005 | Walster et al. | |
| 6,920,472 B2 | 7/2005 | Walster et al. | |
| 6,990,230 B2 | 1/2006 | Piponi | |
| 6,999,096 B2 | 2/2006 | Sato | |
| 8,281,299 B2 * | 10/2012 | Siskind et al. | 717/168 |
| 2003/0033339 A1 | 2/2003 | Walster et al. | |
| 2003/0149959 A1 * | 8/2003 | Lamping | 717/116 |
| 2004/0015830 A1 * | 1/2004 | Reps | 717/104 |
| 2004/0133885 A1 | 7/2004 | Giering et al. | |
| 2004/0236806 A1 | 11/2004 | Turner | |
| 2006/0111881 A1 | 5/2006 | Jackson | |

(Continued)

FOREIGN PATENT DOCUMENTS

| | | | | |
|---|---|---|---|---|
| WO | WO 98/40828 | | 9/1998 | G06F 17/13 |
| WO | WO 02/061662 A1 | | 8/2002 | G06F 19/00 |
| WO | WO 2004/047008 A1 | | 6/2004 | G06K 9/00 |

OTHER PUBLICATIONS

Griewank et al. "Algorithm 755: ADOL-C: a package for the automatic differentiation of algorithms written in C/C++", ACM Transactions on Mathematical Software (TOMS) TOMS Homepage archive vol. 22 Issue 2, Jun. 1996 pp. 131-167.*

(Continued)

*Primary Examiner* — Don Wong
*Assistant Examiner* — Marina Lee
(74) *Attorney, Agent, or Firm* — Brinks Gilson & Lione

(57) ABSTRACT

The disclosed system provides a transformation-based implementation of forward-mode and reverse-mode automatic differentiation as a built-in, first-class function in a functional programming language. Each of these constructs imposes only a small constant factor of the computational burden (time) of the function itself, and the forward construct has the same properties in terms of space. The functions can be applied to any function, including those involving derivatives and nested closures.

24 Claims, 10 Drawing Sheets

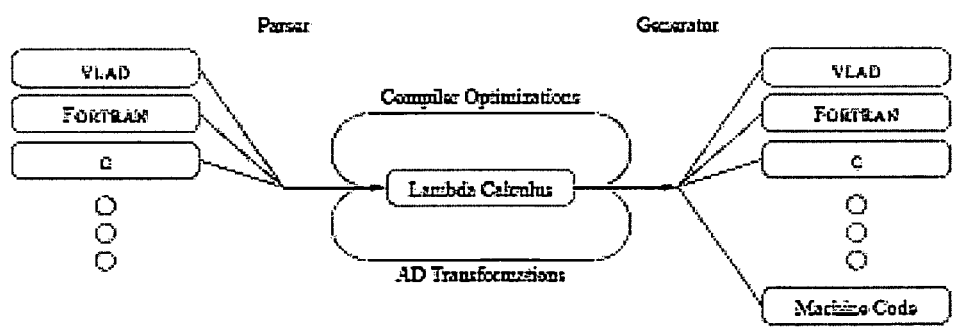

(56) References Cited

U.S. PATENT DOCUMENTS

| | | | |
|---|---|---|---|
| 2007/0168907 A1* | 7/2007 | Iborra et al. | 717/100 |
| 2008/0163188 A1* | 7/2008 | Siskind et al. | 717/168 |
| 2009/0077543 A1* | 3/2009 | Siskind et al. | 717/136 |

OTHER PUBLICATIONS

Minamide et al. "Typed Closure Conversion", Jul. 1995, retried from <http://www.cs.cmu.edu ~rwh/papers/closures/tr.pdf> total pp. 42.*

Launchbury et al. "State in Haskell", citeseerx, 1996, total pp. 51.*

Griewank et al., "ADOL-C A Package for Automatic Differentiation of Algorithms Written in C/C++", retrieved from <http://www.mcs.utulsa.edu/~class_diaz/cs8243/adiff.html>(Feb. 14, 2000), tiotal pp. 5.*

Bischof et al., "ADIC: An Extensible Automatic Differentiation Tool for ANSI-C", May 1997, retrieved from <http://softlib.rice.edu/pub/CRPC-TRs/reports/CRPC-TR97676-S.pdf>, total pp. 40.*

Naumann et al., "Adjoint Code by Source Tansformation with Open AD/F", May 2006, retrieved from <http://ftp8.de.freebsd.org/pub/publications/rwth/informatik/2006/2006-05.pdf> total pp. 19.*

Bichof et al., "Adifor 2.0: Automatic Differentiation of Fortran 77 Programs", IEEE 1996, retrieved from <http://ieeexplore.ieee.org/stamp/stamp.jsp?tp=&arnumber=537089> total pp. 15.*

Bischo et al. "Hierarchical Approaches to Automatic Differentiation", Apr. 1996, retrieved from <http://softlib.rice.edu/pub/CRPC-TRs/reports/CRPC-TR96647.pdf>, total pp. 14.*

Jerzy Karczmarczuk, "Functional Coding of Differential Forms", 1999, retrieved from <citeseerx.ist.psu.edu/viewdoc/download?doi=10.1.1.31...rep> total pp. 12.*

Hovland et al., "An XML-Based Platform for Semantic Transformation of Numerical Programs", Software Engineering and Applications, 2002—Citeseer. total pp. 14.*

Siskind et al. "Using Polyvariant Union-Free Flow Analysis to Compile a Higher-Order Functional-Programming Language with a First-Class Derivative Operator to Efficient Fortran-like Code", Jan. 5, 2008, retrieved from <http://docs.lib.purdue.edu/cgi/viewcontent.cgi?article=1368&context=ecetr>, total pp. 12.*

J.M. Siskind, B.A. Pearlmutter, "Perturbation Confusion and Referential Transparency: Correct Functional Implementation of Forward Mode AD," pp. 1-9, Draft Proceedings of the 17$^{th}$ International Workshop on Implementation and Application of Functional Languages (IFL2005), Dublin, Ireland.

J.M. Siskind, B.A. Pearlmutter, "Nesting Forward-Mode AD in a Functional Framework," Jul. 24, 2007; pp. 1-18; Kluwer Academic Publishers, The Netherlands.

B.A. Pearlmutter, J.M. Siskind, "Reverse-Mode AD in a Functional Framework: Lambda the Ultimate Backpropagator," Mar. 2008, pp. 1-36, ACM Transactions on Programming Languages and Systems, vol. 30, No. 2, Article 7.

B.A. Pearlmutter, J.M. Siskind, "Lazy Multivariate Higher-Order Forward-Mode AD," Jan. 17-19, 2007, pp. 155-160, POPL 2007, Nice, France.

B.A. Pearlmutter, J.M. Siskind, "AD of Functional Programs: Lambda, the Ultimate Calculus," Jan. 12-14, 2005, pp. 1-15., Submitted to the 32$^{nd}$ annual ACM SIGPLAN-SIGACT Symposium on Principles of Programming Languages; POPL 2005, Long Beach California, USA.

J.M. Siskind, B.A. Pearlmutter, "MAP-Closure : Closure Conversion :: CALL/CC : CPS Conversion, CPS conversion + closure conversion = store conversion and call/cc + map-closure = set !," dated Jul. 12, 2006, pp. 1-6, In preparation for submission to POPL 2007 Nice, France.

J.M. Siskind, B.A. Pearlmutter, "First-Class Nonstandard Interpretations by Opening Closures," Jan. 17-19, 2007, pp. 1-6, POPL 2007, Nice, France.

Andreev, V., "Non-standard analysis, automatic differentiation, Haskell, and other stories," Dec. 4, 2006, pp. 1-4, Wordpress.com, downloaded Oct. 8, 2007, available at URL: http://vandreev.wordpress.com/2006/12/04/non-standard-analysis-and-autornatic-differentiation/.

Augustsson, L., "Overloading Haskell numbers, part 2, Forward Automatic Differentiation," Apr. 14, 2007, pp. 1-6, Blogspot.com, downloaded Oct. 8, 2007 from: http://augustss.blogspot.com/2007/04/overloading-haskell-numbers-part-2.html.

T.F. Coleman, A. Verma, "ADMIT-1: Automatic Differentiation and MATLAB Interface Toolbox," Mar. 2000, pp. 150-175, ACM Transactions on Mathematical Software, vol. 26, No. 1, Mar. 2000.

H. Nilsson, "Functional Automatic Differentiation with Dirac Impulses," ICFP '03, Aug. 25-27, 2003, pp. 1-12, Uppsala, Sweden, ACM.

* cited by examiner

```
(C c (quote v))         ⤳   (quote v)
(C c (name x))          ⤳   (name x)
(C c x)                 ⤳   (lookup (name x) c)
(C c (lambda (x) e))    ⤳   (cons (lambda (c₁ x)
                                     (let ((c₂ (cons (cons (name x) x) c₁)))
                                       (C c₂ e)))
                                   (list (cons (name x₁) (C c x₁)) ...))
                            where x₁ ... are free in (lambda (x) e)
(C c (e₁ e₂))           ⤳   (let ((x (C c e₁))) ((car x) (cdr x) (C c e₂)))
e₀                      ⤳   (let ((x₁ (cons (lambda (c x) (x₁ x)) '())) ...
                              (cons-procedure
                                (cons (lambda (c1 x1) (cons (lambda (c2 x2) (cons x1 x2)) '())) '()))
                              (map-closure
                                (cons (lambda (c (cons (cons f fc) (cons g gc)))
                                        (cons g (map (lambda (gn gv) (cons gn (f fc gn gv))) gc)))
                                      '()))
                              (pair? (cons (lambda (c x) (and (pair? x) (not (procedure? (car x)))))
                                           '()))
                              (procedure? (cons (lambda (c x) (and (pair? x) (procedure? (car x))))
                                                '())))
                              (let ((x (list (cons (name x₁) x₁) ...
                                             (cons (name cons-procedure) cons-procedure)
                                             (cons (name map-closure) map-closure)
                                             (cons (name pair?) pair?)
                                             (cons (name procedure?) procedure?))))
                                (C x e₀)))
                            where x₁ ... are free in e₀ except cons-procedure, map-closure, pair?, and procedure?. This
                            assumes that x₁ ... are bound to procedures that don't internally invoke procedural arguments.
```

Fig. 1

```
(C c (quote v))         ⤳   (c (quote v))
(C c (name x))          ⤳   (c (name x))
(C c x)                 ⤳   (c x)
(C c (lambda (x) e))    ⤳   (c (lambda (c₁ x) (C c₁ e)))
(C c (e₁ e₂))           ⤳   (C (lambda (x₁) (C (lambda (x₂) (x₁ c x₂)) e₁)) e₂)
e₀                      ⤳   (let ((x₁ (lambda (c x) (c (x₁ x)))) ...
                              (call/cc (lambda (c x1) (x1 c (lambda (c2 x2) (c x2)))))
                              (cons-procedure
                                (lambda (c1 x1) (c1 (lambda (c2 x2) (c2 (cons x1 x2))))))
                              (map-closure
                                (lambda (c (cons f g))
                                  (c (map-closure (lambda (x) (f (lambda (x) x) x)) g)))))
                              (C (lambda (x) x) e₀))
                            where x₁ ... are free in e₀ except call/cc, cons-procedure, and
                            map-closure. This assumes that x₁ ... are bound to procedures that don't in-
                            ternally invoke procedural arguments.
```

Fig. 2

```
(define (set-in n v c)
  (cond ((procedure? c)
         (map-closure (lambda (n1 v1) (if (name=? n n1) v (set-in n v v1))) c))
        ((pair? c) (cons (set-in n v (car c)) (set-in n v (cdr c))))
        (else c)))

(define (set n v)
  (call/cc (lambda (c) ((set-in n v c) #f))))

(define-syntax set! (syntax-rules () ((set! x e) (set (name x) e))))
```

Fig. 3

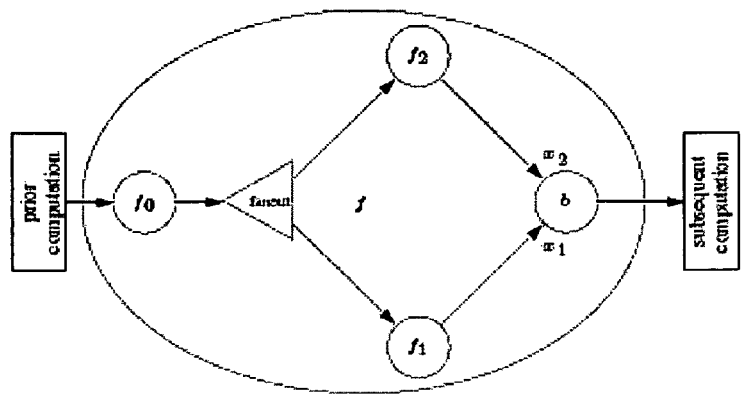

Fig. 4

```
(define (trace thunk)
  ((let wrap ((x thunk))
    (cond ((pair? x) (cons (wrap (car x)) (wrap (cdr x))))
          ((procedure? x)
           (lambda (arguments)
             (write (list +i procedure arguments))
             (newline)
             (let ((result ((map-closure (lambda (n x) (wrap x)) x) arguments)))
               (write (list -i procedure result))
               (newline)
               result)))
          (else x)))))

(define (sandbox allowed? raise-exception thunk)
  ((let wrap ((x thunk))
    (cond ((pair? x) (cons (wrap (car x)) (wrap (cdr x))))
          ((procedure? x)
           (lambda (arguments)
             (if (allowed? x arguments) ((map-closure (lambda (n x) (wrap x)) x) arguments) (raise-exception))))
          (else x)))))

(define (profile thunk)
  (let* ((table '())
         (result ((let wrap ((x thunk))
                    (cond ((pair? x) (cons (wrap (car x)) (wrap (cdr x))))
                          ((procedure? x)
                           (lambda (arguments)
                             (set! table (let increment ((table table))
                                           (cond ((null? table) (list (cons x 1)))
                                                 ((eq? (car (car table)) x)
                                                  (cons (cons (car (car table)) (+ (cdr (car table)) 1)) (cdr table)))
                                                 (else (cons (car table) (increment (cdr table)))))))
                             ((map-closure (lambda (n x) (wrap x)) x) arguments)))
                          (else x))))))
    (write table)
    (newline)
    result))

(define (patch old new)
  (call/cc (lambda (c)
    ((let wrap ((x c))
      (cond ((eq? x old) new)
            ((pair? x) (cons (wrap (car x)) (wrap (cdr x))))
            ((procedure? x) (map-closure (lambda (n x) (wrap x)) x))
            (else x)))
     #f))))

(define (room)
  (let ((pairs 0) (slots 0) (objects '()))
    (call/cc (lambda (c)
      ((let walk ((x c))
        (cond ((memq x objects) #f)
              (else (set! objects (cons x objects))
                    (cond ((pair? x) (set! pairs (+ pairs 1)) (walk (car x)) (walk (cdr x)))
                          ((procedure? x) (map-closure (lambda (n x) (set! slots (+ slots 1)) (walk x)) x))))))
       (list pairs slots))))))
```

Fig. 5

```
(define <_e <)

(define dual-number?
 (let ((pair? pair?))
  (lambda (p) (and (pair? p) (eq? (car p) 'dual-number)))))

(define (dual-number e x x-prime)
 (if (zero? x-prime) x (list 'dual-number e x x-prime)))

(define epsilon cadr)

(define (primal e p)
 (if (or (not (dual-number? p)) (<_e (epsilon p) e)) p (caddr p)))

(define (perturbation e p)
 (if (or (not (dual-number? p)) (<_e (epsilon p) e)) 0 (cadddr p)))

(define generate-epsilon (let ((e 0)) (lambda () (set! e (+ e 1)) e)))
```

Fig. 6

```
(define pair?
 (let ((pair? pair?))
  (lambda (x) (and (pair? x) (not (dual-number? x))))))

(define + (lift-real*real->real + (lambda (x1 x2) 1) (lambda (x1 x2) 1)))

(define - (lift-real*real->real - (lambda (x1 x2) 1) (lambda (x1 x2) -1)))

(define *
 (lift-real*real->real * (lambda (x1 x2) x2) (lambda (x1 x2) x1)))

(define /
 (lift-real*real->real
  / (lambda (x1 x2) (/ 1 x2)) (lambda (x1 x2) (- 0 (/ x1 (* x2 x2))))))

(define sqrt (lift-real->real sqrt (lambda (x) (/ 1 (* 2 (sqrt x))))))

(define exp (lift-real->real exp (lambda (x) (exp x))))

(define log (lift-real->real log (lambda (x) (/ 1 x))))

(define sin (lift-real->real sin (lambda (x) (cos x))))

(define cos (lift-real->real cos (lambda (x) (- 0 (sin x)))))

(define atan (lift-real*real->real
              atan
              (lambda (x1 x2) (/ (- 0 x2) (+ (* x1 x1) (* x2 x2))))
              (lambda (x1 x2) (/ x1 (+ (* x1 x1) (* x2 x2))))))

(define = (lift-real^n->boolean =))

(define < (lift-real^n->boolean <))

(define > (lift-real^n->boolean >))

(define <= (lift-real^n->boolean <=))

(define >= (lift-real^n->boolean >=))

(define zero? (lift-real^n->boolean zero?))

(define positive? (lift-real^n->boolean positive?))

(define negative? (lift-real^n->boolean negative?))

(define real? (lift-real^n->boolean real?))
```

Fig. 12

```
(define (lift-real->real f df/dx)
  (letrec ((self (lambda (p)
                   (if (dual-number? p)
                       (let ((e (epsilon p)))
                         (dual-number
                           e
                           (self (primal e p))
                           (* (df/dx (primal e p)) (perturbation e p))))
                       (f p)))))
    self))

(define (lift-real*real->real f df/dx1 df/dx2)
  (letrec ((self
             (lambda (p1 p2)
               (if (or (dual-number? p1)
                       (dual-number? p2))
                   (let ((e (if (or (not (dual-number? p1))
                                    (and (dual-number? p2)
                                         (<_e (epsilon p1) (epsilon p2))))
                                (epsilon p2)
                                (epsilon p1))))
                     (dual-number
                       e
                       (self (primal e p1) (primal e p2))
                       (+ (* (df/dx1 (primal e p1) (primal e p2))
                             (perturbation e p1))
                          (* (df/dx2 (primal e p1) (primal e p2))
                             (perturbation e p2)))))
                   (f p1 p2)))))
    self))

(define (primal* p)
  (if (dual-number? p) (primal* (primal (epsilon p) p)) p))

(define (lift-real^n->boolean f) (lambda ps (apply f (map primal* ps))))
```

Fig. 7

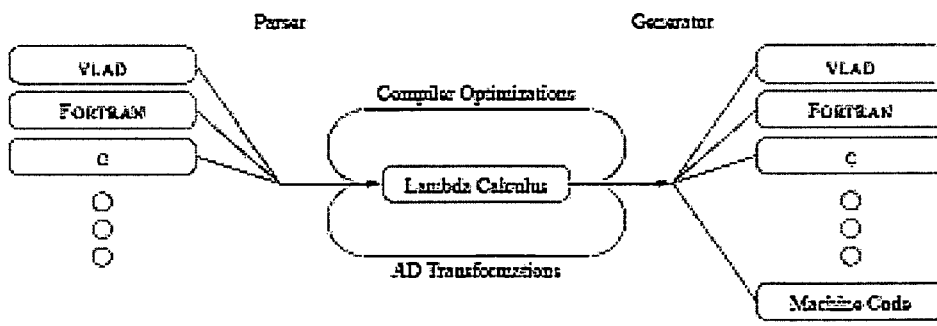

Fig. 8

```
(let ((start (list (real 1) (real 1)))
      (f (lambda (x1 y1 x2 y2) (- (+ (sqr x1) (sqr y1)) (+ (sqr x2) (sqr y2))))))
  (let* (((list x1* y1*)
          (multivariate-argmin
            (lambda ((list x1 y1)) (multivariate-max (lambda ((list x2 y2)) (f x1 y1 x2 y2)) start))
            start))
         ((list x2* y2*) (multivariate-argmax (lambda ((list x2 y2)) (f x1* y1* x2 y2)) start)))
    (list (list (write x1*) (write y1*)) (list (write x2*) (write y2*)))))
```

Fig. 10

```
(define (sqr x) (* x x))
(define (length l) (if (null? l) 0 (+ (length (cdr l)) 1)))
(define (list-ref l i) (if (zero? i) (car l) (list-ref (cdr l) (- i 1))))
(define ((map f) l) (if (null? l) '() (cons (f (car l)) ((map f) (cdr l)))))
(define ((map2 f) l1 l2) (if (null? l1) '() (cons (f (car l1) (car l2)) ((map2 f) (cdr l1) (cdr l2)))))
(define ((map-n f) n)
  (letrec ((loop (lambda (i) (if (= i n) '() (cons (f i) (loop (+ i 1))))))) (loop 0)))
(define ((reduce f i) l) (if (null? l) i (f (car l) ((reduce f i) (cdr l)))))
(define (v+ u v) ((map2 +) u v))
(define (v- u v) ((map2 -) u v))
(define (k*v k v) ((map (lambda (x) (* k x))) v))
(define (magnitude-squared x) ((reduce + (real 0)) ((map sqr) x)))
(define (magnitude x) (sqrt (magnitude-squared x)))
(define (distance-squared u v) (magnitude-squared (v- v u)))
(define (distance u v) (sqrt (distance-squared u v)))
(define (e i n) ((map-n (lambda (j) (if (= j i) (real 1) (real 0)))) n))
(define (j* x) (bundle x (zero x)))
(define ((derivative f) x) (tangent ((j* f) (bundle x (real 1)))))
(define ((gradient f) x)
  (let ((n (length x))) ((map-n (lambda (i) (tangent ((j* f) (bundle x (e i n)))))) n)))
(define (multivariate-argmin f x)
  (let ((g (gradient f)))
    (letrec ((loop (lambda (x fx gx eta i)
                     (cond ((<= (magnitude gx) (real 1e-5)) x)
                           ((= i (real 10)) (loop x fx gx (* (real 2) eta) (real 0)))
                           (else (let ((x-prime (v- x (k*v eta gx))))
                                   (if (<= (distance x x-prime) (real 1e-5))
                                       x
                                       (let ((fx-prime (f x-prime)))
                                         (if (< fx-prime fx)
                                             (loop x-prime fx-prime (g x-prime) eta (+ i 1))
                                             (loop x fx gx (/ eta (real 2)) (real 0)))))))))))
      (loop x (f x) (g x) (real 1e-5) (real 0)))))
(define (multivariate-argmax f x) (multivariate-argmin (lambda (x) (- (real 0) (f x))) x))
(define (multivariate-min f x) (f (multivariate-argmin f x)))
(define (multivariate-max f x) (f (multivariate-argmax f x)))
```

Fig. 9

```
(define (naive-euler w)
  (let* ((charges (list (list (real 10) (- (real 10) w)) (list (real 10) (real 0))))
         (x-initial (list (real 0) (real 8)))
         (xdot-initial (list (real 0.75) (real 0)))
         (delta-t (real 1e-1))
         (p (lambda (x) ((reduce + (real 0)) ((map (lambda (c) (/ (real 1) (distance x c)))) charges)))))
    (letrec ((loop (lambda (x xdot)
                     (let* ((xddot (k*v (real -1) ((gradient p) x)))
                            (x-new (v+ x (k*v delta-t xdot))))
                       (if (positive? (list-ref x-new 1))
                           (loop x-new (v+ xdot (k*v delta-t xddot)))
                           (let* ((delta-t-f (/ (- (list-ref x-new 1)) (list-ref xdot 1)))
                                  (x-t-f (v+ x (k*v delta-t-f xdot))))
                             (sqr (list-ref x-t-f 0)))))))))
      (loop x-initial xdot-initial))))

(let* ((w0 (real 0)) ((list w*) (multivariate-argmin (lambda ((list w)) (naive-euler w)) (list w0))))
  (write w*))
```

Fig. 11

```
(define (<_e e1 e2) #t)

(define (some p l)
  (and (not (null? l)) (or (p (car l)) (some p (cdr l)))))

(define (find-if p l)
  (let loop ((l l))
    (cond ((null? l) #f)
          ((p (car l)) (car l))
          (else (loop (cdr l))))))

(define (remove-if p l)
  (let loop ((l l) (c '()))
    (cond ((null? l) (reverse c))
          ((p (car l)) (loop (cdr l) c))
          (else (loop (cdr l) (cons (car l) c))))))

(define (removeq x l)
  (let loop ((l l) (c '()))
    (cond ((null? l) (reverse c))
          ((eq? x (car l)) (loop (cdr l) c))
          (else (loop (cdr l) (cons (car l) c))))))

(define terms
  (let ((pair? pair?))
    (lambda (p)
      (if (and (pair? p) (eq? (car p) 'dual-number))
          (cadr p)
          (list (cons '() p))))))

(define (terms->dual-number terms)
  (cond ((null? terms) 0)
        ((and (null? (cdr terms)) (null? (car (car terms))))
         (cdr (car terms)))
        (else (list 'dual-number terms))))

(define (dual-number? p)
  (some (lambda (term) (not (null? (car term)))) (terms p)))

(define (dual-number e x x-prime)
  (terms->dual-number
    (append (terms x)
            (map (lambda (term) (cons (cons e (car term)) (cdr term)))
                 (terms x-prime)))))

(define (epsilon p)
  (car (car (find-if (lambda (term) (not (null? (car term)))) (terms p)))))

(define (primal e p)
  (terms->dual-number
    (remove-if (lambda (term) (memq e (car term))) (terms p))))

(define (perturbation e p)
  (terms->dual-number
    (map (lambda (term) (cons (removeq e (car term)) (cdr term)))
         (remove-if (lambda (term) (not (memq e (car term)))) (terms p)))))

(define (generate-epsilon) (cons #f #f))
```

Fig. 13

```scheme
(define (derivative f)
 (lambda (x)
  (let-struct bundle (primal tangent)
   (define (dual-number x x-prime)
    (if (zero? x-prime) x (make-bundle x x-prime)))

(define (primal p) (if (bundle? p) (bundle-primal p) p))

(define (perturbation p) (if (bundle? p) (bundle-tangent p) 0))

(define (raise-alpha->alpha f df/dx)
    (let ((* *))
     (lambda (p)
      (dual-number
       (f (primal p)) (* (df/dx (primal p)) (perturbation p))))))

(define (raise-alpha*alpha->alpha f df/dx1 df/dx2)
    (let ((+ +) (* *))
     (lambda (p1 p2)
      (dual-number
       (f (primal p1) (primal p2))
       (+ (* (df/dx1 (primal p1) (primal p2)) (perturbation p1))
          (* (df/dx2 (primal p1) (primal p2)) (perturbation p2)))))))

(define (raise-alpha^n->boolean f)
    (lambda ps (apply f (map primal ps))))

(fluid-let ((+ (raise-alpha*alpha->alpha
                    + (lambda (x1 x2) 1) (lambda (x1 x2) 1)))
               (- (raise-alpha*alpha->alpha
                    - (lambda (x1 x2) 1) (lambda (x1 x2) -1)))
               (* (raise-alpha*alpha->alpha
                    * (lambda (x1 x2) x2) (lambda (x1 x2) x1)))
               (/ (let ((- -) (* *) (/ /))
                    (raise-alpha*alpha->alpha
                     /
                     (lambda (x1 x2) (/ 1 x2))
                     (lambda (x1 x2) (- 0 (/ x1 (* x2 x2)))))))
               (sqrt (let ((* *) (/ /) (sqrt sqrt))
                      (raise-alpha->alpha
                       sqrt (lambda (x) (/ 1 (* 2 (sqrt x)))))))
               (exp (raise-alpha->alpha exp exp))
               (log (let ((/ /))
                     (raise-alpha->alpha log (lambda (x) (/ 1 x)))))
               (sin (raise-alpha->alpha sin cos))
               (cos (let ((- -) (sin sin))
                     (raise-alpha->alpha cos (lambda (x) (- 0 (sin x))))))
               (atan (let ((+ +) (- -) (* *) (/ /))
                      (raise-alpha*alpha->alpha
                       atan
                       (lambda (x1 x2)
                        (/ (- 0 x2) (+ (* x1 x1) (* x2 x2))))
                       (lambda (x1 x2) (/ x1 (+ (* x1 x1) (* x2 x2)))))))
               (= (raise-alpha^n->boolean =))
               (< (raise-alpha^n->boolean <))
               (> (raise-alpha^n->boolean >))
               (<= (raise-alpha^n->boolean <=))
               (>= (raise-alpha^n->boolean >=))
               (zero? (raise-alpha^n->boolean zero?))
               (positive? (raise-alpha^n->boolean positive?))
               (negative? (raise-alpha^n->boolean negative?))
               (real? (raise-alpha^n->boolean real?)))
    (perturbation (f (dual-number x 1)))))))
```

Fig. 14

```
(define first car)

(define rest cdr)

(define (map-n f n)
  (let loop ((i 0)) (if (= i n) '() (cons (f i) (loop (+ i 1))))))

(define (reduce f l i)
  (if (null? l) i (f (first l) (reduce f (rest l) i))))

(define (sqr x) (* x x))

(define (v+ u v) (map + u v))

(define (v- u v) (map - u v))

(define (k*v k v) (map (lambda (x) (* k x)) v))

(define (dot u v) (reduce + (map * u v) 0))

(define (distance u v) (let ((d (v- v u))) (sqrt (dot d d))))

(define (replace-ith x i xi)
  (if (zero? i)
      (cons xi (rest x))
      (cons (first x) (replace-ith (rest x) (- i 1) xi))))

(define (gradient f)
  (lambda (x)
    (map-n
      (lambda (i)
        ((derivative (lambda (xi) (f (replace-ith x i xi)))) (list-ref x i)))
      (length x))))

(define x-initial '(0 8))
(define xdot-initial '(0.75 0))
(define v0 0)
(define error-tolerance 1e-1)
(define delta-t 1e-1)

(define (naive-euler w)
  (let ((charges (list (list 10 (- 10 w)) (list 10 0))))
    (define (p x)
      (reduce + (map (lambda (c) (/ 1 (distance x c))) charges) 0))
    (let loop ((x x-initial) (xdot xdot-initial))
      (let* ((xddot (k*v -1 ((gradient p) x)))
             (x-new (v+ x (k*v delta-t xdot))))
        (if (positive? (list-ref x-new 1))
            (loop x-new (v+ xdot (k*v delta-t xddot)))
            (let* ((delta-t-f (/ (- (list-ref x-new 1) (list-ref x 1))
                                 (list-ref xdot 1)))
                   (x-t-f (v+ x (k*v delta-t-f xdot))))
              (sqr (list-ref x-t-f 0))))))))

(define (argmin-using-textbook-newtons-method f x)
  (let loop ((x x) (i 0))
    (let ((df-dx ((derivative f) x)))
      (if (< (abs df-dx) error-tolerance)
          x
          (loop (- x (/ df-dx ((derivative (derivative f)) x))) (+ i 1))))))

(define (particle) (argmin-using-textbook-newtons-method naive-euler v0))
```

Fig. 15

```
(define (c e i p)
  (cond ;; Equation (24)
    ((not (linear-term? p)) (/ p (+ i 1)))
    ;; Equation (25)
    ((=_e (epsilon p) e) (linear-term (epsilon p) (c e i (r (epsilon p) p)) (c e (+ i 1) (q (epsilon p) p))))
    ;; Equation (26)
    (else (linear-term (epsilon p) (c e i (r (epsilon p) p)) (c e i (q (epsilon p) p))))))
(define (rename e1 e2 p)
  (cond ;; Equation (27)
    ((=_e e1 e2) p)
    ;; Equation (28)
    ((not (linear-term? p)) p)
    ;; Equation (29)
    ((<_e (epsilon p) e1) p)
    ;; Equation (30)
    ((=_e (epsilon p) e1) (linear-term e2 (r e2 (r e1 p)) (+ (q e2 (r e1 p)) (rename e1 e2 (q e1 p)))))
    (else (error "This case should never occur in this program."))))
(define (lift-real->real f df/dx)
  (letrec ((self (lambda (p)
                   (cond ;; Equation (31)
                     ((linear-term? p)
                      (let ((e (epsilon p)))
                        (linear-term e
                                     (self (r e p))
                                     (* (let ((e-prime (generate-epsilon)))
                                          (rename e-prime e (c e-prime 0 (df/dx (linear-term e-prime (r e p) (q e p))))))
                                        (q e p)))))
                     (else (f p))))))
    self))

(define (lift-real*real->real f df/dx1 df/dx2)
  (letrec ((self
            (lambda (p1 p2)
              (cond
                ;; Equation (32)
                ((and (linear-term? p1) (or (not (linear-term? p2)) (<_e (epsilon p2) (epsilon p1))))
                 (let ((e1 (epsilon p1)))
                   (linear-term e1
                                (self (r e1 p1) p2)
                                (* (let ((e-prime (generate-epsilon)))
                                     (rename e-prime e1 (c e-prime 0 (df/dx1 (linear-term e-prime (r e1 p1) (q e1 p1)) p2))))
                                   (q e1 p1)))))
                ;; Equation (33)
                ((and (linear-term? p2) (or (not (linear-term? p1)) (<_e (epsilon p1) (epsilon p2))))
                 (let ((e2 (epsilon p2)))
                   (linear-term e2
                                (self p1 (r e2 p2))
                                (* (let ((e-prime (generate-epsilon)))
                                     (rename e-prime e2 (c e-prime 0 (df/dx2 p1 (linear-term e-prime (r e2 p2) (q e2 p2))))))
                                   (q e2 p2)))))
                ;; Equation (34)
                ((and (linear-term? p1) (linear-term? p2) (=_e (epsilon p1) (epsilon p2)))
                 (let ((e (epsilon p1)) (e-prime (generate-epsilon))) (rename e-prime e (self p1 (rename e e-prime p2)))))
                (else (f p1 p2))))))
    self))

(define (r* p) (if (linear-term? p) (r* (epsilon p) p)) p))

(define (lift-real\symbol{94}n->boolean f) (lambda ps (apply f (map r* ps))))
```

Fig. 16

```
(define pair? (let ((pair? pair?)) (lambda (x) (and (pair? x) (not (linear-term? x))))))
(define + (lift-real*real->real + (lambda (x1 x2) 1) (lambda (x1 x2) 1)))
(define - (lift-real*real->real - (lambda (x1 x2) 1) (lambda (x1 x2) -1)))
(define * (lift-real*real->real * (lambda (x1 x2) x2) (lambda (x1 x2) x1)))
(define / (lift-real*real->real / (lambda (x1 x2) (/ 1 x2)) (lambda (x1 x2) (- 0 (/ x1 (* x2 x2))))))
(define sqrt (lift-real->real sqrt (lambda (x) (/ 1 (* 2 (sqrt x))))))
(define exp (lift-real->real exp (lambda (x) (exp x))))
(define log (lift-real->real log (lambda (x) (/ 1 x))))
(define sin (lift-real->real sin (lambda (x) (cos x))))
(define cos (lift-real->real cos (lambda (x) (- 0 (sin x)))))
(define atan (lift-real*real->real
              atan (lambda (x1 x2) (/ (- 0 x2) (+ (* x1 x1) (* x2 x2)))) (lambda (x1 x2) (/ x1 (+ (* x1 x1) (* x2 x2))))))
(define = (lift-real^n->boolean =))
(define < (lift-real^n->boolean <))
(define > (lift-real^n->boolean >))
(define <= (lift-real^n->boolean <=))
(define >= (lift-real^n->boolean >=))
(define zero? (lift-real^n->boolean zero?))
(define positive? (lift-real^n->boolean positive?))
(define negative? (lift-real^n->boolean negative?))
(define real? (lift-real^n->boolean real?))
```

Fig. 17

```
;;; Equation (2)
(define (derivative f) (lambda (c) (let ((e (generate-epsilon))) (univariate-e e i (f (linear-term e c i))))))
(define (ith-derivative-by-repetition i f)
  (cond ;; Equation (3)
        ((zero? i) f)
        ;; Equation (4)
        (else (ith-derivative-by-repetition (- i 1) (derivative f)))))
;;; Equation (7)
(define (ith-derivative-by-tower i f)
  (lambda (c) (let ((e (generate-epsilon))) (univariate-e e i (f (linear-term e c i))))))
(define (position-of-nonzero i)
  (cond ((null? i) #f)
        ((zero? (car i)) (let ((position (position-of-nonzero (cdr i)))) (if position (+ position 1) #f)))
        (else 0)))
(define (decrement-lth i l) (if (zero? l) (cons (- (car i) 1) (cdr i)) (cons (car i) (decrement-lth (cdr i) (- l 1)))))
(define (list-replace-lth c l u) (if (zero? l) (cons u (cdr c)) (cons (car c) (list-replace-lth (cdr c) (- l 1) u))))
(define (partial-derivative-by-repetition i f)
  (let ((l (position-of-nonzero i)))
    (cond ;; Equation (8)
          ((not l) f)
          ;; Equation (9)
          (else (partial-derivative-by-repetition
                 (decrement-lth i l) (lambda (c) ((derivative (lambda (u) (f (list-replace-lth c l u)))) (list-ref c l))))))))
;;; Equation (12)
(define (partial-derivative-by-tower i f)
  (lambda (c)
    (let ((e (map (lambda (cl) (generate-epsilon)) c)))
      (multivariate-e e i (f (map (lambda (el cl) (linear-term el cl 1)) e c))))))
```

Fig. 18

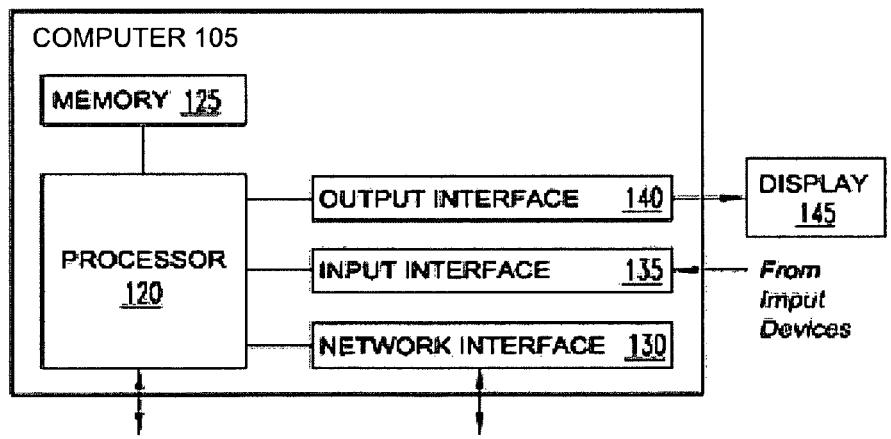

Fig. 19

AUTOMATIC DERIVATIVE METHOD FOR A COMPUTER PROGRAMMING LANGUAGE

STATEMENT REGARDING GOVERNMENT-SPONSORED RESEARCH

This innovation was sponsored in part by NSF grant CCF-0438806 and in part by Science Foundation Ireland grant 00/PI.1/C067. The US Government may have certain rights in the invention.

REFERENCE TO RELATED APPLICATIONS

This application claims priority to U.S. Provisional Patent Application 60/862,103, filed Oct. 19, 2006, and titled "Automatic Derivative Method for a Computer Programming Language," which is hereby incorporated herein by reference as if fully set forth.

REFERENCE TO COMPUTER PROGRAM LISTING APPENDIX

The text file named "map-closure.txt" is hereby incorporated by reference. The file "map-closure.txt" has a date of creation of Feb. 20, 2014, and is 394,490 bytes.

FIELD

The present disclosure relates to computing equipment for processing computer programs. More specifically, this disclosure relates to compilers, interpreters, and other systems that process functional programs that include automatic differentiation facilities.

BRIEF DESCRIPTION OF THE DRAWINGS

FIG. 1 is a closure-conversion implementation that applies to a top-level expression $e_0$.

FIG. 2 is CPS-conversion code that applies to a top-level expression $e_0$.

FIG. 3 is an implementation of set! using map-closure and call/cc.

FIG. 4 is an illustration of fanout in connection with application of AD to binary functions.

FIG. 5 is an illustration of typical LISP and SCHEME system functionality implemented as user code with map-closure.

FIG. 6 is a SCHEME implementation of an API for dual numbers.

FIG. 7 illustrates a mechanism for extending certain SCHEME procedures to handle dual numbers.

FIG. 8 is a flow diagram illustrating the role of the lambda calculus in a variety of systems that use AD transformations.

FIG. 9 is common VLAD code for the saddle and particle examples.

FIG. 10 is VLAD code for the saddle example.

FIG. 11 is VLAD code for the particle example.

FIG. 12 is a sample implementation of some SCHEME procedures that operate on reals with extensions that support dual numbers.

FIG. 13 is a sample implementation of an alternate representation for dual numbers as sparce association lists of their fringe elements indexed by path.

FIG. 14 is a sample implementation of the derivative operator in PLT SCHEME using generative structure types.

FIG. 15 is a portion of the code that implements the charged-particle path-optimization example in Section 6-7.

FIG. 16 illustrates a mechanism for extending certain SCHEME procedures to support multivariate power series.

FIG. 17 illustrates overloading some SCHEME procedures that operate on reals with extensions that support multivariate power series.

FIG. 18 is a SCHEME implementation of $\mathcal{D}$, the repetition and tower methods for $\mathcal{D}^i$, and the repetition and tower methods for $\mathcal{D}^{(i_1,\ldots,i_n)}$.

FIG. 19 is a block diagram of a computing device on which the disclosed activities occur.

DESCRIPTION

For the purpose of promoting an understanding of the principles of the present disclosure, reference will now be made to the embodiment illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the invention relates.

Generally, one form of the present system is a system that compiles, interprets, or executes a functional programming language that implements a derivative operator as a first-class function. In another form, a computing system, comprising a processor and a first memory in communication with the processor, includes in the first memory programming instructions executable by the processor to accept a function expressed as a program in a formal language of a formal system; automatically process the program to yield an output; and store the output of the processing in a second memory. The formal language includes at least one automatic differentiation (AD) construct that takes as its input a first object expressed in the formal language, and provides as its output a second object expressed in the formal language. The second object calculates the derivative of the first object, and the second object is produced by transforming the first object with the formal system.

In yet another form, a computing system, comprising a processor and a first memory in communication with the processor, includes in the first memory programming instructions executable by the processor to accept a function expressed as a program, automatically process the program, and store the output in a second memory. The automatic processing interprets an automatic differentiation (AD) operator that takes a first function as its input and provides a second function as its output, where the second function calculates the derivative of the first function. The first function includes a nested AD operation such that at least one of the following hold: the first function provides cascaded use of the AD operator, with or without intermediate operations on the resulting value; or the code for the first function invokes the AD operator.

1 AD of Functional Programs

Algorithm Differentiation (AD) is an established enterprise that seeks to take the derivatives of functions specified as programs through symbolic manipulation rather than finite differencing. AD has traditionally been applied to imperative programs. This portion of the disclosure presents a novel framework for performing AD within modern functional-programming languages, treating AD operators as first-class higher-order functions that map first-class function objects to first-class function objects. This approach is more modular, allowing a library of functions based on derivatives to be built compositionally. It allows the callee to specify the necessary AD, rather than insisting that the caller provide appropriately transformed functions. Higher-order derivatives are constructed naturally, without special mechanisms. Gradients can even be taken through processes that themselves involve AD-based optimization or approximate iterate-to-fixed point operators such as PDE solvers. The fact that the output of these transformations are first-class functions, rather than an interpreted "tape" that is typical of traditional AD systems, makes this approach amenable to efficient code generation with standard compilation techniques for functional programming languages. This disclosure illustrates these advantages with examples that run in an implemented system.

1-1 INTRODUCTION

Differentiation is inherently a higher-order process. The derivative operator, traditionally written as d/dx, maps a function, traditionally written as $f(x): \mathbb{R} \to \mathbb{R}$, to its derivative, traditionally written as $f'(x): \mathbb{R} \to \mathbb{R}$. The derivative operator is thus a higher-order function of type $(\mathbb{R} \to \mathbb{R}) \to (\mathbb{R} \to \mathbb{R})$. Partial derivatives generalize this notion to functions that take multiple arguments, represented as a vector. The partial derivative operator, traditionally written as $\partial/\partial x_i$, maps a multivariate function, traditionally written as $f(x_1, \ldots, x_n) = f(x): \mathbb{R}^n \to \mathbb{R}$, to its partial derivative with respect to its $i^{th}$ argument (or $i^{th}$ element of x). That partial derivative is also a function of type $\mathbb{R}^n \to \mathbb{R}$. The partial-derivative operator is thus a higher-order function of type $(\mathbb{R}^n \to \mathbb{R}) \to (\mathbb{R}^n \to \mathbb{R})$. (There is a distinct partial-derivative operator for each argument index i.) For clarity, we write the derivative operator as $\mathcal{J}$ and the partial derivative operator as $\mathcal{D}_i$.

The gradient operator, traditionally written as $\nabla$, maps a function $f$, of type $\mathbb{R}^n \to \mathbb{R}$, to a function that maps an $\mathbb{R}^n$ vector x to a vector of the values of all the partial derivatives of f at x. It is thus a higher-order function of type $(\mathbb{R}^n \to \mathbb{R}) \to (\mathbb{R}^n \to \mathbb{R}^n)$. The Jacobian generalizes this notion to functions that also return multiple results, represented as a vector. We write the Jacobian operator as $\mathcal{J}$. It maps a function $f$, of type $\mathbb{R}^n \to \mathbb{R}^m$, to a function that maps an $\mathbb{R}^n$ vector x to the Jacobian $\mathbb{R}^{m \times n}$ matrix J at x. The (i, j)$^{th}$ element of J is the value of the partial derivative of the $i^{th}$ element of the output of f with respect to the $j^{th}$ element of the input. The Jacobian operator is thus a higher-order function of type $(\mathbb{R}^n \to \mathbb{R}^m) \to (\mathbb{R}^n \to \mathbb{R}^{m \times n})$.

Many other concepts in mathematics, engineering, and physics are formulated as higher-order functions: integrals, optimization, convolution, filters, edge detectors, Fourier transforms, differential equations, Hamiltonians, etc. The lambda calculus (Church, 1941) is a framework for computation with higher-order functions, for which the derivative operator served as a motivating example:

It is, of course, not excluded that the range of arguments or range of values of a function should consist wholly or partly of functions. The derivative, as this notion appears in the elementary differential calculus, is a familiar mathematical example of a function for which both ranges consist of functions. Church (1941, fourth paragraph).

The lambda calculus forms the basis of functional programming languages such as SCHEME, ML, and HASKELL. These languages support higher-order functions and treat functions as first-class objects. They can be passed as arguments, returned as results, and stored in aggregate data structures. There is an established enterprise, called algorithm differentiation (AD; Griewank, 2000; Corliss et al., 2001), which seeks to find methods for taking the derivatives of functions specified as programs. The key is to symbolically manipulate programs to compute precise derivatives rather than estimate derivatives numerically as finite differences. Traditional AD operates on imperative programs. This disclosure presents a natural formulation of AD in the framework of functional programming with first-class higher-order function objects. Doing so offers a number of advantages over traditional AD formulations:

1. Due to similarity of notation and semantics, functional programs represent the underlying mathematical notions more closely than imperative programs.
2. This formulation is modular and allows a library of functions to be built compositionally: root finders built on a derivative-taker, line search built on root finders, multivariate optimizers built on line search, other multivariate optimizers (with identical APIs) build on Hessian-vector multipliers, themselves built on AD operators, and so forth.
3. By allowing the callee to specify the necessary AD, rather than insisting that the caller provide appropriately transformed functions, internals can be hidden and changed, maintaining a modular structure previously not possible in AD codes.
4. Since the present AD operators are formulated as higher-order functions that map first-class function objects to first-class function objects, it is straightforward to generate higher-order derivatives, i.e. derivatives of derivatives.
5. Differential forms become first-class higher-order function objects that can be passed to optimizers or PDE solvers as part of an API. This allow one to easily express programming patterns, i.e. algorithm templates that can be instantiated with different components as fillers. For example, one can construct an algorithm that needs an optimizer and leave the choice of optimizer unspecified, to be filled in later by passing the particular optimizer as a function parameter.
6. Gradients can even be taken through processes that themselves involve AD-based optimization or PDE solution.
7. In traditional AD formulations, the output of an AD transformation is a "tape" that is a different kind of entity than user-written functions. It must be interpreted or run-time compiled. In contrast, in our approach, user-written functions, and the arguments to and results of AD operators, are all the same kind of entity. Standard compilation techniques for functional programs can eliminate the need for interpretation or run-time compilation of derivatives and generate, at compile time, code for derivatives that is as efficient as code for the primal calculation.

Examples of points 1 through 7 are illustrated in section 1-9, below.

It is difficult and unwieldy to implement AD in existing functional-programming languages such as SCHEME, ML, and HASKELL. This disclosure, therefore, describes development of a new language, called VLAD (VLAD is an acronym for Function Language for AD with a voiced F), that supports AD better than existing functional programming languages. A preliminary implementation of VLAD is an interpreter called STALIN∇ (pronounced Stalingrad), discussed herein. STALIN∇ is currently an interpreter, but those skilled in the art will be able to evolve STALIN∇ into an extremely efficient compiler for VLAD, for example, by using the technology from the STALIN compiler for SCHEME and techniques such as polyvariant flow analysis, flow-directed lightweight closure conversion, unboxing, and inlining. The remainder of this section of the disclosure is organized as follows. Subsection 1-2 develops the framework that we will use to formulate AD. Subsections 1-3 and 1-4 present traditional forward- and reverse-mode AD within this framework respectively. Subsection 1-5 gives the intuition of how AD is applied to data constructed out of pairs instead of vectors. Subsection 1-6 presents the VLAD language. Subsections 1-7 and 1-8 present derivations of forward- and reverse-mode AD in VLAD respectively. Subsection 9 contains examples that illustrate points 1 through 7 above. Subsection 1-10 discusses the key technical contributions of this paper. Subsection 1-11 concludes with a summary of related work and a discussion of planned future work.

1-2 BACKGROUND

The following notational conventions are applied in this disclosure. We use x and y to denote scalar reals through subsection 5 and arbitrary VLAD values from subsection 1-6 on. We use x and y to denote real vectors and X and Y to denote real matrices. We often use x and its typographic variants to denote function arguments and y and its typographic variants to denote function results. We use primes and subscripts to denote distinct names and brackets, as in $x[i]$, to denote selection of vector components. We take 1 to be the index of the first element of vectors (and lists) and the first row and column of matrices. We use comma to denote pair formation and CAR and CDR to denote the functions that extract the elements of pairs. We use e to denote expressions and $\tau$ to denote VLAD types. We use f and g to denote functions from real vectors to real vectors through section 5 and procedures of $\tau_1 \to \tau_2$ from subsection 1-6 on. We use $\alpha$ to denote functions of type $\mathbb{R} \to \mathbb{R}$ b to denote functions of type $\mathbb{R}^2 \to \mathbb{R}$ or $(\mathbb{R} \times \mathbb{R}) \to \mathbb{R}$, and p to denote functions of type $\tau \to$ boolean. We use juxtaposition of a function and its argument to denote function application, of two functions to denote function composition: $(g\ f)\ x = g\ (f\ x)$, of a matrix and a vector to denote matrix-vector multiplication, of two matrices to denote matrix-matrix multiplication, and of two scalars to denote ordinary multiplication. Note that matrices can be viewed as linear functions, thus matrix-vector multiplication is application of a linear function and matrix-matrix multiplication is composition of linear functions. Scalars can be viewed as one-element vectors or $1 \times 1$ matrices, thus ordinary multiplication can be viewed as either function application or function composition.

We use infix $e_1 + e_2$ and $e_1 \oplus e_2$ to denote $++(e_1, e_2)$ and PLUS $(e_1, e_2)$ and $$\sum_{i=1}^{n} e_i$$

to denote $e_1 + \ldots + e_n$. Comma associates to the right; juxtaposition, +, and $\oplus$ associate to the left; and vector-component selection has highest precedence, followed by comma, then juxtaposition, and then + and $\oplus$. The scope of lambda expressions and summations extends as far right as possible. We use parentheses solely to specify precedence. Note that function composition and matrix multiplication are associative. More generally, a juxtaposition sequence denoting either a sequence of function compositions followed by a function application or a sequence of matrix-matrix multiplications followed by a matrix-vector multiplication is associative. We use $X^T$ to denote the transpose of a matrix X. Recall that $(X\ Y)^T = Y^T\ X^T$ more generally, $$(X_1 \ldots X_n)^T = X_n^T \ldots X_1^T.$$

In the next subsection, we give an unconventional derivation of forward- and reverse-mode AD. The particular derivation that we present lends itself to extension to functional programming languages.

1-2.1 Noncompositionality of the Jacobian Operator

An operator $\bigcirc$ is compositional if $\bigcirc\ (g\ f) = (\bigcirc g)\ (\bigcirc F)$ and, more generally, $\bigcirc\ (f_n \ldots f_1) = (\bigcirc f_n) \ldots (\bigcirc f_1)$. If we take $f_1, \ldots, f_n$ to be primitives of some programming language and $f_n \ldots f_1$ to be a program constructed out of those primitives, then compositional operators have a desirable property: one can compute $\bigcirc\ (f_n \ldots f_1)$ by an abstract interpretation of a $f_n \ldots f_1$, interpreting each $f_i$ abstractly as $\bigcirc f_i$.

We can see that the Jacobian operator is not compositional. The chain rule states that:

$$\mathcal{J}(gf)x = (\mathcal{J}\ gfx)(\mathcal{J}\ fx)$$

and, more generally, that:

$$\mathcal{J}(f_n \ldots f_1)x = (\mathcal{J} f_n f_{n-1} \ldots f_2 f_1 x)$$
$$(\mathcal{J} f_{n-1} \ldots f_2 f_1 x)$$
$$\vdots$$
$$(\mathcal{J} f_2 f_1 x)$$
$$(\mathcal{J} f_1 x)$$

Because the Jacobian operator is not compositional, we seek alternative operators that are compositional and allow us to compute the Jacobian.

1-2.2 Adjoint Computation: the Essential Insight of AD

As a first step in our search for compositional alternatives to the Jacobian operator, we introduce:

$$\overrightarrow{\nabla} fx, \dot{x} \triangleq \mathcal{J}\ fx\dot{x}$$

$$\overleftarrow{\nabla} fx, \grave{y} \triangleq (\mathcal{J} fx)^T \grave{y}$$

We refer to x as the primal and to $\dot{x}$ and $\grave{x}$ as the forward and reverse adjoints of x respectively. Note that the rows and columns of $\mathcal{J}\ f x$ can be computed as $\overrightarrow{\nabla}\ f x, e$ and $\overleftarrow{\nabla}\ f x, e$ for basis vectors e respectively. Thus one can derive $\mathcal{J}\ f$ from either $\overrightarrow{\nabla}$ for $\overleftarrow{\nabla}$ f.

The motivation for introducing $\overrightarrow{\nabla}$ and $\overleftarrow{\nabla}$ can be seen with the following. Suppose we wish to compute $\overrightarrow{\nabla}\ (f_n \ldots f_1)\ x_0, \dot{x}_0$. Let $x_i$ denote $f_i \ldots f_1\ x_0$ and $\dot{x}_i$ denote $\overrightarrow{\nabla}\ (f_i \ldots f_1)\ x_0, \dot{x}_0$ for $i=1, \ldots, n$. Note that each $x_i$ can be computed from $x_{i-1}$ as $f_i\ x_{i-1}$. Furthermore, each $\dot{x}_i$ can be similarly computed from $x_{i-1}$ and $\dot{x}_{i-1}$ as $\overrightarrow{\nabla} f_i x_{i-1}, \dot{x}_{i-1}$:

$$\overset{\prime}{x}_i = \overrightarrow{\nabla}(f_i \ldots f_1)x_0, \overset{\prime}{x}_0$$
$$= \mathcal{J}(f_i \ldots f_1)x_0 \overset{\prime}{x}_0$$
$$= (\mathcal{J}f_i f_{i-1} \ldots f_1 x_0)$$
$$(\mathcal{J}f_{i-1} \ldots f_1 x_0)$$
$$\vdots$$
$$(\mathcal{J}f_1 x_0)$$
$$\overset{\prime}{x}_0$$
$$= \mathcal{J}f_i f_{i-1} \ldots f_1 x_0 \overset{\prime}{x}_{i-1}$$
$$= \mathcal{J}f_i x_{i-1} \overset{\prime}{x}_{i-1}$$
$$= \overrightarrow{\nabla}f_i x_{i-1}, \overset{\prime}{x}_{i-1}$$

In a similar fashion, suppose we wish to compute $\overleftarrow{\nabla}(f_n \ldots f_1)x_0, \overset{\grave{}}{x}_n$. Let $\overset{\grave{}}{x}_i$ denote:

$$(\mathcal{J}f_{i+1} \ldots f_1 x_0)^T \ldots (\mathcal{J}f_n \ldots f_1 x_0)^T \overset{\grave{}}{x}_n \text{ for } i = 0, \ldots, n-1.$$

We can see that $\overleftarrow{\nabla}(f_n \ldots f_1)x_0, \overset{\grave{}}{x}_n = \overset{\grave{}}{x}_0$:

$$\overleftarrow{\nabla}(f_n \ldots f_1)x_0 \overset{\grave{}}{x}_n = (\mathcal{J}(f_n \ldots f_1)x_0)^T \overset{\grave{}}{x}_n$$
$$= \begin{pmatrix} (\mathcal{J}f_n \ldots f_1 x_0) \\ \vdots \\ (\mathcal{J}f_1 x_0) \end{pmatrix}^T \overset{\grave{}}{x}_n$$
$$= (\mathcal{J}f_1 x_0)^T$$
$$\vdots$$
$$(\mathcal{J}f_n \ldots f_1 x_0)^T$$
$$\overset{\grave{}}{x}_n$$
$$= \overset{\grave{}}{x}_0$$

Furthermore, each $\overset{\grave{}}{x}_{i-1}$ can be similarly computed from $x_{i-1}$ and $\overset{\grave{}}{x}_i$, as $\overleftarrow{\nabla}f_i x_{i-1}, \overset{\grave{}}{x}_i$:

$$\overset{\grave{}}{x}_{i-1} = (\mathcal{J}f_1 \ldots f_1 x_0)^T \overset{\grave{}}{x}_i$$
$$= (\mathcal{J}f_i x_{i-1})^T \overset{\grave{}}{x}_i$$
$$= \overleftarrow{\nabla}f_i x_{i-1}, \overset{\grave{}}{x}_i$$

The chain rule allows us to derive expressions for $\overrightarrow{\nabla}(gf)$ and $\overleftarrow{\nabla}(g\,f)$:

$$\overrightarrow{\nabla}(gf)(x, \overset{\prime}{x}) = \mathcal{J}(gf)x\overset{\prime}{x}$$
$$= (\mathcal{J}gfx)(\mathcal{J}fx)\overset{\prime}{x}$$
$$= (\mathcal{J}gfx)(\overrightarrow{\nabla}fx, \overset{\prime}{x})$$
$$= \overrightarrow{\nabla}g(fx), (\overrightarrow{\nabla}fx, \overset{\prime}{x})$$
$$\overleftarrow{\nabla}(gf)(x, \overset{\grave{}}{y}) = (\mathcal{J}(gf)x)^T \overset{\grave{}}{y}$$
$$= ((\mathcal{J}gfx)(\mathcal{J}fx))^T \overset{\grave{}}{y}$$
$$= (\mathcal{J}fx)^T (\mathcal{J}gfx)^T \overset{\grave{}}{y}$$
$$= \overleftarrow{\nabla}fx, ((\mathcal{J}gfx)^T \overset{\grave{}}{y})$$
$$= \overleftarrow{\nabla}fx, (\overleftarrow{\nabla}g(fx), \overset{\grave{}}{y})$$

Note that $\overrightarrow{\mathcal{J}}$ and $\overleftarrow{\mathcal{J}}$ are still not compositional. This is due to the fact that $\overrightarrow{\mathcal{J}}$ f and $\overleftarrow{\mathcal{J}}$ f map primals paired with adjoints to adjoints.

1-2.3 Compositionality of the AD Transforms

It is easy to derive a compositional variant of $\overrightarrow{\mathcal{J}}$. Recall that $f_i$ maps $x_{i-1}$ to $x_i$ and $\overrightarrow{\mathcal{J}} f_i$ maps $x_{i-1}$ paired with $\overset{\prime}{x}_{i-1}$ to $\overset{\prime}{x}_i$. We simply introduce a variant of $\overrightarrow{\mathcal{J}}$ that combines these two maps:

$$\overrightarrow{\mathcal{J}} fx, \overset{\prime}{x} \overset{\Delta}{=} (fx), (\overrightarrow{\nabla}fx, \overset{\prime}{x}).$$

$\overrightarrow{\mathcal{J}} f_i$ thus maps $x_{i-1}$ paired with $\overset{\prime}{x}_{i-1}$ to $x_i$ paired with $\overset{\prime}{x}_i$. Note that $\overrightarrow{\mathcal{J}}$ f x, $\overset{\prime}{x}$=CDR ($\overrightarrow{\mathcal{J}}$ f x, $\overset{\prime}{x}$). Thus one can derive $\overrightarrow{\nabla}$ f from $\overrightarrow{\mathcal{J}}$ f and ultimately derive $\mathcal{J}$ f from $\overrightarrow{\mathcal{J}}$ f.

It is easy to see that $\overrightarrow{\mathcal{J}}$ is compositional:

$$\overrightarrow{\mathcal{J}}(gf)x, \overset{\prime}{x} = (gfx), (\overrightarrow{\nabla}(gf)x, \overset{\prime}{x})$$
$$= (gfx), (\overrightarrow{\nabla}g(fx), (\overrightarrow{\nabla}fx, \overset{\prime}{x}))$$
$$= \overrightarrow{\mathcal{J}}g(fx), (\overrightarrow{\nabla}fx, \overset{\prime}{x})$$
$$= (\overrightarrow{\mathcal{J}}g)(\overrightarrow{\mathcal{J}}f)x, \overset{\prime}{x}$$

It is a little more difficult to derive a compositional variant of $\overleftarrow{\nabla}$. The reason is that we need to derive the $\overset{\grave{}}{x}_i$ values in reverse order from the $x_i$ values because $\overleftarrow{\nabla} f_i$ maps $x_{i-1}$ paired with $\overset{\grave{}}{x}_i$ to $\overset{\grave{}}{x}_{i-1}$. Recall that:

$$\overset{\grave{}}{x}_i = (\mathcal{J}f_{i+1} \ldots f_1 x_0)^T \ldots (\mathcal{J}f_n \ldots f_1 x_0)^T \overset{\grave{}}{x}_n$$

and, in particular, that:

$$\overset{\grave{}}{x}_0 = (\mathcal{J}f_1 x_0)^T \ldots (\mathcal{J}f_n \ldots f_1 x_0)^T \overset{\grave{}}{x}_n$$

So:

$$\overset{\grave{}}{x}_0 = (\mathcal{J}f_1 x_0)^T \ldots (\mathcal{J}f_1 \ldots f_1 x_0)^T \overset{\grave{}}{x}_i$$

Let: $\tilde{x}_i$ denote this function that maps $\tilde{x}_i$ to $\tilde{x}_0$. We can derive $\tilde{x}_i$ from $\tilde{x}_{i-1}$:

$$\tilde{x}_i = \lambda \grave{x}_i (\mathcal{J} f_1 x_0)^T \ldots (\mathcal{J} f_i \ldots f_1 x_0)^T \grave{x}_i$$

$$= \tilde{x}_{i-1} \lambda \grave{x}_i (\mathcal{J} f_i \ldots f_1 x_0)^T \grave{x}_i$$

$$= \tilde{x}_{i-1} \lambda \grave{x}_i (\mathcal{J} f_i x_{i-1})^T \grave{x}_i$$

$$= \tilde{x}_{i-1} \lambda \grave{x}_i \overleftarrow{\nabla} f_i x_{i-1}, \grave{x}_i$$

$$= \lambda \grave{x}_i \tilde{x}_{i-1} (\overleftarrow{\nabla} f_1 x_{i-1}, \grave{x}_i)$$

Just as $\overrightarrow{\mathcal{J}} f_i$ is a variant of $\overrightarrow{\nabla} f_i$ that maps $x_{i-1}$ paired with $\grave{x}_{i-1}$ to $x_i$ paired with $\grave{x}_i$, we can define $\overleftarrow{\mathcal{J}} f_i$ to be a variant of $\overleftarrow{\nabla} f_i$ that maps $x_{i-1}$ paired with $\tilde{x}_{i-1}$ to $x_i$ paired with $\tilde{x}_i$:

$$\overleftarrow{\mathcal{J}} f x, \tilde{x} \triangleq (fx), \lambda \grave{y} \tilde{x} (\overleftarrow{\nabla} fx, \grave{y}).$$

We refer to $\tilde{x}$ as the backpropagator associated with the primal x. If y=fx, then $\tilde{x}=\tilde{y}\grave{y}$. Note that $\overleftarrow{\nabla} fx, \grave{y}=\text{CDR}(\overleftarrow{\mathcal{J}} fx, I)\grave{y}$, where I denotes the identity function. Thus one can derive $\overleftarrow{\nabla} f$ from $\overleftarrow{\mathcal{J}} f$ and ultimately derive $\mathcal{J} f$ from $\overleftarrow{\mathcal{J}} f$.

It is easy to see that $\overleftarrow{\mathcal{J}}$ is compositional:

$$\overleftarrow{\mathcal{J}}(gf)x, \tilde{x} = (gfx), \lambda \grave{y} \tilde{x} \overleftarrow{\nabla}(gf)x, \grave{y}$$

$$= (gfx),$$
$$\lambda \grave{y} \tilde{x} \overleftarrow{\nabla} fx, (\overleftarrow{\nabla} g(fx), \grave{y})$$

$$= (gfx),$$
$$\lambda \grave{y} (\lambda \grave{y} \tilde{x} \overleftarrow{\nabla} fx, \grave{y})(\overleftarrow{\nabla} g(fx), \grave{y})$$

$$= \overleftarrow{\mathcal{J}} g(fx), \lambda \grave{y} \tilde{x} \overleftarrow{\nabla} fx, \grave{y}$$

$$= (\overleftarrow{\mathcal{J}} g)(\overleftarrow{\mathcal{J}} f)x, \tilde{x}$$

We refer to a primal x paired with a forward adjoint $\grave{x}$ as a forward conjoint and to a primal x paired with a backpropagator $\tilde{x}$ as a reverse conjoint. This gives the basic recipe for AD transformations. The forward transformation is an abstract interpretation where primal values are interpreted abstractly as forward conjoint values and functions f are interpreted abstractly as functions $\overrightarrow{\mathcal{J}} f$ that map forward conjoint values to forward conjoint values. The reverse transformation is an abstract interpretation where primal values are interpreted abstractly as reverse conjoint values and functions f are interpreted abstractly as functions $\overleftarrow{\mathcal{J}} f$ that map reverse conjoint values to reverse conjoint values.

1-3 Traditional Forward-Mode AD

A program can be viewed as a composition $f_n \ldots f_1$:

$$x_1 = f_1 x_0$$
$$x_2 = f_2 x_1$$
$$\vdots$$
$$x_n = f_n x_{n-1}$$

Here, each $x_i$ denotes a machine state, $x_0$ denotes the input machine state, $x_n$ denotes the output machine state, and each $f_i$ denotes the transition function from machine state $x_{i-1}$ to machine state $x_i$.

Forward-mode AD computes $\overrightarrow{\mathcal{J}}(f_n \ldots f_1)$ as an abstract interpretation $(\overrightarrow{\mathcal{J}} f_n) \ldots (\overrightarrow{\mathcal{J}} f_1)$:

$$x_1, \grave{x}_1 = \overrightarrow{\mathcal{J}} f_1 x_0, \grave{x}_0$$
$$x_2, \grave{x}_2 = \overrightarrow{\mathcal{J}} f_2 x_1, \grave{x}_1$$
$$\vdots$$
$$x_n, \grave{x}_n = \overrightarrow{\mathcal{J}} f_n x_{n-1}, \grave{x}_{n-1}$$

Here, each machine state $x_i$ is interpreted abstractly as a forward conjoint $x_i, \grave{x}_i$, and each transition function $f_i$ is interpreted abstractly as $\overrightarrow{\mathcal{J}} f_i$, a map from forward conjoints to forward conjoints.

The transition functions $f_i$ are typically sparse. They typically compute a single element l of $x_i$ as either a unary scalar function u of a single element l of $x_{i-1}$ or a binary scalar function b of two elements j and k of $x_{i-1}$, passing the remaining elements of $x_{i-1}$ unchanged through to $x_i$. The corresponding functions $\overrightarrow{\mathcal{J}} f_i$ are also sparse. To see this, consider the special case where l=1, j=2, and k=3. If $$f_i: \begin{array}{cccc} x[1] & x[2] & \cdots & x[n] \\ \swarrow & \downarrow & \cdots & \downarrow \\ u\,x[2] & x[2] & \cdots & x[n] \end{array}$$

then $\overrightarrow{\mathcal{J}} f_i$ is:

$$\begin{pmatrix} 0 & \mathcal{D}ux[2] & 0 & \cdots & 0 \\ 0 & 1 & 0 & \cdots & 0 \\ 0 & 0 & 1 & \cdots & 0 \\ \vdots & \vdots & \vdots & \ddots & \vdots \\ 0 & 0 & 0 & \cdots & 1 \end{pmatrix}$$

and $\overrightarrow{\mathcal{J}} f_i \times \grave{x}$ is:

$$\begin{pmatrix} \mathcal{D}ux[2]\grave{x}[2] \\ \grave{x}[2] \\ \vdots \\ \grave{x}[n] \end{pmatrix}$$

Similarly, if:

$$f_i: \begin{array}{ccccc} x[1] & x[2] & x[3] & \cdots & x[n] \\ \swarrow & \downarrow & \downarrow & \cdots & \downarrow \\ b\,x[2], x[3] & x[2] & x[3] & \cdots & x[n] \end{array}$$

then $\overrightarrow{\mathcal{J}} \, f_i \, x$ is:

$$\begin{pmatrix} 0 & \mathcal{D}_1 bx[2], x[3] & \mathcal{D}_2 bx[2], x[3] & 0 & \ldots & 0 \\ 0 & 1 & 0 & 0 & \ldots & 0 \\ 0 & 0 & 1 & 0 & \ldots & 0 \\ 0 & 0 & 0 & 1 & \ldots & 0 \\ \vdots & \vdots & \vdots & \vdots & \ddots & \vdots \\ 0 & 0 & 0 & 0 & \ldots & 1 \end{pmatrix}$$

and $\overrightarrow{\mathcal{J}} \, f_i \, x \, \dot{x}$:

$$\begin{pmatrix} \mathcal{D}_1 bx[2], x[3]\dot{x}[2] + \mathcal{D}_2 bx[2], x[3]\dot{x}[3] \\ \dot{x}[2] \\ \vdots \\ \dot{x}[n] \end{pmatrix}$$

More generally, if:

$$(f_i x_{i-1})[l'] = \begin{cases} u x_{i-1}[j] & l' = l \\ x_{i-1}[l'] & \text{otherwise} \end{cases}$$

then:

$$\left( CAR\left(\overrightarrow{\mathcal{J}} f_i x_{i-1}, \dot{x}_{i-1}\right)\right)[l'] =$$
$$\begin{cases} u x_{i-1}[j] & l' = l \\ x_{i-1}[l'] & \text{otherwise} \end{cases}$$

$$\left( CDR\left(\overrightarrow{\mathcal{J}} f_i x_{i-1}, \dot{x}_{i-1}\right)\right)[l'] =$$
$$\begin{cases} \mathcal{D} u x_{i-1}[j]\dot{x}_{i-1}[j] & l' = l \\ \dot{x}_{i-1}[l'] & \text{otherwise} \end{cases}$$

and if:

$$(f_i x_{i-1})[l'] = \begin{cases} b x_{i-1}[j], x_{i-1}[k] & l' = l \\ x_{i-1}[l'] & \text{otherwise} \end{cases}$$

then:

$$\left( CAR\left(\overrightarrow{\mathcal{J}} f_i x_{i-1}, \dot{x}_{i-1}\right)\right)[l'] =$$
$$\begin{cases} b x_{i-1}[j], x_{i-1}[k] & l' = l \\ x_i[l'] & \text{otherwise} \end{cases}$$

$$\left( CDR\left(\overrightarrow{\mathcal{J}} f_i x_{i-1}, \dot{x}_{i-1}\right)\right)[l'] =$$
$$\begin{cases} \mathcal{D}_1 b x_{i-1}[j], x_{i-1}[k]\dot{x}_{i-1}[j] + & l' = l \\ \mathcal{D}_2 b x_{i-1}[j], x_{i-1}[k]\dot{x}_{i-1}[k] & \\ \dot{x}_{i-1}[l'] & \text{otherwise} \end{cases}$$

Thus an imperative program that consists of straight-line code with statements $x_l := u \, x_j$ and $x_l := b \, x_j, x_k$ can be interpreted abstractly as straight-line code with statements:

$$x_l := u x_j$$
$$\dot{x}_l := \mathcal{D} u x_j \dot{x}_j$$

and:

$$x_l := b x_j, x_k$$
$$\dot{x}_l := \mathcal{D}_1 b x_j, x_k \dot{x}_j + \mathcal{D}_2 b x_j, x_k \dot{x}_k$$

respectively. Note that any given programming language will have a small finite number of primitives u and b. Thus an implementation of forward-mode AD can be hardwired with the corresponding $\mathcal{D}$ u, $\mathcal{D}_1$ b, and $\mathcal{D}_2$ b implementations.

Traditional forward-mode AD implements the above abstract interpretation either as a source-to-source transformation or by overloading the primitives u and b. This has at least two undesirable consequences. First, in an implementation based on overloading, computing higher-order derivatives requires overloading the overloaded primitives, which may not be possible. Second, in an implementation based on source-to-source transformation, the specification of which code must be transformed is made in the build process, not the program, making it impossible for program libraries to specify the need for transformations.

1-4 Traditional Reverse-Mode AD

Reverse-mode AD computes $\overleftarrow{\mathcal{J}} \, (f_n \ldots f_1)$ as an abstract interpretation $(\overleftarrow{\mathcal{J}} \, f_n) \ldots (\overleftarrow{\mathcal{J}} \, f_1)$:

$$x_1, \tilde{x}_1 = \overleftarrow{\mathcal{J}} f_1 x_0, \tilde{x}_0$$
$$x_2, \tilde{x}_2 = \overleftarrow{\mathcal{J}} f_2 x_1, \tilde{x}_1$$
$$\vdots$$
$$x_n, \tilde{x}_n = \overleftarrow{\mathcal{J}} f_n x_{n-1}, \tilde{x}_{n-1}$$

Here, each machine state $x_i$ is interpreted abstractly as a reverse conjoint $x_i, \tilde{x}_i$ and each transition function $f_i$ is interpreted abstractly as $\overleftarrow{\mathcal{J}} f_i$, a map from reverse conjoints to reverse conjoints. Note that one typically takes $\tilde{x}_0 = I$. The above produces $\tilde{x}_n$. One then derives $\grave{x}_0$ from $\grave{x}_n$ as $\tilde{x}_n \grave{x}_n$. This results in the following computation:

$$\grave{x}_{n-1} = \overleftarrow{\nabla} f_n x_n, \grave{x}_n$$
$$\grave{x}_{n-2} = \overleftarrow{\nabla} f_{n-1} x_{n-1}, \grave{x}_{n-1}$$
$$\vdots$$
$$\grave{x}_0 = \overleftarrow{\nabla} f_1 x_1, \grave{x}_1$$

Note two things about this computation: First, $\overleftarrow{\nabla} f_n, \ldots, \overleftarrow{\nabla} f_1$ are called in reverse order from $f_1, \ldots, f_n$, after the computation of $f_1, \ldots, f_n$ terminates. Second, each call to $\overleftarrow{\nabla} f_i$ needs the value of $x_i$, an intermediate machine state part way through the computation of $f_1, \ldots, f_n$. These are handled in traditional implementations of reverse-mode AD by recording a "tape" of the computation $f_1, \ldots f_n$ and playing this tape back in reverse to compute $\overleftarrow{\nabla} f_n, \ldots, \overleftarrow{\nabla} f_1$. This tape must record (the necessary parts of) the intermediate machine states. This has at least two undesirable consequences. First, playing back the tape involves either an interpreter or run-time compilation, which is less efficient than the primal computation. Second, the tape is a different kind of entity than the primal function, making it difficult to compute higher-order derivatives.

Note, however, that, in our formulation, a backpropagator is simply a function. Each backpropagator $\tilde{x}_i$ closes over the previous backpropagator $\tilde{x}_{i-1}$ and calls that previous backpropagator in tail position. This backpropagator chain can implement the "tape." Reversal and evaluation of the tape is implemented by the chain of tail calls. The backpropagators close over the intermediate machine states, alleviating the need to provide a special mechanism to store such states. And since backpropagators are closures, the same kind of entity as primal functions, they can be further interpreted abstractly to yield higher-order derivatives.

Because the transition functions $f_i$ are typically sparse, the corresponding functions $\overleftarrow{\mathcal{J}} f_i$ are also sparse. To see this, again consider the special case where l=1, j=2, and k=3. If:

$$f_i: \begin{array}{ccccc} x[1] & x[2] & \cdots & x[n] \\ \swarrow & \downarrow & & \downarrow \\ u\,x[2] & x[2] & \cdots & x[n] \end{array}$$

then 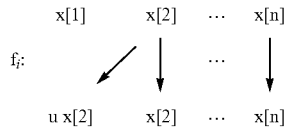 is:

$$\begin{pmatrix} 0 \\ \grave{y}[2] + \mathcal{D}u x[2]\grave{y}[1] \\ \grave{y}[3] \\ \vdots \\ \grave{y}[n] \end{pmatrix}$$

Similarly, if:

$$f_i: \begin{array}{ccccc} x[1] & x[2] & x[3] & \cdots & x[n] \\ \swarrow & \downarrow & \downarrow & & \downarrow \\ b\,x[2], x[3] & x[2] & x[3] & \cdots & x[n] \end{array}$$

then 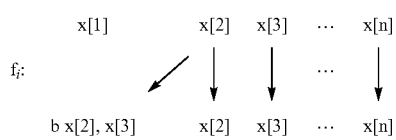 is:

$$\begin{pmatrix} 0 \\ \grave{y}[2] + \mathcal{D}_1 b x[2], x[3]\grave{y}[1] \\ \grave{y}[3] + \mathcal{D}_2 b x[2], x[3]\grave{y}[1] \\ \grave{x}[4] \\ \vdots \\ \grave{x}[n] \end{pmatrix}$$

More generally, if $f_i$ is derived from a unary scalar function u:

$$(CAR(\overleftarrow{\mathcal{J}} f_i x_{i-1}, \tilde{x}_{i-1}))[l'] = \begin{cases} u x_{i-1}[j] & l' = l \\ x_{i-1}[l'] & \text{otherwise} \end{cases}$$

$$(CDR(\overleftarrow{\mathcal{J}} f_i x_{i-1}, \tilde{x}_{i-1})\grave{x}_i)[j'] = \begin{cases} 0 & j' = l \\ \grave{x}_i[j'] + \mathcal{D}u x_{i-1}[j]\grave{x}_i[l] & j' = j \\ \grave{x}_i[j'] & \text{otherwise} \end{cases}$$

When $f_i$ is derived from a binary scalar function b:

$$(CAR(\overleftarrow{\mathcal{J}} f_i x_{i-1}, \tilde{x}_{i-1}))[l'] = \begin{cases} b x_{i-1}[j], x_{i-1}[k] & l' = l \\ x_{i-1}[l'] & \text{otherwise} \end{cases}$$

$$(CDR(\overleftarrow{\mathcal{J}} f_i x_{i-1}, \tilde{x}_{i-1})\grave{x}_i)[j'] = \begin{cases} 0 & j' = l \\ \grave{x}_i[j'] + \mathcal{D}_1 b x_{i-1}[j], x_{i-1}[k]\grave{x}_i[l] & j' = j \\ \grave{x}_i[j'] + \mathcal{D}_2 b x_{i-1}[j], x_{i-1}[k]\grave{x}_i[l] & j' = k \\ \grave{x}_i[j'] & \text{otherwise} \end{cases}$$

Thus an imperative program that consists of straight-line code with statements $x_l := u\, x_j$ and $x_l := b\, x_j, x_k$ can be interpreted abstractly as straight-line code with statements:

$$x_l := u x_j$$
$$\tilde{x} := \tilde{x}, \text{``}\grave{x}_l := 0\text{''}$$
$$\tilde{x} := \tilde{x}, \text{``}\grave{x}_j := \grave{x}_j + \mathcal{D}u x_j \grave{x}_l\text{''}$$

and $$x_l := b x_j, x_k$$
$$\tilde{x} := \tilde{x}, \text{``}\grave{x}_l := 0\text{''}$$
$$\tilde{x} := \tilde{x}, \text{``}\grave{x}_j := \grave{x}_j + \mathcal{D}_1 b x_j, x_k \grave{x}_l\text{''}$$
$$\tilde{x} := \tilde{x}, \text{``}\grave{x}_k := \grave{x}_k + \mathcal{D}_2 b x_j, x_k \grave{x}_l\text{''}$$

respectively. In the above, we use $\tilde{x}$ to denote the tape and "..." to denote a record on that tape. The records must include the intermediate values of $x_j$ and $x_k$. Note that any given programming language will have a small finite number of primitives u and b. Thus an implementation of reverse-mode AD can be hardwired with the corresponding $\mathcal{D}$ u, $\mathcal{D}_1$ b, and $\mathcal{D}_2$ b implementations.

1-5 Jacobians of CAR, CDR AND CONS

In the next section, we will formulate AD for a functional programming language. This language will support a pair type with appropriate constructor and accessor functions. We will thus need to apply AD operators to such functions. In this section, we give the intuition for how this is done.

Let us consider the special case where all pairs are of type $\mathbb{R}^2$ and the accessor functions CAR and CAR are of type $\mathbb{R}^2 \to \mathbb{R}$. In this case:

$$\mathcal{J}CARx = (10)$$

$$\mathcal{J}CDRx = (01)$$

$$\mathcal{J}CAR\dot{x}\dot{x} = \dot{x}[1]$$

$$\mathcal{J}CDR\dot{x}\dot{x} = \dot{x}[2]$$

$$(\mathcal{J}CARx)^T \grave{y} = \begin{pmatrix} \grave{y} \\ 0 \end{pmatrix}$$

$$(\mathcal{J}CDRx)^T \grave{y} = \begin{pmatrix} 0 \\ \grave{y} \end{pmatrix}$$

Let us similarly consider comma to be a binary operation of type $((\mathbb{R}^n \to \mathbb{R}) \times (\mathbb{R}^n \to \mathbb{R})) \to (\mathbb{R}^n \to \mathbb{R}^2)$. In this case:

$$(\mathcal{J}f, gx)[i, 1] = (\nabla fx)[i]$$

$$(\mathcal{J}f, gx)[i, 2] = (\nabla gx)[i]$$

$$\mathcal{J}f, gx = \begin{pmatrix} \mathcal{D}_1 fx & \ldots & \mathcal{D}_n fx \\ \mathcal{D}_1 gx & \ldots & \mathcal{D}_n gx \end{pmatrix}$$

$$\mathcal{J}f, g\dot{x}\dot{x} = \begin{pmatrix} \sum_{i=1}^{n} \mathcal{D}_i f\dot{x}\dot{x}[i] \\ \sum_{i=1}^{n} \mathcal{D}_i g\dot{x}\dot{x}[i] \end{pmatrix} = \begin{pmatrix} \mathcal{J}f\dot{x}\dot{x} \\ \mathcal{J}g\dot{x}\dot{x} \end{pmatrix}$$

$$(\mathcal{J}f, gx)^T \grave{y} = \begin{pmatrix} \mathcal{D}_1 f\grave{xy}[1] + \mathcal{D}_1 g\grave{xy}[2] \\ \vdots \\ \mathcal{D}_n f\grave{xy}[1] + \mathcal{D}_n g\grave{xy}[2] \end{pmatrix} = \mathcal{J}f\grave{xy}[1] \oplus \mathcal{J}g\grave{xy}[2]$$

In the above, $\oplus$ denotes vector addition, adding the corresponding elements of two adjoint vectors of the same length to produce an adjoint vector of the same length as the arguments.

1-6 A Functional Language for AD

We now formulate AD for a functional-programming language called VLAD. We have developed VLAD specifically to facilitate AD, though the particular details of VLAD are not necessary for one skilled in the art to make and use such a language. VLAD is similar to SCHEME. The important differences between VLAD and SCHEME that are relevant to this paper are summarized below:

Only functional (side-effect free) constructs are supported.
The only data types supported are the empty list, Booleans, real numbers, pairs, and procedures that take one argument and return one result. Thus VLAD objects are all of the following type:

$$\tau ::= \text{null} | \text{boolean} | \mathbb{R} | \tau_1 \times \tau_2 | \tau_1 \to \tau_2$$

The only primitive procedures that are supported are +, −, *, /, sqrt, exp, log, sin, cos, a tan, =, <, >, <=, zero?, positive?, negative?, null?, Boolean?, real?, pair?, procedure?, car, cdr, and cons. Furthermore, commensurate with the restriction that all procedures take one argument, the procedures +, −, *, /, a tan, =, <, >, <=, and >= are restricted to take a single argument that consists of a pair of real numbers. And the procedure cons takes its arguments in a current fashion.

The primitive procedures in VLAD thus fall into four classes:

procedures u : $\mathbb{R} \to \mathbb{R}$: sqrt, exp, log, sin, and cos.
procedures b : $(\mathbb{R} \times \mathbb{R}) \to \mathbb{R}$: +, −, *, /, and atan.
procedures p : $\tau \to$ boolean : =, <, >, <=, >=, zero?, positive?, negative?, null?, boolean?, real?, pair?, and procedure?.
other : car, cdr, and cons.

We have implemented a prototype of VLAD. While our prototype accepts VLAD programs in SCHEME S-expression notation, in this section of the disclosure, we formulate VLAD programs in a more traditional mathematical notation. The details of this notation are not important to understand this system save the following three issues:

We use [ ] to denote the empty list and $[e_1; \ldots; e_n]$ as shorthand for $e_1, \ldots, e_n, [\,]$.
We use $e_1, e_2$ as shorthand for $(\text{CONS } e_1)e_2$.
We allow lambda expressions to have tuples as parameters as shorthand for the appropriate destructuring. For example:

$$\lambda(x_1, (x_2, x_3)) \ldots x_2 \ldots \rightsquigarrow \lambda x \ldots (CAR(CDRx)) \ldots$$

A key feature of VLAD is that it supports two novel primitive procedures, $\overrightarrow{\mathcal{J}}$ and $\overleftarrow{\mathcal{J}}$, that implement forward- and reverse-mode AD respectively. These are first-class higher-order procedures that map procedures to transformed procedures that perform forward- and reverse-mode AD respectively.

While VLAD supports most of the syntactic forms of SCHEME, namely quote, letrec, let, let*, if, cond, and, and or, a preprocessor translates VLAD in to the pure lambda calculus:

$$\varepsilon ::= x | \varepsilon_1 \varepsilon_2 | \lambda x \varepsilon$$

with a basis procedure IF, using techniques due to Kelsey et al. together with:

$$\text{if } e_1 \text{ then } e_2 \text{ else } e_3 \; f \rightsquigarrow (((IF\ e_1)(\lambda x e_2))(\lambda x e_3))[\,]$$

and replacing quoted constants with references to variables in the top-level closure. For reasons of efficiency and debuggability, the disclosed implementation treats letrec as primitive syntax. In this section of the disclosure, however, we assume that letrec has been translated into code that uses the Y combinator.

In subsections 1-2 through 1-5, both primal and adjoint values were real vectors of the same length. In VLAD, we have a richer set of possible primal values. Thus we need a richer set of possible adjoint values. Just as adjoint vectors are of the same length as the corresponding primal vectors, we want adjoint values in VLAD to be of the same shape as the corresponding primal values. If τ is the type of a primal value, we use $\overline{\tau}$ to denote the type of its adjoint. We refer to $\overline{\tau}$ as the adjoint type of τ. We define $\overline{\tau}$ as follows:

$$\overline{\text{null}} \triangleq \text{null}$$

$$\overline{\text{boolean}} \triangleq \text{null}$$

$$\overline{\mathbb{R}} \triangleq \mathbb{R}$$

$$\overline{\tau_1 \times \tau_2} \triangleq \overline{\tau_1} \times \overline{\tau_2}$$

$$\overline{\tau_1 \to \tau_2} \triangleq \text{null}$$

This guarantees that the shape of an adjoint is the same as its primal by taking the adjoint type of nonreal leaf nodes to be the empty list.

1-7 Forward-Mode AD in a Functional Framework

We now show how to implement $\vec{\mathcal{J}}$ for VLAD. $\vec{\mathcal{J}}$ maps a procedure of type $\tau_1 \to \tau_2$ to a procedure of type $(\tau_1 \times \overline{\tau_1}) \to (\tau_2 \times \overline{\tau_2})$. This transformed procedure maps a forward conjoint to a forward conjoint. Because procedures are first class objects in VLAD and can be stored in aggregate data structures, we generalize $\vec{\mathcal{J}}$ to map any such data structure to a corresponding data structure of the same shape, where the procedure values in that data structure are transformed and the nonprocedure values are left unchanged. If τ is the type of the argument to $\vec{\mathcal{J}}$, we use $\vec{\tau}$ to denote the type of the result from $\vec{\mathcal{J}}$. In other words, $\vec{\mathcal{J}}: \tau \to \vec{\tau}$. We define $\vec{\tau}$ as follows:

$$\vec{\text{null}} \triangleq \text{null}$$

$$\vec{\text{boolean}} \triangleq \text{boolean}$$

$$\vec{\mathbb{R}} \triangleq \mathbb{R}$$

$$\vec{\tau_1 \times \tau_2} \triangleq \vec{\tau_1} \times \vec{\tau_2}$$

$$\vec{\tau_1 \to \tau_2} \triangleq (\tau_1 \times \overline{\tau_1}) \to (\tau_2 \times \overline{\tau_2})$$

We must first define how $\vec{\mathcal{J}}$ transforms each of the primitive procedures. In VLAD, there are four kinds of primitives: unary functions $u: \mathbb{R} \to \mathbb{R}$, binary functions $b: (\mathbb{R} \times \mathbb{R}) \to \mathbb{R}$, predicates $p: \tau \to \text{boolean}$, and the primitives car, cdr, cons and IF. These are transformed as follows:

$$\vec{\mathcal{J}} u \triangleq \lambda(x, \acute{x})(ux), (\mathcal{D} u x \acute{x})$$

$$\vec{\mathcal{J}} b \triangleq \lambda((x_1, x_2), (\acute{x_1}, \acute{x_2}))$$

$$(b(x_1, x_2)), \begin{pmatrix} \mathcal{D}_1 b(x_1, x_2) \acute{x_1} + \\ \mathcal{D}_2 b(x_1, x_2) \acute{x_2} \end{pmatrix}$$

$$\vec{\mathcal{J}} p \triangleq \lambda(x, \acute{x})(px), []$$

$$\vec{\mathcal{J}} CAR \triangleq \lambda((x_1, x_2), (\acute{x_1}, \acute{x_2})) x_1, \acute{x_1}$$

$$\vec{\mathcal{J}} CDR \triangleq \lambda((x_1, x_2), (\acute{x_1}, \acute{x_2})) x_2, \acute{x_2}$$

$$\vec{\mathcal{J}} CONS \triangleq \lambda(x_1, \acute{x_1})(\lambda(x_2, \acute{x_2})(x_1, x_2), (\acute{x_1}, \acute{x_2})), []$$

-continued $$\vec{\mathcal{J}} IF \triangleq \lambda(x_1, \acute{x_1})$$

$$(\lambda x_2(\lambda x_3 \text{ if } x_1 \text{ then } x_2 \text{ else } x_3 \text{ fi}), []),$$

$$[]$$

Note that VLAD has a small finite number of primitives u and b. Thus STALIN∇ can be hardwired with the corresponding $\mathcal{D}$ u, $\mathcal{D}_1$ b, and $\mathcal{D}_2$ b implementations.

All that remains is to show how $\vec{\mathcal{J}}$ transforms user defined procedures. Recall that $\vec{\mathcal{J}}$ is a higher-order procedure. It maps procedures to transformed procedures. In higher-order functional-programming languages, such as VLAD, run-time procedure values are represented as closures. We take such a closure to be a pair of an environment and a lambda expression $\langle\{x_1 \mapsto u_1, \ldots, x_n \mapsto u_n\}, e\rangle$. The environment contains the bindings for all of the free variables in e.

Intuitively, $\vec{\mathcal{J}}$ f returns a procedure that performs an abstract interpretation of f. In this abstract interpretation, all primal values are interpreted abstractly as forward conjoint values and all procedure values are interpreted abstractly to map forward conjoint values to forward conjoint values. Interpreting primal values abstractly as forward conjoint values requires that (a) they be paired with adjoint values and (b) any procedure values nested in the primal be appropriately transformed. We need to guarantee this for two kinds of values that can arise during the abstract interpretation of f. Kind (1) includes those that are passed as the argument to $\vec{\mathcal{J}}$ f and those that arise internally during the abstract interpretation of f. Our transformation of the body of e will guarantee that properties (a) and (b) are met for kind (1). Kind (2) includes the values of free variables in e. Our transformation of the body of e will guarantee that property (a) is met for kind (2). To guarantee that property (b) is met for kind (2), we map $\vec{\mathcal{J}}$ over the closed-over values in f to produce $\vec{\mathcal{J}}$ f:

$$\vec{\mathcal{J}} \langle\{x_1 \mapsto v_1, \ldots, x_n \mapsto v_n\}, e\rangle \triangleq \langle\{x_1 \mapsto \vec{\mathcal{J}} v_1, \ldots, x_n \mapsto \vec{\mathcal{J}} v_n\}, \vec{e}\rangle$$

The transformation $\vec{e}$ is defined as follows:

$$\vec{x} \leadsto x \qquad x \text{ is bound in } e$$

$$\vec{x} \leadsto x, (\underline{0}x) \qquad x \text{ is free in } e$$

$$\overrightarrow{e_1 e_2} \leadsto (CAR \vec{e_1}) \vec{e_2}$$

$$\overrightarrow{\lambda x e'} \leadsto (\lambda x \vec{e'}), []$$

In the above, 0 x denotes an adjoint of the same shape as x, where all real values are replaced with zeros and all nonreal leaf values are replaced with [ ]. The procedure $\underline{0}$ can be defined as follows:

$$\underline{0}x \triangleq \text{if(REAL? } x) \text{ then } 0 \text{ elif(PAIR? } x) \text{ then}(\underline{0}(CARx)), (\underline{0}(CDRx)) \text{else}[] \text{fi}$$

The use of 0 x guarantees that the second transformation rule meets (a2). Note that closed-over values of free variables in f are like constants and the derivative of a constant is zero.

The call to CAR in the third transformation rule is needed because (a) guarantees that all values are interpreted abstractly as conjoints so the primal procedure must be extracted from such a conjoint. The use of [ ], in part, guarantees that the fourth transformation rule meets (a1). Induction guarantees that the first, third, and fourth transformation rules meet (a1) and (b1).

1-8 Reverse-Mode AD in a Functional Framework

We now show how to implement $\overleftarrow{\mathcal{J}}$ for VLAD. $\overleftarrow{\mathcal{J}}$ maps a procedure of type $\tau_1 \to \tau_2$ to a procedure of type $(\tau_1 \times (\overline{\tau_1} \to \overline{\tau_3})) \to (\tau_2 \times (\overline{\tau_2} \to \overline{\tau_3}))$. This transformed procedure maps a reverse conjoint to a reverse conjoint. In the above, $\tau_3$ is a free type variable that is resolved upon application of $\overleftarrow{\mathcal{J}}$ f to an input conjoint that usually contains the identity procedure as the input backpropagator.

For the same reasons as before, we generalize $\overleftarrow{\mathcal{J}}$ to map any data structure to corresponding data structure of the same shape, where the procedure values in that data structure are transformed and the nonprocedure values are left unchanged. If $\tau$ is the type of the argument to $\overleftarrow{\mathcal{J}}$, we use $\overleftarrow{\tau}$ to denote the type of the result from $\overleftarrow{\mathcal{J}}$. In other words, $\overleftarrow{\mathcal{J}}: \tau \to \overleftarrow{\tau}$. We define $\overleftarrow{\tau}$ as follows:

$$\overleftarrow{null} \triangleq null$$
$$\overleftarrow{boolean} \triangleq boolean$$
$$\overleftarrow{\mathbb{R}} \triangleq \mathbb{R}$$
$$\overleftarrow{\tau_1 \times \tau_2} \triangleq \overleftarrow{\tau_1} \times \overleftarrow{\tau_2}$$
$$\overleftarrow{\tau_1 \to \tau_2} \triangleq (\tau_1 \times (\overline{\tau_1} \to \overline{\tau_3})) \to (\tau_2 \times (\overline{\tau_2} \to \overline{\tau_3})).$$

As before, we must first define how $\overleftarrow{\mathcal{J}}$ transforms each of the four kinds of primitive procedures:

$$\overleftarrow{\mathcal{J}} u \triangleq \lambda(x, \bar{x})(ux), (\bar{x}(\mathcal{D}ux))$$
$$\overleftarrow{\mathcal{J}} b \triangleq \lambda((x_1, x_2), \bar{x})(bx_1, x_2), (\bar{x}(\mathcal{D}_1 bx_1, x_2), (\mathcal{D}_2 bx_1, x_2))$$
$$\overleftarrow{\mathcal{J}} p \triangleq \lambda(x, \bar{x})(px), \lambda \bar{y} \underline{0} x$$
$$\overleftarrow{\mathcal{J}} CAR \triangleq \lambda((x_1, x_2), \bar{x})x_1, \lambda \bar{y} \bar{x}(\bar{y}, (\underline{0}x_2))$$
$$\overleftarrow{\mathcal{J}} CDR \triangleq \lambda((x_1, x_2), \bar{x})x_2, \lambda \bar{y} \bar{x}((\underline{0}x_1), \bar{y})$$
$$\overleftarrow{\mathcal{J}} CONS \triangleq \lambda(x_1, \bar{x}_1)(\lambda(x_2, \bar{x}_2)(x_1, x_2), \lambda \bar{y} \bar{x}_1(CAR\bar{y}) \oplus \bar{x}_2(CDR\bar{y})),$$
$$\lambda \bar{y} \bar{x}_1(\underline{0}x_1)$$
$$\overleftarrow{\mathcal{J}} \text{ IF} \triangleq \lambda(x_1, \bar{x}_1)(\lambda x_2 \text{ if } x_1 \text{ then } x_2 \text{ else } x_3 \text{ fi}, \lambda \bar{y}(CDRx_2)(\underline{0}(CARx_2))),$$
$$\lambda \bar{y} \bar{x}_1(\underline{0}x_1)$$

Note that VLAD has a small finite number of primitives u and b. Thus STALIN∇ can be hardwired with the corresponding $\mathcal{D}$ u, $\mathcal{D}_1$ b, and $\mathcal{D}_2$ b implementations.

The ⊕ procedure, used in the above, generalizes vector addition to arbitrary VLAD adjoints. Just like vector addition adds the corresponding elements of two adjoint vectors of the same length to produce an adjoint vector of the same length as the arguments, ⊕ adds the corresponding elements of two adjoints of the same type to produce an adjoint of the same type as the arguments. It can be defined as follows:

$$x_1 \oplus x_2 \triangleq \text{if Null?} x_1 \text{ then } [] \text{ elif REAL?} x_1 \text{ then } x_1 +$$
$$x_2 \text{ else } (CARx_1 \oplus CARx_2), (CDRx_1 \oplus CDRx_2) fi$$

$\overleftarrow{\mathcal{J}}$ transforms closures much in the same way $\overrightarrow{\mathcal{J}}$:

$$\overleftarrow{\mathcal{J}} \langle \{x_1 \mapsto v_1, \ldots, x_n \mapsto v_n\}, e \rangle \triangleq \langle \{x_1 \mapsto \overleftarrow{\mathcal{J}} v_1, \ldots, x_n \mapsto \overleftarrow{\mathcal{J}} v_n\}, \overleftarrow{e} \rangle$$

The transformation $\overleftarrow{e}$ is defined as follows:

$$\overleftarrow{x} \rightsquigarrow x \qquad x \text{ is bound in } e$$
$$\overleftarrow{x} \rightsquigarrow x, \lambda y (CDRx_0)(\underline{0}(CARx_0)) \qquad x \text{ is free in } e$$
$$\overleftarrow{e_1 e_2} \rightsquigarrow (CAR\overleftarrow{e_1})\overleftarrow{e_2}$$
$$\overleftarrow{\lambda x e'} \rightsquigarrow (\lambda x \overleftarrow{e'}), \lambda y (CDRx_0)(\underline{0}(CARx_0))$$

where $e = \lambda x_0 e'$.

While the above implementation of $\overleftarrow{\mathcal{J}}$ is sound, it suffers from an efficiency problem. Consider a procedure f whose argument x is referenced multiple times. Calling the output backpropagator of $\overleftarrow{\mathcal{J}}$ f will call the input backpropagator $\bar{x}$ each time x is referenced, accumulating the results with ⊕. This can lead to code for the adjoint computation that is exponentially slower than code for the primal computation, as illustrated by the following:

$$\lambda x_0 \text{ let } x_1 \triangleq x_0 + x_0;$$
$$x_2 \triangleq x_1 + x_1;$$
$$\vdots$$
$$x_n \triangleq x_{n-1} + x_{n-1}$$
$$\text{in } x_n \text{ end}$$

The implementation of $\overrightarrow{\mathcal{J}}$ has the property that $\overrightarrow{\mathcal{J}}$ f has the same asymptotic time complexity as f. We desire the same property to hold of $\overleftarrow{\mathcal{J}}$.

We can solve this problem by defining the following procedure:

$$FAN \triangleq \lambda f \lambda x f(x, x)$$

We can then perform fanout conversion on the procedures passed to $\overleftarrow{\mathcal{J}}$. This process is illustrated by the following example:

$$\lambda x x + x + x \rightsquigarrow$$
$$\lambda x \text{ FAN } (\lambda(x_1, x) \text{ FAN } (\lambda(x_2, x_3)x_1 + x_2 + x_3)x)x$$

It is easy to see that fanout conversion preserves the semantics of transformed procedures. Since FAN is a user-defined procedure, it can be transformed with $\overset{\leftarrow}{\mathcal{J}}$. Doing so, however, will lead to two invocations of the input backpropagator while invoking the backpropagator of $\overset{\leftarrow}{\mathcal{J}}$ CONS when invoking backpropagator produced by the transformation of x,x in the definition of FAN. We can, however, special case the transformation of FAN as follows:

$$\overset{\leftarrow}{\mathcal{J}} \text{ FAN} \overset{\Delta}{=}$$
$$\lambda(f, \overleftarrow{f})(\lambda(x, \tilde{x}) \text{ let } \hat{y} \overset{\Delta}{=} f(x, x), 1;$$
$$y \overset{\Delta}{=} CAR\hat{y};$$
$$\tilde{y} \overset{\Delta}{=} CDR\hat{y}$$
$$\text{in } y, \lambda \overleftarrow{y} \text{ let } \overleftarrow{x} \overset{\Delta}{=} \tilde{y}\overleftarrow{y}$$
$$\text{in } \tilde{x}(CAR\overleftarrow{x} \oplus CDR\overleftarrow{x})$$
$$\text{end end}),$$
$$\lambda \overleftarrow{y} \overleftarrow{f} \underline{0} f$$

Doing so preserves the semantics of $\overset{\leftarrow}{\mathcal{J}}$ FAN but leads to backpropagators that have the same asymptotic time complexity as the corresponding primal calculation.

1-9 EXAMPLES

We now motivate our approach with a series of examples that illustrate points 1 through 7 from section 1. These examples have obvious numerical deficiencies. They are intended only to illustrate the power of combining AD with functional programming, not as production code. More robust methods are possible but do not differ in spirit from what we show here. Nonetheless, many of these examples run in our preliminary implementation.

One can compute the derivative of a univariate function in forward mode with:

$$\mathcal{D}f \overset{\Delta}{=} \lambda x \; CDR (\overrightarrow{\mathcal{J}} fx, 1)$$

and in reverse mode with:

$$\mathcal{D}f \overset{\Delta}{=} \lambda x \; CDR (\overleftarrow{\mathcal{J}} fx, 1)1$$

Note that forward mode is more efficient for computing the derivative of a univariate function than reverse mode. One can then find the root of a univariate function with the Newton-Raphson method:

$$\text{ROOT } f, x, \epsilon \overset{\Delta}{=} \text{let } x' \overset{\Delta}{=} x - \frac{x}{\mathcal{D}fx}$$
$$\text{in if } |x - x'| \le \epsilon$$
$$\text{then } x$$
$$\text{else ROOT } f, x', \epsilon \text{ fi end}$$

Note that one can use either forward mode or reverse mode to compute the derivative of f in the above, as they are interchangeable. One can then implement a univariate optimizer as:

$$\text{ARGMIN} f, x, \epsilon \overset{\Delta}{=} \text{ROOT}(\mathcal{D}^2 f), x, \epsilon$$

Note that this involves computing the second derivative of f and illustrates that we can take derivatives of derivatives. Note that we can independently chose to use forward mode or reverse mode to compute each of the derivatives in the above. We can apply either forward mode or reverse mode to the output of either forward mode or reverse mode. One can then compute the gradient of a multivariate function in forward mode with:

$$\nabla f \overset{\Delta}{=} \lambda x \text{ let } n \overset{\Delta}{=} \text{LENGTH } x$$
$$\text{in MAP } (\lambda i CDR(\overrightarrow{\mathcal{J}} fx, (e1, i, n))),$$
$$(in) \text{ end}$$

and in reverse mode with:

$$\nabla f \overset{\Delta}{=} \lambda x \; CDR (\overleftarrow{\mathcal{J}} fx, 1)1$$

In the above, e x, i, n denotes the list of length n with x in position i and zeros elsewhere and i n denotes the list [1; . . . ; n]. Note that reverse mode is more efficient for computing the gradient of a multivariate function than forward mode. One can now implement gradient descent with:

$$\text{GRADIENTDESCENT} f, x, \epsilon \overset{\Delta}{=}$$
$$\text{let } g \overset{\Delta}{=} \nabla f \; x$$
$$\text{in if } \|g\| \le \epsilon$$
$$\text{then } x$$
$$\text{else GRADIENTDESCENT}$$
$$f,$$
$$(x +$$
$$\text{ARGMIN}(\lambda k f(x + kg)), 0, \epsilon \; g),$$
$$\epsilon \; fi \text{ end}$$

Note that one can either forward mode or reverse mode to compute the gradient of f in the above, as they are interchangeable. We can invert a univariate function with:

$$f^{-1} \overset{\Delta}{=} \lambda y \; \text{ROOT } (\lambda x|(fx) - y|), x_0, \epsilon$$

for appropriate values of $x_0$ and $\epsilon$.

Now we can implement a pair of interacting rational agents, A and B. First, let us implement agent B. We model the world with w:state×action→state. Agent B perceives the world through $p_B$: state→observation and has a reward function $r_B$: observation→$\mathbb{R}$. Given the current state s, agent B wishes to choose that action a that maximizes $r_B p_B w$ s, a. But agent B doesn't have s, w, $p_B$, and $r_B$. It has an observation $o = p_B$ s and models $w_B$, $p_{BB}$, $r_{BB}$ of w, $p_B$, and $r_B$ respectively. The optimal behavior of agent B can be computed with:

$$\text{AGENT } w_B, p_{BB}, r_{BB}, o \triangleq$$
$$\text{ARGMAX}(\lambda a r_{BB} p_{BB} w_B(p_{BB}^{-1} o), a) a_0, \epsilon$$

for appropriate values of $a_0$ and $\epsilon$.

Now let us model the interaction of agents A and B. Agent A is going to perform an action then agent B is going to perform an action. Agent A perceives the world through $P_A$: state→observation and has a reward function $r_A$: observation→$\mathbb{R}$. Given the current state s, agent A wishes to choose that action a that maximizes:

$$r_A p_A w(ws, a),$$
$$(\text{argmax}_a, r_{BB} p_{BB} w_B(p_{BB}^{-1} p_B ws, a), a'$$

But agent A doesn't have s, w, $w_B$, $p_A$, $p_B$, $p_{BB}$, $\tau_A$, and $\tau_{BB}$. It has an observation $o = p_A s$ and models $w_A$, $w_{AB}$, $p_{AA}$, $p_{AB}$, $p_{ABB}$, $\tau_{AA}$, and $\tau_{ABB}$ of w, $w_B$, $p_A$, $P_B$, $P_{BB}$, $\tau_A$, and $\tau_{BB}$ respectively. The optimal behavior of agent A can be computed with $$DOUBLEAGENT w_A, w_{AB}, p_{AA}, p_{AB}, p_{ABB},$$
$$r_{AA}, r_{ABB}, o \triangleq$$
ARGMAX
$$(\lambda a r_{AA}$$
$$p_{AA}$$
$$w_A(w_A(p_{AA}^{-1} o), a),$$
$$(\text{ARGMAX}$$
$$(\lambda a' r_{ABB}$$
$$p_{ABB}$$
$$w_{AB} p_{ABB}^{-1}$$
$$p_{AB}$$
$$(w_A(p_{AA}^{-1} o),$$
$$a),$$
$$a'),$$
$$a_0, \epsilon)),$$
$$a_0, \epsilon$$

for appropriate values of $a_0$ and $\epsilon$. The above optimizes a function which involves optimization. This requires taking the derivative of the optimizer which itself takes a derivative.

Reverse-mode AD is a generalization of backpropagation in neural networks (Rumelhart et al., 1986). (Hence the name 'backpropagator' for $\tilde{x}$.) Within our framework, it is easy to formulate training algorithms for neural networks. One can define a neuron as:

$$\text{NEURON } w, x \triangleq \text{SIGMOID } (w \cdot x)$$

One can then define a network of neurons as:

$$NEURALNET w, x \triangleq \text{Neuron } w'', \ldots (NEURON\ w', x') \ldots$$

by combining calls to NEURON on various subsets, w' and x', of the weights and inputs. Given a training set of input/output pairs, $x_i$, $y_i$, one can formulate an error function:

$$\text{ERROR } w \triangleq$$
$$\|[y_1; \ldots; y_n] - [NEURALNET w, x_1; \ldots; NEURALNET w, x_n]\|$$

One can train the weights by calling GRADIENTDESCENT ERROR, $w'_0$, $\epsilon$ or any other optimizer.

One can apply our method to other machine-learning tasks such as training hidden Markov models and probabilistic context-free grammars. One can implement a likelihood calculation P(s|G), the probability that a grammar G generates a string s, using the familiar forward-backward algorithm for HMMs or inside-outside algorithm for PCFGs. One can then formulate maximum-likelihood (ML) parameter estimation for a training set S as:

$$\text{ARGMAX}\left(\lambda G \prod_{\varepsilon \in S} P(s|G)\right), G_0, \epsilon$$

Note that this does not use the traditional Baum-Welch (Baum, 1972; Baum et al., 1970) or Expectation-Maximization (EM; Dempster et al., 1977) reestimation procedure but instead directly optimizes the likelihood function. This is useful when closed-form E or M steps do not exist.

In some sense, our method is the most general gradient-based supervised machine-learning model fit. One can take any suitably differentiable model f, represented as an arbitrarily complex program, expose the free parameters w of that model, as inputs, along with the primary inputs x, take a training set of input/output pairs $x_i$, $y_i$, and optimize an error function:

$$\text{ERROR } w \triangleq \|[y_1; \ldots; y_n] - [fw, x_1; \ldots; fw, x_n]\|$$

Again, one can train the weights by calling GRADIENTDESCENT ERROR, $w_0$, $\epsilon$ or any other optimizer. Thus we anticipate that our work will have significant impact on the field of machine learning.

We also anticipate that our work will have significant impact on the fields of scientific computing and engineering design. Consider the following example. We can regard most PDE solvers as starting with a guess for the solution to a PDE and iterating an error-reducing function until a sufficiently accurate solution is achieved. Consider a procedure for calculating the performance of a given wing shape:

PERFORMANCE *SPLINECONTROLPOINTS* $\triangleq$ let WING $\triangleq$ *SPLINETOSURFACE*

*SPLINECONTROLPOINTS*,

-continued $$\text{AIRFLOW} \triangleq PDE_{SOLVER}$$
$$\text{WING, } NAVIERSTOKES;$$
$$\text{LIFT, DRAG} \triangleq SURFACEINTEGRAL$$
$$\text{WING, AIRFLOW, FORCE}$$
$$\text{in } DESIGNMETRIC \text{ LIFT, DRAG, (WEIGHT WING)}$$
end One can design a wing with optimal performance by calling GRADIENTDESCENT
PERFORMANCE, $\text{SPLINECONTROLPOINTS}_0$, $\in$
or any other optimizer. Computing the derivatives of PERFORMANCE requires computing the derivative of complex programs, such as SPLINETOSURFACE, PDESOLVER, NAVIERSTOKES, SURFACEINTEGRAL, DESIGNMETRIC, and WEIGHT, may of which, in turn compute derivatives.

1-10 DISCUSSION

This paper makes eight key technical contributions:
1. We have made the AD operators first-class function objects.
2. We have made the arguments and results of AD operators first-class function objections.
3. We have generalized AD operators to other types. The traditional AD operators apply to functions from real vectors to real vectors:

$$\mathcal{J}: (\mathbb{R}^n \to \mathbb{R}^m) \to$$
$$((\mathbb{R}^n \times \mathbb{R}^n) \to (\mathbb{R}^m \times \mathbb{R}^m))$$
$$\mathcal{J}: (\mathbb{R}^n \to \mathbb{R}^m) \to$$
$$((\mathbb{R}^n \times (\mathbb{R}^n \to \mathbb{R}^1)) \to (\mathbb{R}^m \times (\mathbb{R}^m \to \mathbb{R}^1)))$$

In this paper, we have extended the notion of derivative to apply to functions with more general argument and result types:

$$\mathcal{J}: (\tau_1 \to \tau_2) \to ((\tau_1 \times \overline{\tau_1}) \to (\tau_2 \times \overline{\tau_2}))$$
$$\mathcal{J}: (\tau_1 \to \tau_2) \to ((\tau_1 \times (\overline{\tau_1} \to \overline{\tau_3})) \to (\tau_2 \times (\overline{\tau_2} \to \overline{\tau_3})))$$

We have three particular extensions. First, the arguments and results can be tree-structured data instead of vectors. Second, these trees can contain discrete values in addition to continuous values. Third, these trees can contain functions in addition to ground values. The later implies that we can take derivatives of higher-order functions.
4. We have generalized AD operators to apply to trees that contain functions, not just functions. In other words, instead of:

$$\mathcal{J}: (\tau_1 \to \tau_2) \to \overrightarrow{(\tau_1 \to \tau_2)}$$
$$\mathcal{J}: (\tau_1 \to \tau_2) \to \overleftarrow{(\tau_1 \to \tau_2)}$$

we have:

$$\mathcal{J}: \tau \to \vec{\tau}$$
$$\mathcal{J}: \tau \to \overleftarrow{\tau}$$

5. We represent the 'tape' of traditional reverse-mode AD using closures and tail calls.
6. We present methods for taking the derivative of any lambda expression over a basis with known derivatives. That derivative is, in turn, a lambda expression over the same basis.

In the standard undergraduate math curriculum, we learn that the derivative has interesting closure properties over certain function classes. These classes are by and large uncountably infinite and defined by properties of their member functions, e.g. Lipshitz conditions. There is another class of functions which have an interesting closure property under differentiation which is explored implicitly, but not generally discussed. These are functions are defined by expressions using a standard expression language over a basis set of elementary and transcendental functions: addition, multiplication, sin, log, etc. We learn rules allowing one to mechanically construct the derivative of any such expression. We might easily cast this as a constructive closure proof which uses induction over expressions. Such a proof could be easily formalized using the machinery of programming-language semantics to give meaning to the expression language and the derivative transformation, In fact, the nub of this idea is at the heart of the symbolic-differentiator homework assigned in most introductory SCHEME courses.

Unfortunately the closure properties of differentiation on the class of functions that can be written as expressions are appealing mathematically, but have a glaring flaw to the computer scientist: a dramatic increase in complexity. This is because an expression can grow exponentially under differentiation. One way of looking at the simplest sort of AD is as a different way to represent members of this function class. Any function that can be written as an expression can also be written as a straightline code, and vice versa. Although these two representations give the same function class, some functions can be expressed enormously more efficiently as straightline code. Moreover, derivatives have much more appealing complexity closure properties when functions in this class are represented as straightline code: the derivative represented procedurally as straightline code is only a small constant factor longer than the original function, itself represented as straightline code. This holds for both the forward- and reverse-mode AD transformations. Some tighter complexity-related closure properties Some tighter complexity-related closure properties apply to AD. For instance, both the forward- and reverse-mode AD transformations are safe-for-time, in that the adjoint functions produced by these transformations require only a small constant factor times as many operations as the primal functions. However, although the forward-mode AD transformation is also safe-forspace, increasing the required storage by less than a factor of two, the reverse-mode AD transformation is not safe-for-space, because of the need to close over the intermediate results of the primal calculation.

7. We introduce fanout conversion to allow reverse-mode AD to preserve asymptotic time complexity.
8. We introduce the notion of mapping a procedure over the values of closed-over variables in a closure to produce another closure. We use this to construct abstract interpreters. The forward- and reverse-mode transformations are formulated, in part, using this notion. Using techniques beyond the scope of this paper, it is possible to formulate the forward- and reverse-mode transformations solely in terms of this notion, without any expression rewriting.

1-11 CONCLUSION

Our preliminary implementation of STALIN∇ is an interpreter, though those skilled in the art will be able to convert the system into a compiler without substantial experimentation. We have constructed this interpreter to help debug and validate the forward- and reverse-mode transformations. It operates by treating all primitives (even + and IF) as variables that are bound to primitives in the top-level closure. This allows an AD operator to transform code by mapping an argument closure to a result closure with different bindings for those primitives that map them to transformed operations. Simple but inefficient implementations would require a level of indirection and procedure call through closure bindings for all primitive operations. One approach to mitigate such inefficiency is to have AD operators perform runtime (i.e. just-in-time or JIT) compilation of closures in the context of the transformed bindings. Another approach is to perform static compile-time analysis to determine the bindings for variables, when possible, and generate code, when possible, with such bindings inlined. Such static-analysis techniques include compiling in continuation-passing style (Appel, 1992), type inference and type-directed code generation (Milner, 1978; Tarditi et al., 1996), lifetime and analysis (Deutsch, 1990; Tofte and Talpin, 1994; Jagannathan et al., 1998), lightweight closure conversion (Steckler and Wand, 1997), and polyvariant flow analysis (Shivers, 1991; Heintze, 1994).

We have implemented a highly optimizing compiler for SCHEME, called STALIN, that uses many of these techniques including polyvariant flow analysis, alias analysis, lifetime analysis, lightweight closure conversion, unboxing, inlining, tag stripping, tag-check elimination, and region-based storage management (Siskind, 1999). STALIN was designed to allow compute-intensive numerical programs to be written in a functional-programming language. It compiles away much of the overhead that functional-programming languages wrap around low-level numerical primitives and generates code that is competitive with, and often surpasses, numerical code written in FORTRAN and C. STALIN is used regularly to perform compute-intensive numerical experiments for other research projects. We believe that the techniques used in STALIN can be adapted and extended to compile equivalently efficient code within a functional AD framework. Our major goal in extending this work is to revise the implementation of STALIN∇ to use compilation techniques from STALIN.

We have presented a novel synthesis of the differential calculus (Leibnitz, 1664; Newton, 1704) with the lambda calculus (Church, 1941). Formulating AD within the framework of functional programming using this synthesis offers a number of advantages over traditional AD formulations:

1. Functional programs represent the underlying mathematical notions more closely than imperative programs.
2. Our formulation allows a library of functions to be built compositionally.
3. Allowing the callee, instead of the caller, to specify the necessary AD, fosters greater modularity.
4. Formulating AD operators as higher-order functions makes generation of higher-order derivatives straightforward.
5. Formulating differential forms as first-class functions allows expression of programming patterns which can be instantiated with different differential forms for different uses.
6. Gradients can even be taken through processes that themselves involve AD-based optimization or PDE solution, allowing the optimization of functions specified as complex processes.
7. Our methods are amenable to compilation techniques that generate extremely efficient code.

2 Perturbation Confusion and Referential Transparency

It is tempting to incorporate differentiation operators into functional-programming languages. Making them first-class citizens, however, is an enterprise fraught with danger. We discuss a potential problem with forward-mode AD common to many AD systems, including all attempts to integrate a forward-mode AD operator into Haskell. In particular, we show how these implementations fail to preserve referential transparency, and can compute grossly incorrect results when the differentiation operator is applied to a function that itself uses that operator.

The underlying cause of this problem is perturbation confusion, a failure to distinguish between distinct perturbations introduced by distinct invocations of the differentiation operator. We then discuss how perturbation confusion can be avoided.

2-1 Introduction

Referential transparency is the battle cry of the non-strict functional programming community. A subtle issue with referential transparency can arise when a derivative-taking operator is combined with functional programming. As an illustration of the issue consider the following expression, whose value should obviously be 1.

$$\frac{d}{dx}\left(x\left(\frac{d}{dy}x+y\bigg|_{y=1}\right)\right)\bigg|_{x=1} \stackrel{?}{=} 2$$

This would be expressed in a functional-programming language as $$\mathcal{D}(\lambda x \cdot x \times (\mathcal{D}(\lambda y, x+y)1))1$$

where x indicates multiplication and $\mathcal{D}$ is a derivative-taking operator.

$$\mathcal{D}fc = \frac{d}{dx}f(x)\bigg|_{x=c}$$

Automatic Differentiation (AD) is an established enterprise for calculating derivatives of functions expressed as computer programs (Griewank 2000). Forward-mode AD (Wengert 1964) implements $\mathcal{D}$ by evaluating f (c+∈) under an abstract interpretation that associates a conceptually infinitesimal perturbation with each real number, propagates them according to the rules of calculus (Leibnitz 1664; Newton 1704), and extracts the perturbation of the result.

To see how this works, let us manually apply the mechanism to a simple expression. We use x+x'∈ to denote x with associated perturbation x', by analogy with the standard $a+b_i$ for complex numbers.

$$\frac{d}{dx}x^2 + x + 1\bigg|_{x=3} = \mathcal{D}(\lambda x \cdot x \times x + x + 1)3$$

$$= \varepsilon((\lambda x \cdot x \times x + x + 1)(3 + \varepsilon))$$

$$= \varepsilon((3 + \varepsilon) \times (3 + \varepsilon) + (3 + \varepsilon) + 1)$$

$$= \varepsilon((9 + 6\varepsilon) + (3 + \varepsilon) + 1)$$

$$= \varepsilon(13 + 7\varepsilon)$$

$$= 7$$

where $\varepsilon(x+x'\varepsilon) \triangleq x'$ and $\mathcal{D}\ f\ c \triangleq \varepsilon(f(c+\varepsilon))$. This is the essence of forward-mode AD.

2-2 Perturbation Confusion

We can now evaluate (2) using this machinery.

$$\mathcal{D}(\lambda x \cdot x \times (\mathcal{D}(\lambda y \cdot x + y)1))1$$

$$= \varepsilon((\lambda x \cdot x \times (\mathcal{D}(\lambda y \cdot x + y)1))(1+\varepsilon)) \quad (4)$$

$$= \varepsilon((1+\varepsilon) \times (\mathcal{D}(\lambda y \cdot (1+\varepsilon) + y)1)) \quad (5)$$

$$= \varepsilon((1+\varepsilon) \times (\varepsilon((\lambda y \cdot (1+\varepsilon) + y)(1+\varepsilon)))) \quad (6)$$

$$= \varepsilon((1+\varepsilon) \times (\varepsilon((1+\varepsilon) + (1+\varepsilon)))) \quad (7)$$

$$= \varepsilon((1+\varepsilon) \times (\varepsilon(2 + 2\varepsilon))) \quad (8)$$

$$= \varepsilon((1+\varepsilon) \times 2) \quad (9)$$

$$= \varepsilon(2 + 2\varepsilon) \quad (10)$$

$$= 2 \quad (11)$$

$$\neq 1$$

Certain existing AD implementations exhibit this problem; see Appendix A. The underlying issue is perturbation confusion, a failure (at step 8) to distinguish between distinct perturbations introduced by distinct invocations of $\mathcal{D}$.

2-3 Tagging Avoids Perturbation Confusion

One way to remedy perturbation confusion is to define:

$$\mathcal{D}\ f c \triangleq \mathcal{E}_t(f(c + \varepsilon_t)) \quad (12)$$

where t is a tag unique to each invocation of $\mathcal{D}$, and define $$\mathcal{E}_t(x + x'\varepsilon_t) \triangleq x' \quad (13)$$

to extract only the correspondingly tagged perturbation, ignoring any others; see Appendix C. We can evaluate (2) using these tags.

$$\mathcal{D}(\lambda x \cdot x \times (\mathcal{D}(\lambda y \cdot x + y)1))1 = \mathcal{E}_a((\lambda x \cdot x \times (\mathcal{D}(\lambda y \cdot x + y)1))(1 + \varepsilon_a)) \quad (14)$$

$$= \mathcal{E}_a((1+\varepsilon_a) \times (\mathcal{D}(\lambda y \cdot (1+\varepsilon_a) + y)1)) \quad (15)$$

$$= \mathcal{E}_a((1+\varepsilon_a) \times (\mathcal{E}_b((\lambda y \cdot (1+\varepsilon_a) + y)(1+\varepsilon_b)))) \quad (16)$$

$$= \mathcal{E}_a((1+\varepsilon_a) \times (\mathcal{E}_b((1+\varepsilon_a) + (1+\varepsilon_b)))) \quad (17)$$

$$= \mathcal{E}_a((1+\varepsilon_a) \times (\mathcal{E}_b(2 + \varepsilon_a + \varepsilon_b))) \quad (18)$$

$$= \mathcal{E}_a((1+\varepsilon_a) \times 1) \quad (19)$$

$$= \mathcal{E}_a(1 + \varepsilon_a) \quad (20)$$

$$= 1 \quad (21)$$

Note how the erroneous addition of distinct perturbations (step 8) is circumvented at the corresponding point here (step 18).

2-4 Referential Transparency

Perturbation confusion can violate referential transparency. Consider $$cx \triangleq \mathcal{D}(\lambda y \cdot x + y)1$$

which should have a constant value of 1 regardless of its numeric argument x. Therefore $\lambda x \cdot x \times (c\ x)$ and $\lambda x \cdot x \times 1$ should both denote the identity function for numbers. However, as seen above and in Appendix A, $$\mathcal{D}(\lambda x \cdot x \times (cx))1$$

and $$\mathcal{D}(\lambda x \cdot x \times 1)1$$

yield different results when distinct perturbations are not distinguished.

2-5 Related Work

Forward-mode AD was implemented in SCHEME as part of the SCMUTILS package included in the instructional materials associated with a textbook on classical mechanics. SCMUTILS is neither documented nor published, but examination of its uncommented source code reveals an explicit tagging mechanism to distinguish distinct perturbations, and SCMUTILS correctly evaluates (2).

Explicit tagging of the sort described above is impossible to implement in a purely functional language. Such explicit tagging, however, is not necessary to remedy perturbation confusion. A broad class of implemented forward-mode AD systems operate by performing a static abstract interpretation of the original program, to pair perturbations with real values, via a source-to-source transformation, overloading, or some combination of the two. Source-to-source transformation can be performed inter alia by a preprocessor, as in ADIFOR and ADIMAT, or by an ad-hoc reflective mechanism in an underlying interpreter, as in GRADIENT.

2-6 Static Avoidance of Perturbation Confusion

Static abstract interpretation using a source-to-source transformation can remedy perturbation confusion in a functional framework. The general idea is to wrap n calls to lift around each numeric variable reference made inside the function passed to the d operator, where n is the number of calls to d that intervene between that variable's definition and its reference. Doing this transforms constant_one $x = d(\backslash y \rightarrow x + y)1$ $d(\backslash x \rightarrow x * (\text{constant\_one } x))1$ into constant_one $x = d(\backslash y \rightarrow \boxed{(\text{lift } x)} + y)1$ $d(\backslash x \rightarrow x * (\text{constant\_one } x))1$ which yields the correct result; see Appendix D. This cannot be done automatically in HASKELL, but requires a preprocessor. In general, determining the value of each such n requires sophisticated non-local analysis, unless the program is written in an extremely restrictive style to make each such n apparent. Further complications arise when attempting to lift aggregate data objects that contain numeric values and when different control-flow paths to a variable reference can lead to different values of n.

An implementation of AD in a functional framework which incorporates both forward-mode and reverse-mode and supports arbitrary nested application of AD operators has been developed by the authors. Instead of tagging, source-to-source transformations are used to avoid perturbation confusion. The system performs these transformations using a simple reflective API. (2) can be coded directly and transparently in this system as (define(derivative $fx$)(tangent(($j*f$)(bundle× 1))))

(derivative (lambda($x$)(∗ $x$(derivative(lambda($y$) (+$xy$)) 1))) 1)

which yields the correct result.
Appendices for Section 2
   Appendix 2-A. Incorrect Implementation in HASKELL
   One would naturally want to write constant_one $x = d(\backslash y \rightarrow x + y)1$ $d(\backslash x \rightarrow x*(\text{constant\_one } x))1$ However the above yields a type violation at the expression $x*(\text{constant\_one } x)$ This is because Haskell only automatically coerces constants, not the results of other kinds of expressions. Such automatic coercion can be manually stimulated by inserting an appropriate coercion operator at the point of type violation.

constant_one $x = d(\backslash y \rightarrow x + y)1$ $d(\backslash x \rightarrow x*\boxed{\text{lift(constant\_one } x)})1$ Note however that while this is now type correct, it yields an incorrect result. A system that automatically introduced such coercions would also necessarily suffer from such perturbation confusion.

```
data Num a => Bundle a = Bundle a a
instance Num a => Show (Bundle a) where
    showsPrec p (Bundle x x') = showsPrec p [x,x']
instance Num a => Eq (Bundle a) where
    (Bundle x x') == (Bundle y y') = (x == y)
lift z = Bundle z 0
instance Num a => Num (Bundle a) where
    (Bundle x x') + (Bundle y y') = Bundle (x + y) (x' + y')
    (Bundle x x') * (Bundle y y') = Bundle (x * y) (x * y' + x' * y)
    fromInteger z = lift (fromInteger z)
```

-continued

```
instance Fractional a => Fractional (Bundle a) where
    fromRational z = lift (fromRational z)
i f x = let (Bundle y y') = f (Bundle x 1) in y'
constant_one x = d (\y -> x + y) 1
should_be_one_a = d (\x -> x * (lift (constant_one x))) 1
should_be_one_b = d (\x -> x * (lift 1                )) 1
violation_of_referential_transparency = should_be_one_a /=
should_be_one_b
```

Appendix 2-B. Similar Incorrect Implementation in SCHEME

The same method can be implemented in SCHEME, where it exhibits the same problem.

```
(define primal cadr)
(define tangent caddr)
(define (bundle primal tangent) (list 'bundle primal tangent))
(define bundle?
  (let ((pair? pair?)) (lambda (x) (and (pair? x) (eq? (car x) 'bundle)))))
(set! pair? (lambda (x) (and (pair? x) (not (bundle? x)))))
(define (lift-real x) (bundle x 0))
(define (lift-real->real f df/dx)
  (letrec ((self (lambda (x)
          (if (bundle? x)
              (bundle (self (primal x))
                  (* (df/dx (primal x)) (tangent x)))
              (f x)))))
  self))
(define (lift-real*real->real f df/dx1 df/dx2)
  (letrec ((self
        (lambda (x1 x2)
          (if (bundle? x1)
              (if (bundle? x2)
                  (bundle
                    (self (primal x1) (primal x2))
                    (+ (* (df/dx1 (primal x1) (primal x2))
                        (tangent x1))
                      (* (df/dx2 (primal x1) (primal x2))
                        (tangent x2))))
                  (self x1 (lift-real x2)))
              (if (bundle? x2)
                  (self (lift-real x1) x2)
                  (f x1 x2))))))
    self))
(define (lift-real->boolean f)
  (letrec ((self (lambda (x) (if (bundle? x) (self (primal x)) (f x)))))
    self))
(define (lift-real*real->boolean f)
  (letrec ((self (lambda (x1 x2)
          (if (bundle? x1)
              (if (bundle? x2)
                  (self (primal x1) (primal x2))
                  (self (primal x1) x2))
              (if (bundle? x2) (self x1 (primal x2)) (f x1 x2))))))
    self))
;;; Overloads not needed for this example are omitted.
(set! + (lift-real*real->real + (lambda (x1 x2) 1) (lambda (x1 x2) 1)))
(set! * (lift-real*real->real * (lambda (x1 x2) x2) (lambda (x1 x2) x1)))
(define (derivative f)
  (lambda (x) (let ((y (f (bundle x 1)))) (if (bundle? y) (tangent y) 0))))
(define should-be-one
  ((derivative (lambda (x) (* x ((derivative (lambda (y) (+ x y))) 1)))) 1))
```

Appendix 2-C. Corrected Implementation in SCHEME

Definitions of primal, tangent, bundle?, pair?, lift-real-> boolean, and lift-real*real->boolean, the overloads, and should-be-one are unchanged from Appendix B. Boxes indicate additions and modifications.

```
(define tag cadddr)
(define (bundle tag primal tangent) (list 'bundle primal tangent tag ))
(define make-tag (let ((tag 0)) (lambda ( ) (set! tag (+ tag 1)) tag)))
(define (lift-real tag x) (bundle tag x 0))
(define (in? t x) (and (bundle? x) (or (= (tag x) t) (in? t (primal x)))))
(define (lift-real→real f df/dx)
  (letrec ((self (lambda (x)
                   (if (bundle? x)
                       (bundle (tag x)
                               (self (primal x))
                               (* (df/dx (primal x)) (tangent x)))
                       (f x)))))
    self))
(define (lift-real*real→real f df/dx1 df/dx2)
  (letrec ((self
            (lambda (x1 x2)
              (if (bundle? x1)
                  (if (bundle? x2)
                      (if (= (tag x1) (tag x2))
                          (bundle
                           (tag x1)
                           (self (primal x1) (primal x2))
                           (+ (* (df/dx1 (primal x1) (primal x2))
                                 (tangent x1))
                              (* (df/dx2 (primal x1) (primal x2))
                                 (tangent x2))))
                          (if (in? (tag x1) x2)
                              (self (lift-real (tag x2) x1) x2)
                              (self x1 (lift-real (tag x1) x2))))
                      (self x1 (lift-real (tag x1) x2)))
                  (if (bundle? x2)
                      (self (lift-real (tag x2) ) x1 x2)
                      (f x1 x2))))))
    self))
(define (e-t t x)
  (if (bundle? x) (if (= (tag x) t) (tangent x) (e-t t (primal x))) 0))
(define (derivative f)
  (lambda (x) (let ((t (make-tag))) (e-t t (f (bundle t x 1))))))
```

Appendix 2-D. Corrected Implementation in Haskell

It is possible to correct the problem by manually inserting a coercion operation (lift). A method for determining where these are needed is discussed in Section 6. This method only applies to code written so as to maintain a number of very restrictive static properties.

3 Backpropagation Through Functional Programs How to Do Mode AD Correctly in a Functional Framework We show how reverse-mode AD (automatic differentiation)—a generalized gradient-calculation operator—can be incorporated as a first-class function in a functional-programming language. An important property of AD transformations is that they preserve certain complexity properties. Here, this property is that the reverse phase of the reverse-mode transform of a function has the same time complexity (up to a small constant factor) as the original untransformed function. The main technical difficulty to be faced is that reverse-mode AD must convert fanout (multiple use of a variable) in the untransformed code into addition in the reverse phase of the transformed code. We address this by expressing all straight-line code segments in A-normal form, which makes fanout lexically apparent. Our formulation generalizes reverse-mode AD to apply to arbitrary higher-order functions, while preserving its desirable complexity properties.

3-1 Introduction

When you first learned calculus, you learned how to take the derivative of some simple expressions. Later, you learned the chain rule, the ability to take the derivative of the composition of two functions. The fact that the space of expressions can be defined inductively as a finite set of basis functions closed with function composition, and the fact that you could take the derivative of each basis function as well as function composition, lead to two important closure properties. First, you could take the derivative of any (differentiable) expression. Second, the derivative of an expression was itself an expression. Thus you could take higher-order derivatives.

The traditional method for taking derivatives has a further undesirable property that is often overlooked. The length of the expression denoting the derivative of an expression can be exponentially longer than the length of the original expression. The reason is that $(uv)'=uv'+u'v$. Thus the length of the derivative of a product $u_1 \ldots u_n$ is exponential in n. Evaluating derivatives could take exponentially more time than evaluating the original expressions. While this may be of little consequence in classical complex analysis, it has huge practical implications in computational science.

In this paper, we present a method for computing the derivatives of a different space of expressions. We retain the same finite set of basis functions but replace function composition with the lambda calculus. We present a source-to-source transformation for lambda-calculus expressions that plays the same role as the chain rule does for traditional expressions. Doing so leads to three important closure properties. First, like before, our method allows one to take the derivative of any (differentiable) lambda-calculus expression. Second, like before, the derivative of a lambda-calculus expression is itself a lambda-calculus expression, allowing one to take higher-order derivatives. Third, unlike before, the length of a transformed lambda-calculus expression is larger than that of the original expression only by a small constant factor. Moreover, the asymptotic temporal complexity of evaluating a transformed expression is the same as that of the original expression, greater only by a small constant factor. Thus our methods have potentially huge practical application for computational mathematics, where derivatives of functions expressed as large complex programs are needed for tasks like function optimization, function approximation, parameter estimation, and the solution of differential equations.

The present methods are a generalization of a technique known as Automatic Differentiation or AD. AD is an established enterprise that seeks to take the derivatives of functions specified as programs through symbolic manipulation rather than finite differencing. AD has traditionally been applied to imperative programs in two forms: forward mode and reverse mode. Backpropagation is a special case of reverse-mode AD used to compute the gradient of a multi-layer perceptron to minimize an error function when training the weights. The central contribution of this paper is a correct and implemented framework for applying reverse-mode AD to functional programs.

Traditional implementations of reverse mode lack the closure property. Derivatives are computed by recording a "tape" of the computation and interpreting (or run-time compiling) a transformation of the tape played back in reverse. This tape is a different kind of entity than the original program. This complicates the process of taking higher-order derivatives. The fact that the tape must be interpreted (or run-time compiled) introduces a slowdown in the process of computing derivatives. In contrast, our method represents the tape as a chain of closures, the same kind of entity as the original program. This simplifies the process of taking higher-order derivatives and makes our approach amenable to efficient code generation with standard compilation techniques for functional-programming languages.

One existing system is KM, a method for reverse-mode AD in HASKELL which also represents the tape as a chain of closures. KM uses a local program transformation, implemented by overloading. However, KM is fundamentally flawed: it lacks the third closure property, which is important in many implementations and scenarios. With KM, the asymptotic temporal complexity of computing the derivative of a function can be exponentially larger than that of computing the value of the original function. We illustrate the source of that flaw and present a novel method for performing reverse-mode AD in a functional framework that avoids that flaw. Our method introduces a novel first-class programming-language primitive $\overrightarrow{\mathcal{J}}$ that performs reverse-mode AD by way of a global program transformation. This allows application of the reverse-mode transformation by programs within the language, rather than by a preprocessor. While such transformation is performed reflectively at run time in our prototype implementation, flow analysis and partial evaluation can be used to migrate the transformation to compile time.

To achieve closure, our method involves the solution of two technical problems. First, we must support transformation of nested lambda expressions, particularly those with free-variable references. Our method can handle the case where reverse-mode AD is applied to a function $f$ that takes an argument x and that, in turn, applies reverse-mode AD to a function g, nested inside f, that has a free reference to x, i.e. the argument to the surrounding function $f$. This case is useful, because, as shown in section 3-6, it allows computations like $$\min_{x} \max_{N} f(x, y),$$

where x is such a free-variable reference. Second, since to achieve closure it must be possible to apply $\overrightarrow{\mathcal{J}}$ to any function, inter alia, we must support application of $\overrightarrow{\mathcal{J}}$ to itself.

This paper contributes to both the functional programming community and the AD community. To the functional-programming community, it contributes a method for performing AD that has the correct closure and complexity properties. To the AD community, it contributes the ability to apply reverse mode in a nested fashion to closures with free variables.

The remainder of this paper is organized as follows. Section 3-2 gives a brief tutorial on AD. Section 3-3 presents KM and highlights the flaw in that method. Section 3-4 gives an informal overview of our new method that addresses that flaw. Section 3-5 presents the technical details of our method. Section 3-6 gives examples that illustrate the utility of our method. Section 3-7 discusses fanout, the underlying cause of the flaw in KM, and the relationship between fanout, binary functions, and free variables. Section 3-8 concludes with a summary of the novel contributions of this paper.

3-2 A Brief Tutorial on AD

For the benefit of readers unfamiliar with AD, we give a brief tutorial. Our tutorial will also benefit readers familiar with AD, as we use nonstandard notation and a nonstandard exposition that extends naturally to the later presentation of our method.

In this section and the next, we use x to denote reals, x to denote real vectors, X to denote real matrices, u to denote functions from reals to reals, b to denote functions from pairs of reals to reals, f to denote functions from real vectors to real vectors or from real vectors to reals, juxtaposition to denote function application (which we take to associate to the left), $\mathcal{D}$ to denote the higher-order function that maps functions u to functions that compute the derivative of u, $\mathcal{D}_1$ and $\mathcal{D}_2$ to denote the higher-order functions that map functions b to functions that compute the partial derivatives of b with respect to their first and second arguments respectively, $\nabla$ and $\mathcal{J}$ to denote the higher-order functions that map functions f to functions that compute the gradient or the Jacobian, respectively, of f at a real vector, T to denote matrix transposition, ∘ to denote function composition, + to denote either scalar or vector addition, and × to denote multiplication of either a matrix times a matrix, a matrix times a vector, a scalar times a vector, or a scalar times a scalar.

A program can be viewed as a composition $f = f_1 \circ \ldots \circ f_n$ $$x_1 = f_1 x_0$$
$$\vdots$$
$$x_n = f_n x_{n-1}$$

Here, each $x_i$ denotes a machine state, $x_0$ denotes the input machine state, $x_n$ denotes the output machine state, and each $f_i$ denotes the transition function from machine state $x_{i-1}$ to machine state $x_i$. From the chain rule, we have:

$$\mathcal{J} f x_0 = (\mathcal{J} f_n x_{n-1}) \times \ldots \times (\mathcal{J} f_1 x_0)$$
$$(\mathcal{J} f x_0)^T = (\mathcal{J} f_1 x_0)^T \times \ldots \times (\mathcal{J} f_n x_{n-1})^T$$

This leads to two ways to compute the Jacobian of f at $x_0$:

$$\overrightarrow{X_1} = (\mathcal{J} f_1 x_0)$$
$$\overrightarrow{X_2} = (\mathcal{J} f_1 x_0) \times \overrightarrow{X_1}$$
$$\vdots$$
$$\overrightarrow{X_n} = (\mathcal{J} f_n x_{n-1}) \times \overrightarrow{X_{n-1}}$$

which computes $\overrightarrow{X_n} = \mathcal{J} f x_0$ and:

$$\overleftarrow{X_{n-1}} = (\mathcal{J} f_n x_{n-1})^T$$
$$\overleftarrow{X_{n-2}} = (\mathcal{J} f_{n-1} x_{n-2})^T \times \overleftarrow{X_{n-1}}$$
$$\vdots$$
$$\overleftarrow{X_0} = (\mathcal{J} f_1 x_0)^T \times \overleftarrow{X_1}$$

which computes $\overleftarrow{X_0} = (\mathcal{J} f x_0)^T$. These have a downside: storage of the intermediate $\overrightarrow{X_i}$ and $\overleftarrow{X_i}$ variables can be quadratic in the size of the machine state. Furthermore, each requires a special case for the first line. These issues can both be resolved, in the first case, by computing $\overrightarrow{x_i} = (\mathcal{J} f x_0) \times \overrightarrow{x_0}$:

$$\vec{x_i} = (\mathcal{J} f_1 x_0) \times \vec{x_0}$$

$$\vdots$$

$$\vec{x_n} = (\mathcal{J} f_n x_{n-1}) \times \vec{x_{n-i}}$$

and in the second case, by computing $\overline{x_n} = (\mathcal{J} f x_0)^T \times \overline{x_n}$:

$$\overline{x_{n-1}} = (\mathcal{J} f_n x_{n-1})^T \times \overline{x_n}$$

$$\vdots$$

$$\overline{x_0} = (\mathcal{J} f_1 x_0)^T \times \overline{x_1}$$

The former is called forward-mode AD and the latter is called reverse-mode AD. We refer to the $x_i$ as the primal variables, the $\vec{x_i}$ as the perturbation variables, and the $\overline{x_i}$ as the sensitivity variables. The rows and columns of the Jacobian can be recovered by taking $\vec{x_0}$ and $\overline{x_n}$ to be basis vectors.

The transition functions $f_i$ are typically sparse. They typically compute a single element l of $x_i$, either as a unary scalar function u of single element j of $x_{i-1}$ or as a binary function b of two elements and j and k of $x_{i-1}$, passing the remaining elements of $x_{i-1}$ unchanged through to $x_i$. In this case, the Jacobians $\mathcal{J}$ f, x and the products the $(\mathcal{J}$ f, x$)\times \vec{x}$ and $(\mathcal{J}$ $f_i$ x$)^T \times \overline{x}$ are also sparse. In the unary case:

$$(f_i x)[j] = ux[k]$$

$$(f_i x)[j'] = x[j'] \qquad j' \neq j$$

$$(\mathcal{J} f_i x)[j, k] = \mathcal{D}ux[k]$$

$$(\mathcal{J} f_i x)[j', j'] = 1 \qquad j' \neq j$$

$$(\mathcal{J} f_i x)[j', k'] = 0 \qquad \text{otherwise}$$

$$((\mathcal{J} f_i x) \times \vec{x})[j] = (\mathcal{D}ux[k]) \times \vec{x}[k]$$

$$((\mathcal{J} f_i x) \times \vec{x})[j'] = \vec{x}[j'] \qquad j' \neq j$$

$$((\mathcal{J} f_i x)^T \times \overline{x})[k] = \overline{x}[k] + ((\mathcal{D}ux[k]) \times \overline{x}[j])$$

$$((\mathcal{J} f_i x)^T \times \overline{x})[j] = 0$$

$$((\mathcal{J} f_i x)^T \times \overline{x})[k'] = \overline{x}[k'] \qquad \text{otherwise}$$

In the binary case:

$$(f_i x)[j] = b(x[k], x[l])$$

$$(f_i x)[j'] = x[j'] \qquad j' \neq j$$

$$(\mathcal{J} f_i x)[j, k] = \mathcal{D}_1 b(x[k], x[l])$$

$$(\mathcal{J} f_i x)[j, l] = \mathcal{D}_2 b(x[k], x[l])$$

$$(\mathcal{J} f_i x)[j', j'] = 1 \qquad j' \neq j$$

$$(\mathcal{J} f_i x)[j', k'] = 0 \qquad \text{otherwise}$$

$$((\mathcal{J} f_i x) \times \vec{x})[j] = ((\mathcal{D}_1 b(x[k], x[l])) \times \vec{x}[k]) +$$
$$((\mathcal{D}_2 b(x[k], x[l])) \times \vec{x}[l])$$

$$((\mathcal{J} f_i x) \times \vec{x})[j'] = \vec{x}[j'] \qquad j' \neq j$$

$$((\mathcal{J} f_i x)^T \times \overline{x})[k] = \overline{x}[k] + ((\mathcal{D}_1 b(x[k], x[l])) \times \overline{x}[j])$$

$$((\mathcal{J} f_i x)^T \times \overline{x})[l] = \overline{x}[l] + ((\mathcal{D}_2 b(x[k], x[l])) \times \overline{x}[j])$$

$$((\mathcal{J} f_i x)^T \times \overline{x})[j] = 0$$

$$((\mathcal{J} f_i x)^T \times \overline{x})[k'] = \overline{x}[k'] \qquad \text{otherwise}$$

With forward-mode AD, computation of the perturbation variables $\vec{x_i}$ can be interleaved with the original primal computation:

$$x_1 = f_1 x_0$$

$$\vec{x_1} = (\mathcal{J} f_1 x_0) \times \vec{x_0}$$

$$\vdots$$

$$x_n = f_n x_{n-1}$$

$$\vec{x_n} = (\mathcal{J} f_n x_{n-1}) \times \vec{x_{n-1}}$$

This leads to a simple transformation:

$$\left. \begin{array}{c} x_1 = f_1 x_0 \\ \vdots \\ x_n = f_n x_{n-1} \end{array} \right\} \rightsquigarrow \left\{ \begin{array}{c} \vec{x_1} = \vec{f_1} \vec{x_0} \\ \vdots \\ \vec{x_n} = \vec{f_n} \vec{x_{n-1}} \end{array} \right.$$

where $$\vec{x} = (x, \vec{x}) \text{ and } \vec{f}(x, \vec{x}) = ((fx), ((\mathcal{J} fx) \times \vec{x})).$$

The fact that $x_{i-1}$ and $\vec{x}_{i-1}$ are no longer referenced once $x_i$ and $\vec{x_i}$ are computed, coupled with the fact that $\vec{x}$ can be represented as a vector of pairs rather than a pair of vectors, interleaving x with $\vec{x}$, means that when the $f_i$ are sparse, the original program can be written as a sequence of assignments of the form $x_1 := u$, $x_k$ and $x_j := b(x_k, x_l)$, referencing variables x that contain scalars, and the transformed program can be written as a sequence of assignments of the form $\vec{x_j} := \vec{u} \ \vec{x_k}$ and $\vec{x_j} := \vec{b}(\vec{x_k}, \vec{x_l})$, referencing variables $\vec{x}$ that hold pairs of x and $\vec{x}$, where:

$$\vec{u}(x, \vec{x}) = ((u, x), ((\mathcal{D}ux) \times \vec{x}))$$

$$\vec{b}((x_1, \vec{x_1}), (x_2, \vec{x_2})) =$$
$$((b(x_1, x_2)), (((\mathcal{D}_1 b(x_1, x_2)) \times \vec{x_1}) + ((\mathcal{D}_2 b(x_1, x_2)) \times \vec{x_2})))$$

This means that forward-mode AD can be implemented in almost any programming language and programming style, functional or otherwise, simply by overloading the representation of reals x with pairs $\vec{x}$ of reals x and $\vec{x}$ and by overloading the primitives u and b with $\vec{u}$ and $\vec{b}$ respectively. In the functional realm, this has been done in MAPLE, HASKELL, and SCHEME. Note that forward-mode AD preserves both the asymptotic temporal and spatial complexity of the program.

In contrast, with reverse-mode AD, computation of the sensitivity variables $\overline{x_i}$ cannot be interleaved with the original primal xi computation. The computation must be divided into two phases, a forward phase that computes the primal variables and a reverse phase that computes the sensitivity variables in reverse order:

$$x_1 = f_1 x_0$$
$$\vdots$$
$$x_n = f_n x_{n-1}$$
$$\overline{x_{n-1}} = (\mathcal{J} f_n x_{n-1})^T \times \overline{x_n}$$
$$\vdots$$
$$\overline{x_0} = (\mathcal{J} f_1 x_0)^T \times \overline{x_1}$$

Note that, while in forward mode, $x_i$ is no longer referenced once $x_{i+1}$ is computed, in reverse mode, (relevant parts of) the primal variables $x_i$ computed during the forward phase must be saved until the corresponding sensitivity variables $\overline{x_i}$ are computed during the reverse phase. Also note that, while forward-mode AD can be performed using overloading, a local program transformation, the above requires a global program transformation.

It is tempting to try to perform reverse-mode AD with a local program transformation:

$$x_1 = f_1 x_0$$
$$\overline{x_1} = \lambda \overline{x} \overline{x_0}((\mathcal{J} f_1 x_0)^T \times \overline{x})$$
$$\vdots$$
$$x_n = f_n x_{n-1}$$
$$\overline{x_n} = \lambda \overline{x} \overline{x_{n-1}}((\mathcal{J} f_n x_{n-1})^T \times \overline{x})$$

If we take $\overline{x}_o$ to be the identity function, the reverse phase can be performed by evaluating $\overline{x_n}, \overline{x_n}$. We refer to $\overline{x}$ as a backpropagator variable. Note that each backpropagator variable $\overline{x_i}$ closes over the previous backpropagator variable $\overline{x_{i-1}}$ to implement sequencing of the reverse phase. Also note that each backpropagator variable $\overline{x_i}$ also closes over the corresponding previous primal variable $x_{i-1}$ to preserve the necessary values until the reverse phase. This leads to a simple transformation:

$$\left. \begin{array}{c} x_1 = f_1 x_0 \\ \vdots \\ x_n = f_n x_{n-1} \end{array} \right\} \leadsto \left\{ \begin{array}{c} \overline{x_1} = \overleftarrow{f_1} \overline{x_0} \\ \vdots \\ \overline{x_n} = \overleftarrow{f_n} \overline{x_{n-1}} \end{array} \right.$$

where $\overleftrightarrow{x} = (x, \overline{x})$ and $\overleftarrow{f}(x, \overline{x}) = \{(f x), (\lambda \overline{X} \overline{x}((\mathcal{J} f x)^T \times \overline{X}))\}$. However, unlike in forward mode, where $\overrightarrow{x} = (x, \overline{x})$ can be interleaved as a vector of pairs, it is not possible to interleave $\overleftrightarrow{x} = (x, \overline{x})$, because $\overline{x}$ is a function, not a vector. Thus, one must use different techniques to implement reverse-mode AD with a local program transformation that takes advantage of sparsity.

The traditional way this is done is to maintain a single global backpropagator variable $\overline{x}$ that is updated via side effect and by taking:

$$\overleftarrow{f} x = \text{begin } \overline{x} := \lambda \overline{x} \overline{x}((\mathcal{J} f x)^T \times \overline{x}); \\ (f x) \text{ end}$$

This eliminates the need to pair backpropagators with primal values and allows taking $\overleftrightarrow{x} = x$. When the $f_i$ are sparse, and the original program is written as a sequence of assignments of the form $x_j := u \tau_k$ and $x_j := b(x_k, x_l)$, referencing variables x that contain scalars, the transformed program can be written as a sequence of assignments of the form:

$$\overline{x} := \lambda [] \text{ begin } \overline{x_j} := 0;$$
$$\overline{x_k} + := (\mathcal{D} u \overleftrightarrow{x_k}) \times \overline{x_j};$$
$$\overline{x}[] \text{ end}$$
$$\overleftrightarrow{x_j} := u \overleftrightarrow{x_k}$$

and:

$$\overline{x} := \lambda [] \text{ begin } \overline{x_j} := 0;$$
$$\overline{x_k} + := (\mathcal{D}_1 b(\overleftrightarrow{x_k}, \overleftrightarrow{x_l})) \times \overline{x_j};$$
$$\overline{x_l} + := (\mathcal{D}_2 b(\overleftrightarrow{x_k}, \overleftrightarrow{x_l})) \times \overline{x_j};$$
$$\overline{x}[] \text{ end}$$
$$\overleftrightarrow{x_j} := b(\overleftrightarrow{x_k}, \overleftrightarrow{x_l})$$

taking: $\overleftrightarrow{x} = x$ and $x+:=e$ to denote $x:=x+e$.

Traditional implementations refer to $\overline{x}$ as the tape, usually implemented as an interpreted (or run-time-compiled) data structure rather than as linked closures. For straight-line code, one can dispense with the tape if one admits a global program transformation. One simply postpends the program with assignments to initialize the sensitivity variables and then postpends assignments of the form:

$$\overline{x_j} := 0$$
$$\overline{x_k} := \mathcal{D} u \overleftrightarrow{x_k}$$

for each primal assignment $x_j := u\, x_k$, and of the form:

$$\overline{x_j} := 0$$
$$\overline{x_k} + := \mathcal{D}_1 b(\overleftrightarrow{x_k}, \overleftrightarrow{x_l})$$
$$\overline{x_l} + := \mathcal{D}_2 b(\overleftrightarrow{x_k}, \overleftrightarrow{x_l})$$

for each primal assignment $x_j := b(x_k, x_l)$, in reverse order to their occurrence in the primal.

Note that reverse-mode AD preserves the asymptotic temporal complexity of the program, but not its spatial complexity, due to the need to save primal values for use during the reverse phase. Also, while this approach can be implemented as a local program transformation in most programming languages, it is not amenable to a functional style due to the use of side effects.

3-3 An Informal Overview of the Present Method for Performing Reverse-Mode AD in a Functional Framework We now describe a novel method for performing reverse-mode AD in a functional framework that preserves asymptotic temporal complexity of the program.

First consider a restricted straight-line program that operates on real-valued variables x with unary functions u from reals to reals, taking $x_o$ as the input and producing $x_n$ as the output:

$$x_{j_1} := u_1 x_{k_1}$$
$$\vdots$$
$$x_{j_n} := u_n x_{k_n}$$

From section 2, the tapeless global reverse-mode transformation of this program is:

$$\left. \begin{array}{l} x_{j_1} := u_1 x_{k_1} \\ \vdots \\ x_{j_n} := u_n x_{k_n} \end{array} \right\} \rightsquigarrow \left\{ \begin{array}{l} x_{j_1} := u_1 x_{k_1} \\ \vdots \\ x_{j_n} := u_n x_{k_n} \\ \overline{x_0} := 0 \\ \vdots \\ \overline{x_{n-1}} := 0 \\ \overline{x_{j_n}} := 0 \\ \overline{x_{k_n}} \mathrel{+}= (\mathcal{D}^3 u_n x_{k_n}) \times \overline{x_{j_n}} \\ \vdots \\ \overline{x_{j_1}} := 0 \\ \overline{x_{k_1}} \mathrel{+}= (\mathcal{D}^3 u_1 x_{k_1}) \times \overline{x_{j_1}} \end{array} \right.$$

If we restrict our consideration to single-assignment code, the assignments $\overline{x_{j_i}} := 0$ during the reverse phase can be eliminated:

$$\left. \begin{array}{l} x_1 = u_1 x_{k_1} \\ \vdots \\ x_n = u_n x_{k_n} \end{array} \right\} \rightsquigarrow \left\{ \begin{array}{l} x_1 = u_1 x_{k_1} \\ \vdots \\ x_n = u_n x_{k_n} \\ \overline{x_0} := 0 \\ \vdots \\ \overline{x_{n-1}} := 0 \\ \overline{x_{k_n}} \mathrel{+}= (\mathcal{D}^3 u_n x_{k_n}) \times \overline{x_n} \\ \vdots \\ \overline{x_{k_1}} \mathrel{+}= (\mathcal{D}^3 u_1 x_{k_1}) \times \overline{x_1} \end{array} \right.$$

If we take $\overline{u}_i = \lambda \overline{x} \, (\mathcal{D} \, u_i \, x_{k_1}) \times \overline{x}$, this gives:

$$\left. \begin{array}{l} x_1 = u_1 x_{k_1} \\ \vdots \\ x_n = u_n x_{k_n} \end{array} \right\} \rightsquigarrow \left\{ \begin{array}{l} x_1 = u_1 x_{k_1} \\ \vdots \\ x_n = u_n x_{k_n} \\ \overline{x_0} := 0 \\ \vdots \\ \overline{x_{n-1}} := 0 \\ \overline{x_{k_n}} \mathrel{+}= \overline{u_n} \overline{x_n} \\ \vdots \\ \overline{x_{k_1}} \mathrel{+}= \overline{u_1} \overline{x_1} \end{array} \right.$$

If we further take $\overleftarrow{u}\, x = ((ux), (\lambda \overline{x} \, (\mathcal{D} \, u \, x) \times \overline{x}))$, we can write:

$$\left. \begin{array}{l} x_1 = u_1 x_{k_1} \\ \vdots \\ x_n = u_n x_{k_n} \end{array} \right\} \rightsquigarrow \left\{ \begin{array}{l} (x_1, \overline{x_1}) = \overleftarrow{u_1} x_{k_1} \\ \vdots \\ (x_n, \overline{x_n}) = \overleftarrow{u_n} x_{k_n} \\ \overline{x_0} := 0 \\ \vdots \\ \overline{x_{n-1}} := 0 \\ \overline{x_{k_n}} \mathrel{+}= \overline{x_n} \overline{x_n} \\ \vdots \\ \overline{x_{k_1}} \mathrel{+}= \overline{x_1} \overline{x_1} \end{array} \right.$$

Note that this transformation is valid only for single-assignment code. The backpropagator variables $\overline{x}_i$ are accessed during the reverse phase in reverse order to which they were assigned during the forward phase. Applying this transformation to non-single assignment code would result in the backpropagators being overwritten during the forward phase and the wrong backpropagators being called during the reverse phase. Also note that the reverse transformed primitives $\overleftarrow{u}$ are different from those in section 3. In section 3, both the input and the output of $\overleftarrow{u}$ consist of a primal paired with a backpropagator. Here, only the output of $\overleftarrow{u}$ is such a pair. The input is solely a primal. Further note that the backpropagators $\overline{x}_i$ are also different from those in section 3. In section 3, each $\overline{x}_i$ is a function from $\overline{x}_i$ to $\overline{x}_i \times (\nabla f_i \, x_o)$, a scaled gradient of the entire computation leading to $x_i$. Here, each $\overline{x}_i$ is simply a function from $\overline{x}_i$ to $\overline{x}_{k_i}$. Evaluating $\overline{x}_i \overline{x}_i$ has the same asymptotic temporal complexity as evaluating $u_i x_n$. The is the key property that leads to our method having the appropriate temporal complexity.

Let us now assume that the primitives u are stored in variables x and that the reverse-transformed primitives $\overleftarrow{u}$ are also stored in variables $\overline{x}$. In the untransformed program, a variable x can contain either a real value or a primitive. For the sake of symmetry, we will construct the transformed program out of corresponding transformed variables $\overline{x}$ that can contain either transformed real values or transformed primitives. For reasons that we will discuss in section 5, transformed real values are simply tagged real values. Transformed primitives will map transformed real values to transformed real values paired with backpropagators. This leads to the following transformation:

$$\left. \begin{array}{l} x_1 = x_{j_1} x_{k_1} \\ \vdots \\ x_n = x_{j_n} x_{k_n} \end{array} \right\} \rightsquigarrow \left\{ \begin{array}{l} (\overline{x_1}, \overline{x_1}) = \overline{x_{j_1}} \overline{x_{k_1}} \\ \vdots \\ (\overline{x_n}, \overline{x_n}) = \overline{x_{j_n}} \overline{x_{k_n}} \\ \overline{x_0} := 0 \\ \vdots \\ \overline{x_{n-1}} := 0 \\ \overline{x_{k_n}} \mathrel{+}= \overline{x_n} \overline{x_n} \\ \vdots \\ \overline{x_{k_1}} \mathrel{+}= \overline{x_1} \overline{x_1} \end{array} \right.$$

Let us generalize further by allowing the variables x in the untransformed program to contain arbitrary programming-language values and the primitives in the untransformed program to map arbitrary values to arbitrary values. Doing so requires us to generalize transformed variables $\overline{x}$ and sensitivity variables $\overline{x}$ to contain arbitrary transformed and sensitivity values that correspond to or match the arbitrary untransformed values stored in the corresponding variables x. This requires us to add arbitrary sensitivity values. We postulate a function $\oplus$ to do so. The function $\oplus$ takes two conformant values of the same shape and returns a result of the same shape. This also requires us to initialize the sensitivity variables with matching zeros. We postulate a function $\overleftarrow{\mathcal{J}}$ that maps values to corresponding transformed values, the inverse function $\overleftarrow{\mathcal{J}}^{-1}$ that maps transformed values to corresponding untransformed values, and a function 0 that maps values to matching zeros. Thus $\overleftarrow{x}$ is initialized to 0 $(\overleftarrow{\mathcal{J}}^{-1}\overleftarrow{x})$:

$$\left.\begin{array}{c} x_1 = x_{i_1} x_{j_1} \\ \vdots \\ x_n = x_{i_n} x_{j_n} \end{array}\right\} \rightsquigarrow \left\{\begin{array}{l} (\overleftarrow{x_1}, \overleftarrow{x_1}) = \overleftarrow{x_{i_1} x_{j_1}} \\ \vdots \\ (\overleftarrow{x_n}, \overleftarrow{x_n}) = \overleftarrow{x_{i_n} x_{j_n}} \\ \overleftarrow{x_0} := 0(\overleftarrow{\mathcal{J}}^{-1}\overleftarrow{x_0}) \\ \vdots \\ \overleftarrow{x_{n-1}} := 0(\overleftarrow{\mathcal{J}}^{-1}\overleftarrow{x_{n-1}}) \\ \overleftarrow{x_{j_n}} \oplus := \overleftarrow{x_n x_n} \\ \vdots \\ \overleftarrow{x_{j_1}} \oplus := \overleftarrow{x_1 x_1} \end{array}\right.$$

The above transformation of single-assignment straight-line code can be applied to transform any α-converted lambda expression in A-normal form. (The requirement for α-conversion comes from the same underlying constraint as the need for the straight-line code to be single-assignment.) Note that the forward and reverse phases are separated. The forward phase returns a transformed value paired with a function that performs the reverse phase. This function maps $\overleftarrow{x_n}$ to $\overleftarrow{x_0}$, by multiplying the transpose of the Jacobian of the function that maps $x_o$ to $x_n$, at $x_o$ by $\overleftarrow{x_n}$, under appropriate generalizations of the notions of vectors, matrices, Jacobians, matrix transposition, and matrix-vector multiplication to data of arbitrary shape. It can thus be viewed as a backpropagator. We now have a self-similarity property whereby transformed primitives and transformed lambda expressions both map transformed values to transformed values paired with backpropagators. Thus untransformed and transformed code can treat primitive and user-defined functions equivalently:

$$\left.\begin{array}{c} \lambda x_0 \\ \text{let } x_1 \triangleq x_{i_1} x_{j_1}; \\ \vdots \\ x_n \triangleq x_{i_n} x_{j_n} \\ \text{in } x_n \text{ end} \end{array}\right\} \rightsquigarrow \left\{\begin{array}{l} \lambda \overleftarrow{x_0} \\ \text{let } (\overleftarrow{x_1}, \overleftarrow{x_1}) \triangleq \overleftarrow{x_{i_1} x_{j_1}}; \\ \vdots \\ (\overleftarrow{x_n}, \overleftarrow{x_n}) \triangleq \overleftarrow{x_{i_n} x_{j_n}} \\ \text{in } (\overleftarrow{x_n}, \\ (\lambda \overleftarrow{x_n} \\ \text{let } \overleftarrow{x_0} \triangleq 0(\overleftarrow{\mathcal{J}}^{-1}\overleftarrow{x_0}); \\ \vdots \\ \overleftarrow{x_{n-1}} \triangleq 0(\overleftarrow{\mathcal{J}}^{-1}\overleftarrow{x_{n-1}}); \\ \overleftarrow{x_{j_n}} \oplus \triangleq \overleftarrow{x_n x_n} \\ \vdots \\ \overleftarrow{x_{j_1}} \oplus \triangleq \overleftarrow{x_1 x_1} \\ \text{in } \overleftarrow{x_0} \text{ end})) \text{ end} \end{array}\right.$$

The above formulation, however, does not support nested lambda expressions. The difficulty in supporting nested lambda expressions, and in particular free variables, is illustrated by the following example. Consider the f $\triangleq$ λa ((λb λc b) a)1. Since f is the identity function, its derivative is the constant function one. Converting f to A-normal form gives:

$$f \triangleq \lambda a \text{ let } x_1 \triangleq \lambda b \text{ let } x_4 \triangleq \lambda c b$$
$$\text{in } x_4 \text{ end};$$
$$x_2 \triangleq x_1 a;$$
$$x_3 \triangleq x_2 1 \quad /*a*/$$
$$\text{in } x_3 \text{ end}$$

If we attempt to transform f using the above method we get:

$$\overleftarrow{f} \triangleq \lambda \overleftarrow{a} \text{ let } \overleftarrow{x_1} \triangleq \lambda \overleftarrow{b} \text{ let } \overleftarrow{x_4} \triangleq \lambda \overleftarrow{c}(\overleftarrow{b}, (\lambda \overleftarrow{b} \overleftarrow{c})) \quad /*b*/$$
$$\text{in } (\overleftarrow{x_4}, (\lambda \overleftarrow{x_4} \text{ let } \overleftarrow{b} \triangleq 0(\overleftarrow{\mathcal{J}}^{-1}\overleftarrow{b})$$
$$\text{in } \overleftarrow{b} \text{ end})) \text{ end};$$
$$(\overleftarrow{x_2}, \overleftarrow{x_2}) \triangleq \overleftarrow{x_1 a};$$
$$(\overleftarrow{x_3}, \overleftarrow{x_3}) \triangleq \overleftarrow{x_2 1} \quad /*c*/$$
$$\text{in } (\overleftarrow{x_3}, (\lambda \overleftarrow{x_3} \text{ let } \overleftarrow{a} \triangleq 0(\overleftarrow{\mathcal{J}}^{-1}\overleftarrow{a});$$
$$\overleftarrow{x_1} \triangleq 0(\overleftarrow{\mathcal{J}}^{-1}\overleftarrow{x_1});$$
$$\overleftarrow{x_2} \triangleq 0(\overleftarrow{\mathcal{J}}^{-1}\overleftarrow{x_2});$$
$$\overleftarrow{1} \oplus \triangleq \overleftarrow{x_3 x_3}; \quad /*d*/$$
$$\overleftarrow{a} \oplus \triangleq \overleftarrow{x_2 x_2}$$
$$\text{in } \overleftarrow{a} \text{ end})) \text{ end}$$

The above code is trivially incorrect, because there are references to unbound variables $\overleftarrow{c}$, $\overleftarrow{1}$, and $\overleftarrow{1}$ in lines b, c, and d. The free reference to $\overleftarrow{1}$ in line c results from transforming the constant 1 in line a of the untransformed code for f. We can treat such constants as free references to variables bound in the environment over which a function is closed. When we transform such a closure, we will need to transform the variables and values in its environment. This legitimizes the free reference to $\overleftarrow{1}$ in line c but does not address the free references to $\overleftarrow{c}$ and $\overleftarrow{1}$ in lines b and d. We solve this problem by generating bindings, in the backpropagator for a transformed lambda expression, for all of the sensitivity variables that correspond to free variables in the untransformed lambda expression, that initialize those sensitivity variables to zeros. This is done for $\overleftarrow{c}$ and $\overleftarrow{1}$ in lines e and f below:

$$\overleftarrow{f} \triangleq \lambda \overleftarrow{a} \text{ let } \overleftarrow{x_1} \triangleq$$
$$\lambda \overleftarrow{b} \text{ let } \overleftarrow{x_4} \triangleq$$
$$\lambda \overleftarrow{c} (\overleftarrow{b}, (\lambda \overleftarrow{b} \text{ let } \overleftarrow{c} \triangleq 0(\overleftarrow{\mathcal{J}}^{-1}\overleftarrow{c}) \quad /*e*/$$
$$\text{in } \overleftarrow{c} \text{ end}))$$

-continued $$\text{in } (\overline{x_4}, (\lambda\overline{x_4} \text{ let } \overleftarrow{b} \stackrel{\Delta}{=} 0(\mathcal{J}^{-1}\overleftarrow{b})$$

$$\text{in } \overleftarrow{b} \text{ end})\text{end};$$

$$(\overline{x_2}, \overline{x_2}) \stackrel{\Delta}{=} \overline{x_1}\overline{a};$$

$$(\overline{x_3}, \overline{x_3}) \stackrel{\Delta}{=} \overline{x_2}\overline{1}$$

$$\text{in } (\overline{x_3}, (\lambda\overline{x_3} \text{ let } \overleftarrow{a} \stackrel{\Delta}{=} 0(\mathcal{J}^{-1}\overleftarrow{a});$$

$$\overleftarrow{x_1} \stackrel{\Delta}{=} 0(\mathcal{J}^{-1}\overleftarrow{x_1});$$

$$\overleftarrow{x_2} \stackrel{\Delta}{=} 0(\mathcal{J}^{-1}\overleftarrow{x_2});$$

$$\overleftarrow{1} \stackrel{\Delta}{=} 0(\mathcal{J}^{-1}\overleftarrow{1}); \quad /*f*/$$

$$\overleftarrow{1} \oplus \stackrel{\Delta}{=} \overleftarrow{x_3}\overleftarrow{x_3};$$

$$\overleftarrow{a} \oplus \stackrel{\Delta}{=} \overleftarrow{x_2}\overleftarrow{x_2}$$

$$\text{in } \overleftarrow{a} \text{ end})\text{end}$$

Now $\overleftarrow{f}$ is syntactically correct. Unfortunately, however, it produces the wrong result. If we apply $\overleftarrow{f}$ to $\overleftarrow{4}$ we get $\overleftarrow{4}$ (the correct answer) paired with a backpropagator. But if we call that backpropagator on 1 we get 0 when we should get 1, namely the derivative of f at 4. To see why, we can trace through the evaluation of the backpropagator. First, $\overleftarrow{x_3}$ is bound to 1. Then, $\overleftarrow{a}$, $\overleftarrow{x_1}$, $\overleftarrow{x_2}$, and $\overleftarrow{1}$ are bound to zeros. Then, we apply $\overleftarrow{x_3}$ to 1. Since $\overleftarrow{x_3}$ is bound to $\lambda \overleftarrow{b} \ldots \overleftarrow{b}$, is bound to 1,) $\overleftarrow{c}$ is bound to a zero, $\lambda \overleftarrow{b} \; {::}{:}$ returns a zero, and $\overleftarrow{1}$ is incremented by a zero and remains a zero. Then, we apply $\overleftarrow{x_2}$ to a zero. Since $\overleftarrow{x_2}$ is bound to $\lambda \overleftarrow{x_4} \ldots, \overleftarrow{x_4}$ is bound to a zero, $\overleftarrow{b}$ is bound to a zero, $\lambda \overleftarrow{x_4} \; {::}{:}$ returns a zero, and $\overleftarrow{a}$ is incremented by a zero and remains a zero. This zero is then returned.

The problem results from the fact that the output of the function λc b in the untransformed f does not depend on its input. Instead, it depends on the value of a free variable that is the input to the surrounding function λb λc b. So far, our backpropagators only propagate sensitivities from function outputs to their inputs. They do not propagate sensitivities to the environments over which they are closed.

To solve this problem, we first modify backpropagators to return an environment sensitivity paired with an input sensitivity, as shown in lines g, i, and m below. Environment sensitivities are represented as lists of the sensitivities of all of the free variables. Then, we modify the lines in backpropagators that correspond to applications in the untransformed function to accumulate the paired backpropagator result into the sensitivity of the target paired with the sensitivity of its argument, as shown in lines j and k below. Finally, we generate lines in backpropagators that correspond to nested lambda expressions in the untransformed function, as shown in lines h and l below:

$$\overleftarrow{f} \stackrel{\Delta}{=} \lambda\overleftarrow{a} \text{ let } \overleftarrow{x_1} \stackrel{\Delta}{=}$$

$$\lambda\overleftarrow{b} \text{ let } \overleftarrow{x_4} \stackrel{\Delta}{=}$$

$$\lambda\overleftarrow{c} \left(\overleftarrow{b}, (\lambda\overleftarrow{b} \text{ let } \overleftarrow{c} \stackrel{\Delta}{=} 0(\mathcal{J}^{-1}\overleftarrow{c})\right.$$

$$\text{in } \left([\overleftarrow{b}], \overleftarrow{c} \text{ end}\right)\right) \quad /*g*/$$

$$\text{in } (\overline{x_4}, (\lambda\overline{x_4} \text{ let } \overleftarrow{b} \stackrel{\Delta}{=} 0(\mathcal{J}^{-1}\overleftarrow{b});$$

$$[\overleftarrow{b}] \oplus \stackrel{\Delta}{=} \overleftarrow{x_4} \quad /*h*/$$

$$\text{in } \left([], \overleftarrow{b}\right)\text{end})\text{end}; /*i*/$$

$$(\overline{x_2}, \overline{x_2}) \stackrel{\Delta}{=} \overline{x_1}\overline{a};$$

$$(\overline{x_3}, \overline{x_3}) \stackrel{\Delta}{=} \overline{x_2}\overline{1}$$

$$\text{in } (\overline{x_3}, (\lambda\overline{x_3} \text{ let } \overleftarrow{a} \stackrel{\Delta}{=} 0(\mathcal{J}^{-1}\overleftarrow{a});$$

$$\overleftarrow{x_1} \stackrel{\Delta}{=} 0(\mathcal{J}^{-1}\overleftarrow{x_1});$$

$$\overleftarrow{x_2} \stackrel{\Delta}{=} 0(\mathcal{J}^{-1}\overleftarrow{x_2});$$

$$\overleftarrow{1} \stackrel{\Delta}{=} 0(\mathcal{J}^{-1}\overleftarrow{1});$$

$$\left(\overleftarrow{x_2}, \overleftarrow{1}\right) \oplus \stackrel{\Delta}{=} \overleftarrow{x_3}\overleftarrow{x_3}; \quad /*j*/$$

$$\left(\overleftarrow{x_1}, \overleftarrow{a}\right) \oplus \stackrel{\Delta}{=} \overleftarrow{x_2}\overleftarrow{x_2}; \quad /*k*/$$

$$[] \oplus \stackrel{\Delta}{=} \overleftarrow{x_1} \quad /*l*/$$

$$\text{in } \left([], \overleftarrow{a}\right)\text{end}) \text{end} \quad /*m*/$$

To see how this works, we trace through the evaluation of this new backpropagator. First, $\overleftarrow{x_3}$ is bound to 1. Then, $\overleftarrow{a}$, $\overleftarrow{x_1}$, $\overleftarrow{x_2}$, and $\overleftarrow{1}$ are bound to zeros. Then, we apply $\overleftarrow{x_3}$ to 1. Since $\overleftarrow{x_3}$ is bound to $\lambda\overleftarrow{b}$ ..., $\overleftarrow{b}$ is bound to 1 and $\overleftarrow{c}$ is bound to a zero. So far, the evaluation is the same as before. Now we see the first difference. The function $\lambda\overleftarrow{b}$ ... returns [1] paired with a zero, $\overleftarrow{x_2}$ is incremented by [1] to become [1], and $\overleftarrow{1}$ is incremented by a zero and remains a zero. Then, we apply $\overleftarrow{x_2}$ to [1]. Since $\overleftarrow{x_2}$ is bound to $\lambda\overleftarrow{x_4}$ ... $\overleftarrow{x_4}$ is bound to [1] and $\overleftarrow{b}$ is bound to a zero. Then [$\overleftarrow{b}$] is incremented by [1]. This increments $\overleftarrow{b}$ by 1, allowing $\lambda\overleftarrow{x_4}$ ... to return [ ] paired with 1. The variable $\overleftarrow{x_1}$ is then incremented by [ ] and $\overleftarrow{a}$ is incremented by 1 to become 1. This 1 is then returned.

Several subtle issues must be addressed to flesh out this method. First, lambda expressions may have multiple free variables. Thus the lists of sensitivities to these variables, as in lines g, h, i, l, and m above, could contain multiple values. Since these lists of sensitivities must conform to be added by ⊕, we need to adopt a canonical order to the elements of these lists. This is done by assuming a total order on all variables. Second, while the input to this transformation is an α-converted expression in A-normal form, the output is not. To allow repeated application of this transformation, the output of the transformation must subsequently be α-converted and converted to A-normal form. Such repeated transformation can yield multiply-transformed variables like $\overleftarrow{\overleftarrow{x}}$ that are bound to multiply transformed values. Third, a transformed function can have free variables that do not correspond to free variables in the untransformed function. This is because the transformation introduces references to functions like 0 and $\overleftarrow{\mathcal{J}}^{-1}$ that may not be used in the untransformed function. (And even if they were, they would be transformed, but the transformed function needs to access the untransformed variants as well.) Thus the environment sensitivity of a transformed function will be of a different shape then the environment sensitivity of its corresponding untransformed function. For reasons beyond the scope of this paper, we wish the environment sensitivity of a transformed function to be of the same shape as the environment sensitivity of its corresponding untransformed function. To accomplish this, we adopt the convention that environment sensitivities of potentially multiply-transformed functions only contain entries that correspond to free variables in the original completely-untransformed function. We refer to such variables as base free variables.

3-4 The Technical Details of the Present Reverse-Mode AD Method

Since our method involves a global program transformation, we wish to make this transformation available as a first-class programming language function $\overleftarrow{\mathcal{J}}$. This allows application of this transformation by programs within the language, rather than by a preprocessor. Since $\overleftarrow{\mathcal{J}}$ must have the ability to reflectively access and transform expressions associated with closures, it is not possible to implement $\overleftarrow{\mathcal{J}}$ as code within a language that lacks the capacity for such reflection. In such languages, $\overleftarrow{\mathcal{J}}$ must be added to the language implementation as a new primitive. While it is possible to do this for an existing implementation of an existing language, to simplify presentation and experimentation, we formulate the ideas in this paper within a minimalist functional language called VLAD and a minimalist implementation of VLAD called STALIN∇ (pronounced Stalingrad). 4 VLAD and STALIN∇ support both forward-mode and reverse-mode AD, but in this paper we only describe reverse mode. VLAD and STALIN∇, however, are simply expedient vehicles for exposition and research.

The $\overleftarrow{\mathcal{J}}$ primitive could be added to an existing implementation of an existing language, albeit with considerably greater effort.

VLAD is similar to SCHEME. The important differences are summarized below:

One functional (side-effect free) constructs are supported.

The only data types supported are the empty lists, Booleans, real numbers, pairs, and functions that take one argument and return one result.

Since all functions, including primitives, take one argument, those that naturally take multiple arguments (except for cons and list) take those arguments as tuplets constructed from pairs.

The cons and list constructs are syntax that expand into curried calls.

The syntax of lambda expressions, and expressions, such as let, that expand into lambda expressions, is extended to support destructing of pairs, tuples, lists, and reverse values. Multiple-argument lambda expression and applications incur implicit structuring and destructuring.

While STALIN∇ accepts VLAD programs in SCHEME S-expression notation, in this paper, we formulate VLAD programs in a more traditional mathematical notation that, inter alia, uses infix applications. While STALIN∇ is implemented in SCHEME, not VLAD, in this paper, we use the same mathematical notation both when writing VLAD programs and when specifying the implementation of VLAD. We often have functions in the VLAD language that correspond to functions in the implementation. To avoid confusion in such cases, the language function is referred to as t while the implementation function is referred to as t.

A preprocessor translates VLAD programs into the pure lambda calculus. Standard SCHEME syntax is expanded using the macros from Kelsey et al. (1998). Top-level definitions are translated into uses of let rec. While STALIN∇ implements letrec1 natively, for expository purposes, in this paper, we assume that letrec1 is implemented in the pure lambda calculus in terms of the Y combinator. Structuring and destructuring is made explicit. IFs are eliminated.

$$\text{if } e_1 \text{ then } e_2 \text{ else } e_3 \text{ fi} \rightsquigarrow (\text{IF}(e_1, (\lambda x\, e_2), (\lambda x\, e_3)))[]$$

While STALIN∇ implements Booleans and IF natively, for expository purposes, in this paper, we assume that Booleans and IF are implemented in the pure lambda calculus $$\text{true} \rightsquigarrow \text{CAR}$$
$$\text{false} \rightsquigarrow \text{CDR}$$
$$\text{IF}\,(x_1, x_2, x_3)\dot{}\; \stackrel{\Delta}{=}\; x_1(x_3, x_3)$$

Pairs are implemented using the Church encoding:

$$CAR\, x \triangleq x\lambda x_1 \lambda x_2 x_1$$

$$CDR\, x \triangleq x\lambda x_1 \lambda x_2 x_2$$

$$CONS\, x_1 x_2 x \triangleq x x_1 x_2$$

(The primitives must be aware of the representation of Booleans and pairs.) Finally, quoted constants are replaced with references to variables in the top-level environment.

Given a set of base variables, a variable x is either a base variable or a tagged variable. A tagged variable, in turn, is either a reverse variable ($\overleftarrow{x}$, a sensitivity variable) $\overline{x}$, or a backpropagator variable $\overline{x}$. The input program must be formulated using only base variables. The reverse transformation will produce expressions that contain tagged variables. Repeated reverse transformation can yield variables with stacked tags, like $\overleftarrow{\overleftarrow{x}}$. Variable tagging allows the reverse transformation to generate new variables that do not clash with existing variables and allows a bidirectional correspondence between tagged and untagged variants of a variable.

We assume a total order $\prec$ on all variables. This will allow unambiguous construction of a list to represent the sensitivity of a function in terms of its free variables.

A lambda $\Lambda$ is either a base lambda $\lambda$ or a tagged lambda, i.e. a reverse lambda $\overleftarrow{\lambda}$. An expression e is either a variable access expression x, an application ($e_1\ e_2$), or a lambda expression ($\Lambda x\ e$). We often eliminate parenthesis around applications and lambda expressions, taking application to associate to the left and lambda expressions to extend as far right as possible. The input program must be formulated using only base lambda expressions. The reverse transformation will produce tagged lambda expressions. Repeated reverse transformation can yield lambdas with stacked tags, like $\overleftarrow{\overleftarrow{\lambda}}$. Lambda tagging allows one to determine whether or not an expression has been transformed, and if so, how many times it has been transformed. We will use this ability, below, to repeatedly untransformed a transformed lambda expression to determine the free variables in the original untransformed lambda expression. We further use $\Lambda$ as a metavariable to denote a base lambda $\lambda$ with a potential tag stack. We use this ability, below, to construct values that are transformed the same number of times as a correspondingly transformed lambda expression.

We assume that the bodies of all lambda expressions are converted to A-normal form. An expression in A-normal form has the form:

$$\text{let } x_1 \triangleq e_1; \ldots; x_m \triangleq e_m \text{ in } x_m \text{ end}$$

where each $e_i$ is either $x_{1-}$ ($x_1\ x_k$), or ($\Lambda x\ e$), where e is in A-normal form. While STALIN∇ implements let* natively, for expository purposes, in this paper, we assume that let* is implemented in the pure lambda calculus in terms of applications and lambda expressions. We further assume that all lambda expressions are α-converted.

We use $\mathcal{F}$ e to denote the set of free variables of an expression e:

$$\mathcal{F}x = (x)$$

$$\mathcal{F}(e_1 e_2) = (\mathcal{F}e_1) \cup (\mathcal{F}e_2)$$

$$\mathcal{F}(\Lambda xe) = (\mathcal{F}e)\backslash\{x\}$$

We use $\mathcal{B}$ e to denote the set of free variables in the lambda expression e that correspond to free variables in the original untransformed lambda expression that was (potentially) transformed (multiple times) to yield e:

$$\beta(\lambda xe) = \mathcal{F}(\lambda xe)$$

$$\beta e = \{\ \} \text{ where } \langle \sigma, e \rangle = \hat{t}$$

$$\beta\overleftarrow{\Lambda xe} = \{\overleftarrow{x'} \mid x' \in \beta(\Lambda xe)\}$$

The notation $\sigma, e\rangle$ and $\overleftarrow{t}$ used in the second equation above and the notation $\overleftarrow{\Lambda x\, e}$ used in the third equation above will be defined below. We refer to $\mathcal{B}$ e as the base free variables of e. The second equation above indicates that we take a lambda expression produced by transforming a primitive t as having no base free variables.

An environment σ is a finite map from variables to values. We use { } to denote the empty environment and use $\sigma_o$ to denote the top-level environment that contains the standard basis. A closure is a pair <σ, e>, where e is a lambda expression and the domain of σ includes $\mathcal{F}$ e. A value u is either the empty list [ ], a real number τ, a reverse-tagged value $\overleftarrow{v}$ (where u is [ ], a real, or a reverse-tagged value), a unary real primitive u, a binary real primitive b, a unary Boolean primitive p, a binary Boolean primitive q, an AD primitive 0, $\oplus\overleftarrow{\mathcal{J}}$, or $\overleftarrow{\mathcal{J}}^{-1}$, or a closure. Each language primitive u corresponds to some function u: $\mathbb{R} \to \mathbb{R}$ in the implementation. Each language primitive b corresponds to some function b: $\mathbb{R} \to \mathbb{R} \to \mathbb{R}$ in the implementation. Each language primitive p corresponds to some unary predicate p, over values, in the implementation. Each language primitive q corresponds to some binary relation q, over pairs of values, in the implementation. The language primitives 0, $\oplus$, $\overleftarrow{\mathcal{J}}$, and $\overleftarrow{\mathcal{J}}^{-1}$ correspond to the functions 0, $\oplus$, $\overleftarrow{\mathcal{J}}$ and $\overleftarrow{\mathcal{J}}^{-1}$ in the implementation. We use t to denote any primitive and refer to closures and primitives collectively as functions.

Recall that tagged lambdas indicate that expressions have been transformed. This allows one to determine whether a closure has been transformed. Value tags are used to tag non-closure values as having been transformed. Value tags stack to indicate multiply transformed values, much like lambda and variable tags stack. In the absence of sensitivity and backpropagator tags, correct programs obey two simple invariants. First, the tag stack of a function must be a prefix of the tag stack of an argument to which the function is applied. Second, the tag stack of a variable must be a prefix of the tag stack of a value to which the variable is bound.

We use $(v_1, v_2)$ as shorthand for the Church pair:

$$\langle \{(x_1 \mapsto v_1), (x_2 \mapsto v_2)\}, (\lambda x_3 x_3 x_1 x_2) \rangle$$

We often eliminate parentheses around pairs, taking comma to associate to the right. We use $[v_1, \ldots v_n]$ to denote a list. It is shorthand for $(v_1, \ldots v_n, [\,])$. To maintain the above invariants, we need to introduce transformed pairs and lists. We use $(v_{1,\Lambda} v_2), [\,]_\Lambda$, and $[v_1 \ldots, v_n]_\Lambda$ to denote pairs, empty lists, and lists that have been transformed according to the tag stack $\Lambda$:

$$(v_{1,\lambda} v_2) = (v_1, v_2)$$

$$\left( \overleftarrow{(\mathcal{J} v_1)}_{\overline{\Lambda}} \overleftarrow{(\mathcal{J} v_2)} \right) = \overleftarrow{\mathcal{J}} (v_{1,\Lambda} v_2)$$

$$[\,]_\lambda = [\,]$$

$$[\,]_{\overline{\Lambda}} = \overline{[\,]_\Lambda}$$

$$[v_1, \ldots, v_n]_\Lambda = (v_{1,\Lambda} \ldots,_\Lambda v_{n,\Lambda} [\,]_\Lambda)$$

The implementation $\overleftarrow{\mathcal{J}}$ of the primitive $\overleftarrow{\mathcal{J}}$ will be defined below. Note that pair and list formation, both in the base case, as well as in the transformed case, is invertible. Thus we often use this notation to indicate destructuring. Also note that we use this notation both when we write VLAD expressions and when we specify functions that implement VLAD.

We define the notion of conformance between two values as follows. The empty list conforms to itself. Two reals are conformant. A reverse-tagged value $\overleftarrow{v_1}$ conforms to another reverse-tagged value $\overleftarrow{v_2}$ if $v_1$ conforms to $v_2$. A primitive conforms to itself. Two environments are conformant if they have the same domains and both environments map each given variable to conformant values. Two closures are conformant if their environments are conformant and they have equivalent expressions.

We define an additional operation $\oplus$ between two conformant values as follows:

$$[\,] \oplus [\,] = [\,]$$

$$r_1 \oplus r_2 = r_1 + r_2$$

$$\overleftarrow{v_1} \oplus \overleftarrow{v_2} = \overleftarrow{v_1 \oplus v_2}$$

where $\overleftarrow{v_1}$ and $\overleftarrow{v_2}$ are reverse-tagged values $$t \oplus t = t$$

$$(\sigma_1 \oplus \sigma_2) x = (\sigma_1 x) \oplus (\sigma_2 x)$$

$$\langle \sigma_1, e \rangle \oplus \langle \sigma_2, e \rangle = \langle (\sigma_1 \oplus \sigma_2), e \rangle$$

We define the notion of match between a value and a corresponding sensitivity as follows. The empty list matches itself. Two reals match. A reverse-tagged value $\overleftarrow{v_1}$ matches another reverse-tagged value $\overleftarrow{v_2}$ if $v_1$ matches $v_2$. A primitive matches the empty list. A closure $\sigma, (\Lambda x\, e)^\prime$ matches a list $[v_1, \ldots v_n]_\Lambda$ when $x_1, \ldots, x_n$ are the elements of $\mathcal{E}$ $(\Lambda x\, e)$ ordered by $\prec$ and each $\sigma x_i$ matches $v_1$.

A zero is either $[\,]$, $0$, a primitive, or a closure whose environment maps every variable to a (possibly different) zero. Every value has exactly one matching zero. We use $\underline{0}v$ to denote the zero that matches $v$:

$$\underline{0}[\,] = [\,]$$

$$\underline{0}\, r = 0$$

$$\underline{0}\overleftarrow{v} = \overline{\underline{0}v} \quad \text{where } \overleftarrow{v} \text{ is a reverse-tagged value}$$

$$\underline{0}\, t = [\,]$$

$$\underline{0}\langle \sigma, (\Lambda x e) \rangle = [(\underline{0}(\sigma x_1)), \ldots, (\underline{0}(\sigma x_n))]_\Lambda$$

where $x_1, \ldots, x_n$ are the elements of $\beta(\Lambda x e)$ ordered by $-\prec$ To define the reverse transform, we first define the following transformations on let* bindings:

$$\phi\{x_i \triangleq x_j\} = \overleftarrow{x_i} \triangleq \overleftarrow{x_j}$$

$$\phi\{x_i \triangleq x_j x_k\} = (\overleftarrow{x_i}, \overline{x_i}) \triangleq \overleftarrow{x_j x_k}$$

$$\phi\{x_i \triangleq \Lambda x e\} = \overleftarrow{x_i} \triangleq \overleftarrow{\Lambda x e}$$

$$\rho\{x_i \triangleq x_j\} = \overline{x_j} \oplus \triangleq \overline{x_i}$$

$$\rho\{x_i \triangleq x_j x_k\} = \overline{(x_j x_k)} \oplus \triangleq \overline{x_j x_i}$$

$$\rho\{x_i \triangleq \Lambda x e\} = \left[\overline{x_i'}, \ldots, \overline{x_i'}\right]_\Lambda \oplus \triangleq \overline{x_i}$$

where $x_i', \ldots, x_i'$ are the elements of $\beta(\Lambda x e)$ ordered by $-\prec$ We use $\phi$ to denote the forward-phase transformation and $\rho$ to denote the reverse-phase transformation. Given these, the reverse transform $\overleftarrow{e}$ is:

$$\overleftarrow{\Lambda x_0 \, let \, x_1 \triangleq e_1;} = \overleftarrow{\Lambda x_0} \, let \, \phi\{x_1 \triangleq e_1\};$$

$$\vdots \qquad \vdots$$

$$x_m \triangleq e_m \qquad \phi\{x_m \triangleq e_m\}$$

$$in \, x_m \, end \qquad in \, (\overline{x_m},$$

$$(\lambda \overline{x_m}$$

$$let \, \overline{x_i'} \triangleq 0(\overleftarrow{\mathcal{J}}^{-1} \overline{x_i'});$$

$$\vdots$$

$$\overline{x_n'} \triangleq 0(\overleftarrow{\mathcal{J}}^{-1} \overline{x_n'});$$

$$\overline{x_0} \triangleq 0(\overleftarrow{\mathcal{J}}^{-1} \overline{x_0});$$

$$\vdots$$

$$\overline{x_{m-1}} \triangleq 0(\overleftarrow{\mathcal{J}}^{-1} \overline{x_{m-1}});$$

$$\rho\{x_m \triangleq e_m\};$$

$$\vdots$$

$$\rho\{x_1 \triangleq e_1\}$$

-continued $$\text{in } ([\overline{x_i'}, \ldots, \overline{x_n'}]_\wedge, \overline{x_0})$$

end)) end where $x'_1, \ldots, x'_n$ are the elements of $\mathcal{B}$ e ordered by $\prec$ and the reverse phase of $\overleftarrow{e}$ does not include any accumulation into sensitivity variables $\overline{x}$ where $x \notin \{x_o\} \cup (\mathcal{B}\ e)$. The result of the above transformation is converted to A-normal form and then α-converted. Note that this transform is invertible. This licenses the use of $\overline{\Lambda x\, e}$ to denote argument destructuring in the definition of $\mathcal{B}$.

Using the above machinery, the primitives $\overleftarrow{\mathcal{J}}$ and $\overleftarrow{\mathcal{J}}^{-1}$ can be implemented as follows:

$$\overleftarrow{\mathcal{J}}[\ ] = [\ ]$$

$$\overleftarrow{\mathcal{J}}\, r = \hat{r}$$

$$\overleftarrow{\mathcal{J}}\, \hat{v} = \overleftarrow{v}$$

where $\hat{v}$ is a reverse-tagged value $$\overleftarrow{\mathcal{J}}\, t = \overleftarrow{t}$$

$$\overleftarrow{\mathcal{J}}\, \langle \sigma, e \rangle = \langle \overleftarrow{\sigma}, \hat{e} \rangle$$

where $\overleftarrow{\sigma}\, \overleftarrow{x} = \overleftarrow{\mathcal{J}}\, (\sigma x)$, for $x \in (\mathcal{F}e)$, and $\overleftarrow{\sigma}\, x = \sigma_0\, x$, for $x \in (\mathcal{F}\hat{e}) \setminus (\mathcal{F}e)$ $$\overleftarrow{\mathcal{J}}^{-1}\, \overleftarrow{v} = v$$

where $\hat{v}$ is a reverse-tagged value $$\overleftarrow{\mathcal{J}}^{-1}\, \hat{t} = t$$

$$\overleftarrow{\mathcal{J}}^{-1}\, \langle \overleftarrow{\sigma}, \hat{e} \rangle = \langle \sigma, e \rangle$$

where $\sigma x = \overleftarrow{\mathcal{J}}^{-1}(\overleftarrow{\sigma}, \overleftarrow{x})$, for $x \in \mathcal{F}e$ In the above $\overleftarrow{t}$ denotes the transformation of the corresponding primitive t. These transformations will be defined below. Also note that $\overleftarrow{\mathcal{J}}^{-1}$ is the inverse of $\overleftarrow{\mathcal{J}}$. This licenses the use of $\overleftarrow{\mathcal{J}}$ to denote argument destructuring in the definition of $(v_1, \Lambda v_2)$.

We use $\sigma[x \mapsto v]$ to denote the map that agrees with $\sigma$ on all arguments except that it maps x to v. We have the following standard "eval/apply" evaluator:

$$\mathcal{E}\sigma x = \sigma x$$

$$\mathcal{E}\sigma(e_1 e_2) = \mathcal{A}(\mathcal{E}\sigma e_1)(\mathcal{E}\sigma e_1)$$

$$\mathcal{E}\sigma(\Lambda x e) = \langle \sigma, (\Lambda x e) \rangle$$

$$\mathcal{A}u v = \underline{u}\, v$$

$$\mathcal{A}b(v_1, v_2) = \underline{b}\, v_1 v_2$$

$$\mathcal{A}p v = \langle \{\ \}, (\lambda x_1 x_1 \lambda x_2 x_2) \rangle \text{ when } \underline{p}\, v$$

$$\mathcal{A}p v = \langle \{\ \}, (\lambda x_1 x_1 \lambda x_2 x_3) \rangle \text{ when} \neg\, (\underline{p}\, v)$$

-continued $$\mathcal{A}q(v_1, v_2) = \langle \{\ \}, (\lambda x_1 x_1 \lambda x_2 \lambda x_3 x_2) \rangle \text{ when } \underline{q}\, v_1 v_2$$

$$\mathcal{A}q(v_1, v_2) = \langle \{\ \}, (\lambda x_1 x_1 \lambda x_2 \lambda x_3 x_3) \rangle \text{ when} \neg\, (\underline{q}\, v_1 v_2)$$

$$\mathcal{A}0 v = \underline{0}\, v$$

$$\mathcal{A}\oplus(v_1, v_2) = v_1 \oplus v_2$$

$$\mathcal{A}\overrightarrow{\mathcal{J}}\, v = \overrightarrow{\mathcal{J}}\, v$$

$$\mathcal{A}\overrightarrow{\mathcal{J}}^{-1}\, v = \overrightarrow{\mathcal{J}}^{-1}\, v$$

$$\mathcal{A}\langle \sigma, (\Lambda x e) \rangle v = \mathcal{E}\sigma[x \mapsto v]e$$

All that remains is to show how to transform the primitives t into $\overleftarrow{t}$. We first do that for the primitives u, b, p, and q as follows:

$$\overleftarrow{u} = \mathcal{E}\sigma_0 \overleftarrow{\lambda}(\overleftarrow{\mathcal{J}}x)((\overleftarrow{\mathcal{J}}(ux)), (\lambda \overleftarrow{y}([\ ], ((\mathcal{D}\underline{u}x) \times \overleftarrow{y}))))$$

$$\overleftarrow{b} = \mathcal{E}\sigma_0 \overleftarrow{\lambda}(\overleftarrow{\mathcal{J}}(x_1, x_2))$$

$$((\overleftarrow{\mathcal{J}}(b(x_1, x_2))),$$

$$(\lambda \overleftarrow{y}([\ ],$$

$$(((\mathcal{D}_1 \underline{b}(x_1, x_2) 0 \times \overleftarrow{y}),$$

$$((\mathcal{D}_2 \underline{b}(x_1, x_2) 0 \times \overleftarrow{y}))))))$$

$$\overleftarrow{p} = \mathcal{E}\sigma_0 \overleftarrow{\lambda}(\overleftarrow{\mathcal{J}}x)((\overleftarrow{\mathcal{J}}(px)), (\lambda \overleftarrow{y}([\ ], (0 x))))$$

$$\overleftarrow{q} = \mathcal{E}\sigma_0 \overleftarrow{\lambda}(\overleftarrow{\mathcal{J}}(x_1, x_2))$$

$$((\overleftarrow{\mathcal{J}}(q(x_1, x_2))), (\lambda \overleftarrow{y}([\ ], ((0 x_1), (0 x_2)))))$$

In the above, $\mathcal{D}$ u x denotes a VLAD expression that evaluates the derivative of u at x and $\mathcal{D}_1$ b $(x_1, x_2)$ and $\mathcal{D}_2$ b $(x_1, x_2)$ denote VLAD expressions that evaluate the partial derivatives of b with respect to its first and second arguments, at $(x_1, x_2)$. Note that since $\overleftarrow{t}$ denotes a (transformed) value, we generate such a value, i.e. a closure, by evaluating a lambda expression in the top-level environment.

Closure now requires transformations of the AD primitives:

$$\overleftarrow{0} = \mathcal{E}\sigma_0 \overleftarrow{\lambda}(\overleftarrow{\mathcal{J}}x)((\overleftarrow{\mathcal{J}}(0x)), (\lambda \overleftarrow{y}([\ ], (0x))))$$

$$\overleftarrow{\oplus} = \mathcal{E}\sigma_0 \overleftarrow{\lambda}(\overleftarrow{\mathcal{J}}(x_1, x_2))((\overleftarrow{\mathcal{J}}(x_1 \oplus x_2)), (\lambda \overleftarrow{y}([\ ], (\overleftarrow{y}, \overleftarrow{y}))))$$

$$\overleftarrow{\mathcal{J}} = \mathcal{E}\sigma_0 \overleftarrow{\lambda}(\overleftarrow{\mathcal{J}}x)((\overleftarrow{\mathcal{J}}(\mathcal{J}x)), (\lambda \overleftarrow{y}([\ ], (\overleftarrow{\mathcal{J}}^{-1} \overleftarrow{y}))))$$

$$\overleftarrow{\mathcal{J}^{-1}} = \mathcal{E}\sigma_0 \overleftarrow{\lambda}(\overleftarrow{\mathcal{J}}\overleftarrow{x})((\overleftarrow{\mathcal{J}}(\mathcal{J}^{-1} \overleftarrow{x})), (\lambda \overleftarrow{y}([\ ], (\mathcal{J}\overleftarrow{y}))))$$

3-5 Examples of the Utility of Our Method

As mentioned in the introduction, to achieve closure, our method solves two technical problems:

It supports transformation of nested lambda expressions, particularly those with free-variable references. Moreover, it can handle the case where reverse-mode AD is applied to a function $f$ that takes an argument x and that, in turn, applies reverse-mode AD to a function g, nested inside f, that has a free reference to x, i.e. the argument to the surrounding function $f$.

It supports application of $\overleftarrow{\mathcal{J}}$ to itself.

We present two different examples, both of which illustrate the utility of our solution to these two technical problems. These examples run in our prototype implementation and are included in the distribution. We know of no other approach to reverse-mode AD that can handle these examples. Furthermore, our distribution contains benchmark scripts that use the metering facility of our prototype implementation to illustrate that our approach has the correct temporal complexity properties.

As a first example, consider a continuous two-person zero-sum game. Unlike conventional discrete games, where the two players select from finite sets of m and n strategies and the payoff is specified by an m×n matrix, our players select from multidimensional continuous strategies in $\mathbb{R}^m$ and $\mathbb{R}^n$ and the payoff is specified by a function $\mathbb{R}^m \times \mathbb{R}^n \to \mathbb{R}$. We wish to find the optimal minimax strategy, i.e. a saddle point in the payoff function. In traditional notation, this corresponds to computing $$\min_x \max_y f(x, y).$$

The gradient of a function can be computed with:

$$\nabla f x \triangleq CDR((CDR((\overleftarrow{\mathcal{J}}f)(\overleftarrow{\mathcal{J}}x)))1)$$

We then construct UNIVARIATEARGMIN (f, e), a univariate minimizer based on the golden-section algorithm using a translation of the mnbrak and golden functions from Numerical Recipes in C (Press et al., 1992) into VLAD. We omit the translation for brevity. We then construct a multivariate minimizer based on gradient descent:

ARGMIN$(f, x_0, \epsilon) \triangleq$
  let $g \triangleq \nabla f x_0$
  in if $\|g\| \leq \epsilon$
    then $x$
    else ARGMIN
      $(f,$
      $(x_0 + ((\text{UNIVARIATEARGMIN}$
      $((\lambda k f(x_0 + (k \times g))), \epsilon)) \times g)),$
      $\epsilon) fi$ end From this, we can construct:

ARGMAX$(f, x_0, \epsilon) \triangleq$ ARGMIN$((\lambda x - (f x)), x_0, \epsilon)$ MAX$(f, x_0, \epsilon) \triangleq f($ARGMAX$(f, x_0, \epsilon))$ Now let us construct a simple payoff function:

PAYOFF$([s, t], [u, v]) \triangleq s^2 + t^2 - u^2 - v^2$

The opitimal strategy $(x^*, y^*)$ can be found using:

let $x^* \triangleq$ ARGMIN
$((\lambda x \text{MAX}((\lambda y \text{ PAYOFF } (x, y)), y_0, \epsilon)), x_0, \epsilon)$ in $(x^*, ($ARGMAX$((\lambda y \text{ PAYOFF}(x^*, y)), y_0, \epsilon)))$ end Note that finding x* involves taking the derivative of λx . . . which in turn, involves taking the second derivative of λy . . . . Also note that λy . . . has a free reference to x, which is the argument to λx . . . . Finally note that λx . . . calls MAX, which calls ARGMAX, which calls ARGMIN, which calls ∇, which calls $\overleftarrow{\mathcal{J}}$. Since finding x* involves taking the derivative of λx . . . , this ultimately involves applying $\overleftarrow{\mathcal{J}}$ to itself.

As a second example, consider the computation and use of Hessians. A common misconception is that numerical methods based on Hessians are inefficient. While it is true that explicitly storing the Hessian takes space that is quadratic in the input size, and thus explicitly computing the Hessian takes time that is at least quadratic in the input size, one can compute the product of the Hessian and an arbitrary vector, with the same asymptotic temporal complexity as computing the original function, using double application of reverse-mode AD. Let $\mathcal{H}$ denote a higher-order function that maps a function $f$ from real vectors to reals to a function that computes the Hessian of f at a real vector. The quantity ($\mathcal{H}$ f x)×v can be computed as:

$$(CDR\ ((CDR\ ((\overleftarrow{\mathcal{J}}(\lambda x(CDR((CDR((\overleftarrow{\mathcal{J}}f)(\overleftarrow{\mathcal{J}}x)))1)) \cdot v)\overleftarrow{\mathcal{J}}x))\ 1))$$

where – denotes vector dot product.

Note that computing the Hessian obviously involves taking second derivatives, which in our case involves transforming the result of a transformation. Also note that λx . . . has a free reference to v. Finally note that the outer $\overleftarrow{\mathcal{J}}$ transforms λx . . . , which calls $\overleftarrow{\mathcal{J}}$. This ultimately involves applying $\overleftarrow{\mathcal{J}}$ to itself.

3-6 Discussion

A significant flaw in KM, the method of Karczmarczuk, lies in the improper handling of fanout and binary functions. As illustrated in FIG. 4, fanout and binary functions cooccur. You cannot have one without the other. With KM, backpropagators are associated with values. A backpropagator $\overline{x}$, associated with the value x, is a function from $\overline{x}$ to $\overline{x_\Theta}$, i.e. the sensitivity of the input to the entire program. Calling the backpropagator $\overline{x}$ invokes the reverse phase of the entire prior computation leading up to x. Backpropagators are composed by the transformed primitives. The backpropagator composed by the transformation $\overleftarrow{b}$ of a binary function b calls the backpropagators $\overline{x_1}$ and $\overline{x_2}$ of its two input $x_1$ and $x_2$ and adds their results after they return. In FIG. 1, the backpropagators $\overline{x_1}$ and $\overline{x_2}$ share and replicate the portion of the reverse phase corresponding to $f_0$ and the prior computation, even though they do not share the portion of the reverse phase corresponding to $f_1$ and $f_2$.

In contrast, with our method, backpropagators are associated with functions. A backpropagator for a function $f$ from $x_0$ to $x_n$ is a function from $\overline{x_n}$ to $\overline{x_0}$, i.e. the sensitivity of the input to that function. Calling a backpropagator returned by a function $f$ invokes just the portion of the reverse phase that corresponds to f. Backpropagators are not composed by the transformed primitives. Rather, when a function $f$ calls functions $f_1, \ldots, f_n$, the backpropagator $\overline{f}$ composes the backpropagators $\overline{f_1}, \ldots, \overline{f_n}$. In FIG. 4, when f fans the result of $f_0$ out to the inputs of $f_1$ and $f_2$, the backpropagator $\overline{f}$ can call the backpropagators $\overline{f_1}$ and $\overline{f_2}$ and add their results before calling $\overline{f_0}$ with this sum. Furthermore, neither $\overline{f_1}$ nor $\overline{f_2}$ perform the portion of the reverse phase corresponding to $f_0$ or the prior computation and thus no portion of the reverse phase is replicated.

KM uses backpropagators that retrace the entire computation history, where that history is represented as linked closures. Without some form of reflection on closures, it is not possible to detect and splice out the shared common history and insert the necessary reverse-accumulation points. In contrast, our method uses linked closure to represent backpropagators that retrace only disjoint portions of the computation history. These can be properly composed with the necessary reverse-accumulation points without such reflection. Doing this correctly requires creating accumulation points in the reverse phase for corresponding fanout points in the forward phase. Most programming languages, however, do not make fanout locally explicit. Our global program transformation can be viewed as doing just that.

If a program was constructed solely out of unary functions, it could not have fanout and thus would not be subject to these issues. Thus it may seem paradoxical, at first, that VLAD suffers from these issues, because by design, VLAD, like ML, supports only unary functions and unary primitives. The paradox is resolved by noticing that function application itself is a binary function. This is manifest in our method for supporting free variables: having backpropagators return an environment sensitivity paired with an input sensitivity and accumulating the environment sensitivity into the sensitivity of the target of an application and the input sensitivity into the sensitivity of the argument of that application. VLAD, like ML, uses tupling and currying to implement functions that take multiple arguments. With Church pairs, tupling, in turn, reduces to currying, which in turn, requires free variables.

Note that we have not eliminated the 'tape' from reverse-mode AD. It is not possible to do so because the tape stores intermediate values computed during the forward phase that are needed during the reverse phase. What we have done is to change the representation of the tape from an interpreted (or run-time compiled) data structure to pre-compiled closures. The traditional tape stores not only values but also operations on those values. The dichotomy between storing values and operations is reflected in our method by the fact that closures have environments to store values and expressions to store operations. Herein lies the difference: multiple closures with different environments can share the same expression. Using closures to represent the tape allows factoring out common sequences of operations performed on different values.

3-7 Conclusion

We have shown a novel method for implementing reverse-mode AD in a functional framework. This method exhibits three important closure properties:

1. It applies to any lambda-calculus expression, including those with free variables.
2. The transformation of a lambda-calculus expression is itself a lambda-calculus expression allowing repeated application to computer higher-order derivatives.
3. The asymptotic temporal complexity of a function is preserved under transformation.

Traditional implementations of reverse mode exhibits 3 but not 1 and 2. KM exhibits 1 and 2 but not 3.

Our method involves a global program transformation, implemented by a novel first-class programming-language primitive $\overleftarrow{\mathcal{J}}$, rather than a local transformation, implemented by overloading. This allows application of the reverse-mode transformation by programs within the language, rather than by a preprocessor. To achieve closure, we solved two technical problems: supporting transformation of nested lambda expressions with free-variable references and application of $\overleftarrow{\mathcal{J}}$ to itself. We have demonstrated the utility of the solution to these two technical problems with two practical examples, namely finding saddle points and computing Hessian-vector products.

4 First-Class Nonstandard Interpretations by Opening Closures

We motivate and discuss a novel functional programming construct that allows convenient modular run-time nonstandard interpretation via reflection on closure environments. This map-closure construct encompasses both the ability to examine the contents of a closure environment and to construct a new closure with a modified environment. From the user's perspective, map-closure is a powerful and useful construct that supports such tasks as tracing, security logging, sandboxing, error checking, profiling, code instrumentation and metering, run-time code patching, and resource monitoring. From the implementer's perspective, map-closure is analogous to call/cc. Just as call/cc is a non-referentially transparent mechanism that reifies the continuations that are only implicit in programs written in direct style, map-closure is a non-referentially-transparent mechanism that reifies the closure environments that are only implicit in higher-order programs. Just as CPS conversion is a non-local but purely syntactic transformation that can eliminate references to call/cc, closure conversion is a non-local but purely syntactic transformation that can eliminate references to map-closure. We show how the combination of map-closure and call/cc can be used to implement set! as a procedure definition and a local macro transformation.

4-1 Motivation

Nonstandard interpretation is a powerful tool, with a wide variety of important applications. Typical techniques for performing nonstandard interpretation are compile-time only, require modification of global resources, or require rewriting of code to abstract over portions subject to nonstandard semantics. This paper proposes a construct to support modular run-time nonstandard interpretation. For expository purposes, let us consider a very simple example of nonstandard interpretation. Suppose one wished to add complex numbers and complex arithmetic to a programming-language implementation that supports only real arithmetic. One might represent the complex number a+bi as an Argand pair (a,b). Extending the programming language to support complex arithmetic can be viewed as a nonstandard interpretation where real numbers r are lifted to complex number (r, 0), and operations such as $$+: \mathbb{R} \times \mathbb{R} \to \mathbb{R} \text{ are lifted to } +: \mathbb{C} \times \mathbb{C} \to \mathbb{C}.$$

$$(a_1, b_1) + (a_2, b_2) = (a_1 + a_2, b_1 + b_2)$$

One can accomplish this in SCHEME by redefining the arithmetic primitives, such as +, to operate on combinations of native SCHEME reals and Argand pairs ha, bi represented as SCHEME pairs (a . b). For expository simplicity, we ignore the fact that many of SCHEME's numeric primitives can accept a variable number of arguments. We define a new procedure lift-+ which we use to redefine + at the top level.

```
(define (lift-++)
 (lambda (x y)
  (let ((x (if (pair? x) x (cons x 0)))
   (y (if (pair? y) y (cons y 0))))
   (cons (+ (car x) (car y))
    (+ (cdr x) (cdr y))))))
(define + (lift-++))
```

This raises an important modularity issue. With the above definition, on can take a procedure f defined as (define (f x) (+x x))

and correctly evaluate (f'(2.3)) to (4.6). Once can even take a procedure g defined as (define g (let ((y 10)) (lambda (x) (+x y))))

and correctly evaluate (g'(1.2)) to (11.2). Theses examples work correctly irrespective of whether f and g are defined before or after + is redefined. In contrast, consider (define h (let ((p+)) (lambda (x) (p x 5))))

The expression (h'(1.2)) will evaluate correctly to (6.2) only if h was defined after + has been redefined. This is not the only modularity issue raised by this common technique: for instance, one might wish to confine the nonstandard interpretation to a limited context; one might wish to perform different nonstandard interpretations, either singly or cascaded; and one might wish to avoid manipulation of global resources.

The remainder of this paper discusses a novel mechanism, map-closure, which allows such nonstandard interpretation in code written in a functional style, and which avoids these modularity issues. As discussed in section 5, map-closure is a powerful and useful construct that supports such tasks as tracing, security logging, sandboxing, error checking, profiling, code instrumentation and metering, run-time patching, and resource monitoring.

4-3 A Functional Subset of SCHEME

We formulate these ideas using a simple functional language that resembles SCHEME, differing in the following respects:

The only data types supported are Booleans, reals, pairs, and procedures.
Only a subset of the built-in SCHEME procedures and syntax are supported.
Rest arguments are not supported.
The constructs cons and list are macros:

(cons $e_1 e_2$)   $\leadsto$   ((cons-procedure $e_1$)$e_2$)

(list)   $\leadsto$   '()

(list $e_1 e_2$ ... )   $\leadsto$   (cons $e_1$(list $e_2$ ... ))

Procedure parameters p can be variables, '( ) to indicate an argument that is ignored, or (cons p1 p2) to indicate the appropriate destructuring.
All procedures take exactly one argument and return exactly one result. This is accomplished in art by the basis, in part by the following transformations:

($e_1$)   $\leadsto$   ($e_1$'())

($e_1 e_2 e_3 e_4$ ... )   $\leadsto$   ($e_1$(cons * $e_2 e_3 e_4$ ... ))

(lambda () e)   $\leadsto$   (lambda ((cons * ))e)

(lambda ($p_1 p_2 p_3$ ... )e)   $\leadsto$   (lambda ((cons * $p_1 p_2 p_3$ ... ))e)

together with a cons* macro (cons*)   $\leadsto$   '()

(cons* $e_1$)   $\leadsto$   $e_1$ (cons* $e_1 e_2 e_3$ ... )   $\leadsto$   (cons $e_1$(cons* $e_2 e_3$ ... ))

and by allowing list and cons* as parameters.

The above, together with the standard SCHEME macro expansions, a macro for if (if $e_1 e_2 e_3$)$\leadsto$ ((if-procedure $e_1$(lambda()$e_2$)(lambda()$e_3$)))

and a transformation of letrec into the Y-combinator suffice to transform any program into the following core language:

e:: = (quote v)|x|($e_1 e_2$) | (lamdba (x)e)

4-4 Closure Conversion

The essence of closure conversion is to reify environments that contain the values of free variables in procedures by replacing procedures with pairs of environments and a transformed procedure. These transformed procedures have no free variables, and instead access the values of free variables from the reified environment passed as an argument. This can be implemented as a purely syntactic source-to-source transformation, as shown in FIG. 1.

We omit a number of bookkeeping details tangential to the issues we wish to explore. However, one bookkeeping issue relevant to our purpose does arise. We would like our new reflective mechanism to be invariant to choice of variable names. We therefore introduce a new data type, name, to key environments. The interface for names consists of the procedures name? and name=?, and the syntax (name x) which returns a unique name associated with the (potentially alpha-renamed) variable x. Given this transformation, map-closure can be transformed to (lambda (c )cons (cons f fc) (cons g gc)))
(cons g
(map (lambda (gn gv)
(cons gn (f fc gn gv)))
gc)))

The techniques described in this section and shown in FIG. 1 suffice to implement the examples of Section 4-2. While the simple implementation in FIG. 1 represents reified closure environments as alists and transformed procedures as pairs, map-closure does not expose this structure. An alternate implementation could thus use an alternate representation with suitable replacements for lookup, map, and the locations in the transformation where closures are constructed. Such an implementation might represent names as offsets into environment tuples.

4-5 The Utility of MAP-CLOSURE

Both alone and in combination with call/cc, map-closure is a powerful and general-purpose construct that can solve important software-engineering tasks. It is a portable mechanism for performing run-time dynamic nonstandard interpretation, a technique of increasing importance that arises in many guises ranging from security and debugging to web applications (mechanisms like AJAX that overload I/O operations to use HTTP/HTML). Consider the following examples as an indication of its myriad potential uses.

Programmers often desire the ability to examine an execution trace. FIG. 5 contains a trace procedure that traces all procedure entrances and exits during the invocation of thunk. Such a facility can easily be adapted to perform security logging.

Virtual machines are often able to execute code in a sandbox so as to constrain the allowed actions and arguments. FIG. 3 contains a sandbox procedure that invokes thunk in a context where all procedure invocations must satisfy the allowed? predicate or else the raise-exception procedure is called. Such a facility is useful both for security and error checking.

Many programming-language implementations contain a facility to profile code. FIG. 3 contains a profile procedure that constructs a table of the invocation counts of all procedures invoked during the invocation of thunk. Such a facility can easily be adapted to instrument and meter code in other ways.

One of the hallmarks of classical LISP implementations is the ability to patch code in a running system by changing the function bindings of symbols. The designers of COMMON LISP were aware that this mechanism could not be used to patch code referenced in closure slots. They addressed this with a kludge: treating a funcall to a symbol as a funcall to its function binding. FIG. 5 contains a more principled approach to this problem. The procedure patch replaces all live instances of old with new.

Finally, many programming-language implementations contain a facility to determine the amount of live storage. FIG. 5 contains a room procedure that returns a list of the number of live pairs and the number of live closure slots.

Facilities such as the above are normally implemented as system internals. FIG. 5 shows that many such facilities can be implemented as user code with map-closure.

4-6 Map-Closure+Call/CC=Set!

It is interesting to consider the application of map-closure to a continuation made explicit by call/cc. The source-to-source transformation of closure conversion described in section 4 does not allow this, because it does not closure-convert continuations. However, we could convert the program to continuation-passing style (CPS) first and then apply closure conversion, thus exposing all continuations to closure conversion as ordinary procedures. FIG. 2 describes this process. The transformations shown are standard, with one exception: the map-closure procedure itself needs to be handled specially, as (prior to closure conversion) it cannot be expressed as a user-defined procedure, and must be treated as a primitive. However, it is unique among primitives in that it invokes a procedural argument. Since this procedural argument will be in CPS after conversion, the CPS version of map-closure must invoke this argument with an appropriate continuation.

The combination of map-closure and call/cc is very powerful: it can be used to implement set! as a procedure definition in a language that does not have any built-in mutation operations. The intuition behind this is that set! changes the value of a variable for the remainder of the computation; call/cc exposes the remainder of the computation as a reified continuation; map-closure can make a new continuation just like the old one except that one particular variable has a new value; and thus invoking this new continuation instead of the old continuation has precisely the same result as set!. The simple definition shown in FIG. 2 accomplishes this intuition. There is, however, one minor complication: the recursion in set-in is necessary because the target variable might be present in closures nested in the environments of other closures. As a result unlike most SCHEME implementations, where set! takes constant time, the implementation in FIG. 2 must traverse the continuation to potentially perform substitution in multiple environments that close over the mutated variable.

While the ability to implement set! as a procedure definition combined with a local macro transformation is surprising and intriguing, it might be reasonable to consider this to be something of a curiosity. The combination of map-closure and call/cc is extremely powerful, and thus potentially difficult to implement efficiently. However map-closure in the absence of call/cc is still a useful construct for implementing nonstandard interpretation, and seems amenable to more efficient implementation. Thus, implementations supporting map-closure might not in general be expected to allow its application to continuations. Of the examples in FIG. 5, only patch and room rely on this ability.

4-7 Discussion

Functor-based module systems, overloading mechanisms such as aspect-oriented programming, and map-closure are related, in that all three support nonstandard interpretation. The difference is in the scope of that nonstandard interpretation. In a functor-based module system, the scope is lexical. With overloading, the scope is global. With map-closure, the scope is dynamic.

The dynamic scope of map-closure affords interesting control over modularity. One can apply a nonstandard interpretation to only part of a program. Or, different nonstandard interpretations to different parts of a program. Or, to different invocations of the same part of a program. One can compose multiple nonstandard interpretations, controlling the composition order when they do not commute. For example, composing complex arithmetic with logging arithmetic in different orders would allow one to control whether one logged the calls to complex arithmetic or the calls to the operations used to implement complex arithmetic. With map-closure, nonstandard interpretations become first-class entities.

If all aggregate data structures are Church-encoded as closures, CPS conversion followed by closure conversion subsumes store conversion: it explicitly threads a store, represented as an environment, through the program. However, compilers that perform both CPS conversion and closure conversion generally do so in the opposite order. Just as call/cc affords one the power of explicit continuations while allowing one to write in direct style, map-closure affords one the power of explicit closure environments while allowing one to write in higher-order style. The combination of call/cc and map-closure affords the power of explicit store threading while allowing one to write in a direct higher-order style.

In the implementation of set! in FIG. 3, the original continuation is not mutated but discarded. Instead of discarding this original continuation, it can be preserved and invoked later in order to implement such control structures as fluid-let and amb with associated side effects that are undone upon backtracking. Side effects that can be undone can be used to implement PROLOG-style logic variables and unification. All this can be implemented as defined procedures and local macro transformations in a language that has no explicit mutation operations, but that supports call/cc and map-closure, allowing map-closure to apply to continuations.

Like other powerful constructs, map-closure may seem difficult to implement efficiently. However, the same was said of constructs like recursion, dynamic typing, garbage collection, and call/cc when first introduced. Of particular concern is that it may appear that map-closure precludes compiler optimizations such as inlining, especially of primitive procedures. Well known techniques (e.g., declarations, module systems, and flow analysis) allow SCHEME compilers to perform inlining despite the fact that the language allows redefinition of (primitive) procedures. These techniques can be extended and applied to allow inlining in the presence of map-closure. Even without such techniques, map-closure does not preclude inlining: a compiler can generate whatever code it wishes, so long as the run-time system can reconstruct the closure-slot information that map-closure passes to its first argument, and any information needed to construct the result closure. Each invocation of map-closure might even perform run-time compilation, including optimizations such as inlining.

The history of programming-language research is replete with examples of powerful constructs that were initially eschewed for performance reasons but later became widely adopted as their power was appreciated and performance issues were addressed. We hope that this will also be the case for map-closure.

Note that, by design, map-closure does not expose the internal representation of closures and environments to the user. This design also preserves hygiene: the lexical hierarchy of variable scoping. Since map-closure does not allow one to add, remove, or rename variables, it is not possible to create unbound variable references or change the lexical scoping of variables through shadowing or unshadowing at run time.

An alternate, more traditional way to provide the functionality of map-closure would be to provide an interface to access the environment and code components of closures and construct new closures out of such environment and code components, along with an interface to access environment components and construct new environments. However, such an alternate interface would expose the internal representation of closures and environments to the user, perhaps via interfaces and data types that differ in detail between implementations, and might well break hygiene. On the other hand, map-closure exposes only one new data type: names as passed as the first argument to the first argument of map-closure. The values passed as the second argument to the first argument of map-closure and the values returned by the first argument of map-closure are ordinary SCHEME values.

Also note that names are opaque. They are created by new syntax to allow implementations to treat them as variables in every sense. They can only be compared via identity, so an implementation is free to represent names in the same way as variable addresses: stack offsets, absolute global addresses, etc. In fact, just as implementations can have different representations of variable addresses for variables of different types and lifetimes, implementations can have similarly different representations of names. Moreover names can be avoided entirely by using a weaker variant of map-closure that only exposes closure-slot values. Such a weaker variant suffices for many applications, including all examples here except for the implementation of set!.

Closure conversion is not the only implementation strategy for map-closure. For instance, a native implementation could operate directly on higher-order code. Such an implementation would only need a mechanism for accessing slots of existing closures and creating closures with specified values for their slots. These mechanisms already exist in any implementation of a higher-order language, and must simply be repackaged as part of the implementation of a map-closure primitive. Furthermore, native implementations of map-closure are possible in systems that use alternate closure representations, such as linked or display closures, unlike the flat-closure representation used here. While the implementation of map-closure for different representations of closures and environments would be different, programs that use map-closure would be portable across all such implementations. This is not the case with the aforementioned alternate interface.

Nonstandard interpretation is ubiquitous in programming language theory, manifesting itself in many contexts. It could be reasonably suggested that the lack of a simple way to easily perform a nonstandard interpretation may have held back the application of this powerful idea, and resulted in a great deal of implementation effort building systems that each perform some specific nonstandard interpretation. For this reason map-closure, or some other construct that provides first-class dynamic nonstandard interpretation, may prove a surprisingly handy tool. In fact, the authors have already found it quite useful in the implementation of automatic differentiation in a functional programming language.

5 Compiling a Higher-Order Functional-Programming Language with a First-Class Derivative Operator to Efficient Fortran-Like Code with Polyvariant Union-Free Flow Analysis We present a novel functional-programming language that supports forward automatic differentiation (AD). Typical implementations of forward AD use either overloading or source-to-source transformation to implement the nonstandard interpretation needed to perform forward AD. These offer complementary tradeoffs. Overloading can afford greater flexibility and expressiveness by allowing the user of a function to evaluate the derivative of that function, for some input value, without access to its source code. Source-to-source transformation can afford greater performance by eliminating the dispatching associated with overloading. Our language employs a novel approach to forward AD, providing a first-class higher-order function that conceptually performs source-to-source transformation of closure bodies at run time and an optimizing compiler that eliminates such run-time reflection using whole-program inter-procedural flow analysis. This provides both the greater flexibility and expressiveness of overloading and the greater efficiency of source-to-source transformation. We present several examples that demonstrate the superior performance of our approach when compared with a number of prior forward AD implementations for both functional and imperative languages.

5-1 Introduction

Numerical programmers face a tradeoff. They can use a high-level language, like MATLAB, that provides convenient access to mathematical abstractions like function optimization and differential equation solvers or they can use a low-level language, like FORTRAN, to achieve high computational performance. The convenience of high-level languages results in part from the fact that they support many forms of run-time dependent computation: storage allocation and automatic reclamation, data structures whose size is run-time dependent, pointer indirection, closures, indirect function calls, tags and tag dispatching, etc. This comes at a cost to the numerical programmer: the instruction stream contains a mix of floating-point instructions and instructions that form the scaffolding that supports run-time dependent computation. FORTRAN code, in contrast, achieves high floating-point performance by not diluting the instruction stream with such scaffolding.

This tradeoff is particularly poignant in the domain of automatic differentiation or AD. AD is a collection of techniques for evaluating the derivative of a function specified by a computer program at a particular input. In the next section, we review forward AD, the particular technique used in this section. Conceptually, at least, in its simplest form, forward AD can be provided with a simple API:

$$(\text{derivative } f : \mathbb{R} \to \mathbb{R} x : \mathbb{R}) : \mathbb{R}$$

or a curried variant. The advantage of such a formulation as a higher-order function is that it allows construction of a whole hierarchy of mathematical concepts, like partial derivatives, gradients, function optimization, differential-equation solvers, etc. that are built upon the notion of a derivative. Moreover, once one defines such abstractions, it is natural and useful to be able to nest them, e.g., to optimize a function that in turn optimizes another function:

```
(optimize
  (lambda (x)
    (optimize (lambda (y) ...) ...))
  ...)
``` or to optimize a function that solves a differential equation:

```
(optimize
  (lambda (x)
    (solve-ode(lambda (y) ...) ...))
  ...)
```

Inter alia, this entails the cost of closures and indirect function calls. Moreover, as we will see in the next section, such a derivative operator typically evaluates f at x under a nonstandard interpretation. This is typically done by overloading the arithmetic primitives and thus often precludes inlining such primitives and often further entails the cost of tagging and tag dispatching.

Another approach to forward AD involves a preprocessor to perform a source-to-source transformation. Conceptually, at least, in its simplest form, this can be viewed as translating a function:

(double f(double x) { ... } into:

struct bundle double primal:

double tangent;};

struct bundle f_forward (double x) { ... } that returns a bundle of the primal value f(x) and the tangent value f'(x). When implemented properly, repeated application of this transformation can be used to produce variants of f that compute higher-order derivatives. Herein lies the inconvenience of this approach. Different optimizers might use derivatives of different order. Changing code to use a different optimizer would thus entail changing the build process to transform the objective function a different number of times. Moreover, the build process for nested application, such as the nested optimization shown above, would be tedious. One would need to transform the inner objective function, wrap it in a call to optimize, and then transform this resulting outer function.

The central contribution of this paper is a new language that provides a mechanism for defining a derivative operator that offers the convenience of the first approach with the efficiency of the second approach. Conceptually, at least, this mechanism involves run-time reflection on the body of f, when computing (derivative f), to transform it into something like f_forward. An optimizing compiler then uses whole-program inter-procedural flow analysis to eliminate such run-time reflection, as well as all other run-time scaffolding, to yield numerical code with FORTRAN-like efficiency.

Let us summarize the typical characteristics of numerical code and its associated execution model. Numerical code typically does not use union types and thus its execution model does not use tags and tag dispatching. In numerical code, all aggregate data typically has fixed size and shape that can be determined at compile time. Thus in the execution model, such aggregate data is unboxed and does not require indirection for data access and run-time allocation and reclamation. Numerical code is typically written in languages where primitive arithmetic operations are specified by special syntax and not as function calls. Thus in the execution model, such operations are inlined and do not entail function-call overhead. Numerical code typically does not use higher-order functions. Thus in the execution model, all function calls are to known targets and do not involve indirection or closures. Numerical code is typically written in languages that do not support reflection. Thus it does not reflectively access, modify, or create code during execution. We refer to such code and its corresponding execution model as FORTRAN-like. When properly compiled, FORTRAN-like numerical code can exhibit significantly greater performance than numerical code written in a non-FORTRAN-like style compiled with typical compilers.

We present a compiler that generates FORTRAN-like target code from a class of programs written in a higher-order functional programming language with a first-class derivative operator. Our compiler uses whole-program inter-procedural flow analysis to drive a code generator. Our approach to flow analysis differs from that typically used when generating non-FORTRAN-like code. First, it is polyvariant. Monovariant flow analyses like 0-CFA are unable to specialize higher-order functions. Polyvariant flow analysis is needed to do so. The need for polyvariant flow analysis is heightened in the presence of a higher-order derivative operator, i.e., one that maps functions to their derivatives. Second, it is union free. The absence of unions in the abstract interpretation supports generation of code without tags and tag dispatching. The further absence of recursion in the abstract interpretation means that all aggregate data will have fixed size and shape that can be determined by flow analysis allowing the code generator to use unboxed representations without indirection in data access or runtime allocation and reclamation. The polyvariant analysis determines the target of all call sites allowing the code generator to use direct function calls exclusively. This, combined with aggressive inlining, results in inlined arithmetic operations, even when such operations are conceptually performed by (overloaded) function calls. The polyvariant analysis unrolls finite instances of what is written conceptually as recursive data structures. This, combined with aggressive unboxing, eliminates essentially all manipulation of aggregate data, including closures. Our limitation to union-free analyses and finite unrolling of recursive data structures is not as severe a limitation as it may seem. The main limitation relative to FORTRAN-like code is that we currently do not support arrays. Finally, the polyvariant analysis performs finite instances of reflection, migrating such reflective access to and creation of code from run time to compile time.

The remainder of the paper is organized as follows. Section 5-2 reviews the technique of forward AD. Section 5-3 gives an informal discussion of the novel reflective mechanism of our language and how it supports forward AD. Section 5-4 discusses our language in greater detail. Section 5-5 discusses the flow-analysis techniques used in our compiler. Section 5-6 discusses how the results of flow analysis can be used to generate FORTRAN-like code. Section 5-7 presents examples that illustrate the effectiveness of our compiler. Section 5-8 discusses this work in a broader context.

5-2 Review of Forward AD

The Taylor expansion of f(c+∈) with respect to ∈ is:

$$f(c+\varepsilon) = \sum_{i=0}^{\infty} \frac{1}{i!} \frac{d^i f(x)}{dx^i}\bigg|_{x=c} \varepsilon^i$$

This implies that one can compute the i-th derivative of a univariate function f at a scalar point c by evaluating f(c+∈)

under a nonstandard interpretation replacing real numbers with univariate power series in $\in$, extracting the coefficient of $\in^i$ in the result, and multiplying this by i!. Traditional forward AD truncates the Taylor expansions at i>1, thus computing a representation that contains only the first derivative.

Such truncated Taylor expansions are dual numbers. We denote a dual number as $x+ \overline{x'} \in$, by analogy with the standard notation a+bi for complex numbers. Just as arithmetic on complex numbers a+bi can be defined by taking $i^2=-1$, arithmetic on dual numbers $x+ \overline{x'} \in$ can be defined by taking $\in^2=0$ but $\in \neq 0$. Furthermore, just as implementations of complex arithmetic typically represent complex numbers a+bi as Argand pairs <a, b>, implementations of forward AD typically represent dual numbers $x+ \overline{x'} \in$ as tangent-bundle pairs $\langle x, \overline{x'} \rangle$.

Forward AD computes the derivative of a univariate function $f$ at a scalar point c by evaluating f (c+$\in$) under a nonstandard interpretation replacing real numbers with dual numbers and extracting the coefficient of $\in$ in the result. To see how this works, let us manually apply the mechanism to a simple example: computing the first derivative of $f(x)=x^4+2x^3$ at x=3. To do this, we first evaluate f(3+$\in$):

$$f(3+\varepsilon) = (3+\varepsilon)^4 + 2(3+\varepsilon)^3$$
$$= (81+108\varepsilon) + 2(27+27\varepsilon)$$
$$= 135 + 162\varepsilon$$

From this we can extract the derivative 162. Note that the above makes use of the restriction that $\in^2=0$ when evaluating the expressions $(3+\in)^3=27+27\in$ and $(3+\in)^4=81+108\in$, dropping the $\in^2$, $\in^3$, and $\in^4$ terms. This is the essence of traditional forward AD when limited to the case of univariate derivatives.

Note that in the above, we use the notation of dual numbers, i.e., $x+ \overline{x'} \in$, purely for expository purposes. Implementations typically do not symbolically evaluate expressions over polynomials or power series. Rather they manipulate tangent-bundle pairs $\langle x, \overline{x'} \rangle$ in a fashion much like complex numbers.

Since at least as far back as 1964, forward AD has been widely used for scientific and engineering computation. (Since at least as far back as 1980, reverse AD has been widely used as well.) See www.autodiff.org for a plethora of implementations of forward (and reverse) AD in a multitude of programming languages.

Broadly speaking, there are two general classes of approaches for performing the nonstandard interpretation indicated above. One approach is to represent tangent-bundle pairs $\langle x, \overline{x'} \rangle$ (henceforth simply bundles) as objects and overload the arithmetic primitives to manipulate such objects. The other is to transform the source code, replacing each real variable x with a pair of real variables x and $\overline{x'}$ and augmenting the source code with expressions and statements to compute the $\overline{x'}$ values.

These two approaches exhibit complementary tradeoffs. The overloading approach, particularly when it allows arithmetic operations to apply to either numbers or bundles, supports a callee derives programming style. A function optimizer can be written as a higher-order function, taking an objective function as its argument. The optimizer can invoke the objective function with a bundle to compute its derivative and perform gradient-based optimization, without knowledge of the caller. In contrast, the transformation approach requires a caller derives programming style. The optimizer takes two function arguments, the objective function and its derivative, and the caller must arrange for the build system to transform the code for the objective function into code for its derivative. The overloading approach thus supports a greater level of modularity, allowing one to build a hierarchal library of mathematical functionality where the need for derivatives is kept internal to that library, hidden from the user. The transformation approach requires exposing the need for derivatives all the way up the signatures of functions in that hierarchal library.

The overloading approach exhibits another advantage. When implemented correctly, one can take derivatives of functions that in turn take derivatives of other functions. We illustrate the utility of doing so in Subsection 5-7. This involves computing higher-order derivatives. A properly implemented overloading approach can compute derivatives of arbitrary order, even when the requisite order is not explicitly specified and only implicit in the control-flow of the program. When implemented correctly, the transformation approach can also transform transformed code to compute higher-order derivatives. The difference is that, since the transformation is typically done by a preprocessor, the preprocessor must be explicitly told which higher-order derivatives are needed.

In contrast, the overloading approach exhibits a computational cost that is not exhibited by the transformation approach. Unless specifically optimized, bundles must be allocated at run time, accessing the components of bundles requires indirection, and overloaded arithmetic is not inlined and requires run-time dispatch and perhaps even indirect function calls. The transformation approach, however, can yield FORTRAN-like code without these run-time costs and has thus become the method of choice in the scientific and engineering communities where the speed of numerical code is of paramount importance.

In this section we present a novel approach that attains the advantages of both the overloading and transformation approaches. We present a novel functional-programming language, VLAD, that contains mechanisms for transforming code into new code that computes derivatives. These mechanisms apply to the source code that is, at least conceptually, part of closures. Conceptually, at least, such transformation happens at run time. The availability of such transformation mechanisms at run time supports a callee derives programming style where the callee invokes the transformation mechanisms on closures provided by the caller. Again, conceptually at least, the availability of run-time transformation mechanisms eliminates the preprocessor and allows a program to compute derivatives whose order depends on run-time control-flow. A novel aspect of this system is the application of polyvariant flow analysis to perform the requisite transformations at compile time instead of run time. The remainder of this paper describes the VLAD language, including the code-transformation mechanisms, describes the polyvariant flow-analysis and code-generation techniques we have developed for the STALIN$\nabla$ compiler for VLAD, and illustrates the ability of these techniques to generate FORTRAN-like target code from VLAD source code.

5-3 Overview

Given the formulation from the previous section, evaluation of (f x) under the nonstandard interpretation implied by forward AD requires two things. First, one must transform f so that it operates on bundles instead of reals. We introduce the function j* to accomplish this. Second, one must bundle x with a tangent. We introduce the function bundle to accomplish this. When computing simple derivatives, the tangent of the independent variable is one. Thus is accomplished by evaluating the expression ((j* f) (bundle x 1)). This yields a bundle containing the value of f(x) with its derivative f'(x). We introduce the functions primal and tangent to extract these components. With these, the derivative operator for functions $\mathbb{R} \to \mathbb{R}$ can be formulated as a higher-order function:

```
(define (derivative f)
  (lambda (x)
    (tangent ((j* f) (bundle x 1)))))
```

Several complications arise. The function $f$ may call other functions, directly or indirectly, and all of these may call primitives. All of these need to be transformed. We assume that primitives are not inlined (at least conceptually) and that every function or primitive that is called is reachable as a (possibly nested) value of a free variable closed over by f. As closures are usually opaque, a reflective mechanism is needed to access such values. Thus j* is formulated using the conceptual framework of map-closure.

Primitives don't have closures. Thus j* must know how to transform each primitive into an appropriate function, usually implemented as a closure.

The functions reachable from f that j* needs to transform might not be the direct values of the free variables closed over by f. The may be nested in aggregate data which includes the closure slots of other functions. Thus the machinery of map-closure must be applied recursively and combined with machinery to traverse other non-opaque aggregates.

We assume that all constants accessed by f are represented as values of free variables closed over by f (i.e., constant conversion). These, along with other closed-over variables (that are treated as constants for the purpose of computing derivatives) must have all (potentially nested) reals bundled with zero. Thus j* conceptually incorporates the mechanism of bundle.

Similarly, the input data x might be aggregate. With such, partial derivatives can be computed by taking one real component to be the independent variable, and thus bundled with one, and the other real components to be constants, and thus bundled with zero. Alternatively, directional derivatives can be computed by bundling the real components of x with the corresponding components of the direction vector. Thus we generalize bundle to take aggregate data paired with an aggregate tangent containing the direction-vector components. It is necessary to have the primal and tangent arguments to bundle have the same shape. Thus when the primal argument contains discrete values, we fill the corresponding components of the tangent argument with the same values as the primal argument. We justify this in section 4.1.

Just as the input data might be aggregate, the result of a function might also be aggregate. Accordingly, we generalize primal and tangent to take arbitrary aggregate data that contains (possibly nested) bundles as arguments and traverse such data to yield result data of the same shape containing only the primal or tangent components of these (possibly nested) bundles. Such aggregate data may contain opaque closures. So that primal and tangent can traverse these closures, they too are formulated with the machinery of map-closure.

The aggregate value x may contain closures (which get called by f). Thus these (and all functions and closed-over reals that they can access) also need to be transformed. Thus bundle conceptually incorporates the mechanism of j*. The mechanism of j* conceptually is the same as bundling all closed-over values with zero. However, since some of those closed-over values may be (and usually are) opaque closures, there is no way for a user to construct an appropriate closure as a tangent value whose slots are zero. Thus we introduce the function zero that maps an arbitrary data structure x, possibly containing possibly nested closures, to a tangent value of the same shape with zero tangent values in all slots that correspond to those in x that contain reals. Since zero may need to traverse opaque closures, it too is formulated with the machinery of map-closure.

With this, j* can be defined as:

```
(define (j*x) (bundle x (zero x)))
``` so long as bundle transforms primitives. With this, primal and tangent must know how to perform the inverse transformation from transformed primitives back to the corresponding original primitives.

5-4 VLAD: A Functional Language for AD

VLAD is a simple higher-order functional-programming language designed to support AD. It resembles SCHEME, differing in the following respects:

The only SCHEME data types supported are the empty list, Booleans, reals, pairs, and procedures.

Only a subset of the builtin SCHEME procedures and syntax are supported.

Rest arguments are not supported

The construct cons is builtin syntax.

The construct list is a macro:

```
(list)                  ⇝ '()
(list e₁ e₂ ... )       ⇝ (cons e₁ (list e₂ ... ))
```

Procedure parameters p can be variables, '( ) to indicate an argument that is ignored, or (cons $p_1$ $p_2$) to indicate the appropriate destructing.

All procedures take exactly one argument and return exactly one result. This is accomplished in part by the basis, in part by the following transformations:

```
($e_1$)                      ⇝ ($e_1$'())
($e_1 e_2 e_3 e_4$ ... )     ⇝ ($e_1$(cons* $e_2 e_3 e_4$ ... ))
(lambda ()e)                 ⇝ (lambda ((cons*))e)
(lambda ($p_1 p_2 p_3$ ... )e) ⇝ (lambda ((cons* $p_1 p_2 p_3$ ... ))e)
``` together with a cons* macro:

```
(cons*)                     ⇝ '()
(cons* $e_1$)               ⇝ $e_1$
(cons* $e_1 e_2 e_3$ ... )  ⇝ (cons $e_1$(cons* $e_2 e_3$ ... ))
``` and by allowing list and cons* as parameters.

The above, together with the standard SCHEME macro expansions, a macro for if:

```
(if $e_1 e_2 e_3$)   ⇝ (if-procedure $e_1$(lambda()$e_2$)(lambda ()$e_3$))
``` and conversion of constants into references to variables bound in a top-level basis environment (i.e., constant conversion) suffice to transform any program into the following core language:

$$e ::= x | (\text{lambda } (x) e) | (e_1 e_2) | (\text{letrec}((x_1 e_1) \ldots (x_n e_n)) e) | (\text{cons } e_1 e_2)$$

We often abbreviate (lambda (x) e) as $\lambda x\, e$, $(e_1\, e_2)$ as $e_1\, e_2$, and (cons $e_1\, e_2$) as $e_1, e_2$. For expository purposes, we omit discussion of letrec for the remainder of this section.

We use x to denote variables, e to denote expressions, and v to denote VLAD values. Values are either scalar or aggregate. Scalars are either discrete, such as the empty list, booleans, or primitive procedures (henceforth primitives), or continuous, i.e., reals. Aggregate values are either closures ($\sigma$, e) or pairs $v_1, v_2$, where $\sigma$ is an environment, a (partial) map from variables to values, represented extensionally as a set of bindings $x \mapsto v$. Pairs are constructed by the core syntax $e_1, e_2$ and the components of pairs can be accessed by the primitives car and cdr.

5-4.1 The Forward AD Basis

We augment the space of aggregate values to include bundles denoted as $v_1 \triangleright v_2$. We refer to the first component of a bundle as the primal value and the second component of a bundle as the tangent value. Unlike pairs, which can contain arbitrary values as components, bundles are constrained so that the tangent is a member of the tangent space of the primal. We will define the tangent space momentarily. We augment the basis with the primitive bundle to construct bundles, the primitives primal and tangent to access the components of bundles, and the primitive zero to construct zero elements of the tangent spaces.

We denote an element of the tangent space of a value v as $\overrightarrow{v}$ and an element of the bundle space of a value v, i.e., the space of bundles $v \triangleright \overrightarrow{v}$, as $\overrightarrow{v}$. We will formally define the tangent and bundle spaces momentarily. We first give the informal intuition.

Defining the tangent and bundle spaces for reals is straightforward. The tangent of a real is a real and the bundle of a real with its real tangent is a pair thereof. We use $v_1 \triangleright v_2$ instead of $(v_1, v_2)$ to distinguish bundles from pairs created by cons. The definition of tangent and bundle spaces becomes more involved for other types of data. Conceptually, at least, we can take the bundle space of any value $v_1$ to be the space of bundles $v_1 \triangleright v_2$ where $v_2$ is a member of an appropriate tangent space of $v_1$. For now, let us take the tangent of a pair to also be a pair. (We will justify this momentarily.) With this, we can take the bundle space of a pair $(v_1, v_2)$ to be $((v_1, v_2) \triangleright (v_3, v_4))$. Alternatively, we can interleave the components of the tangent with the components of the primal: $((v_1 \triangleright v_3), (v_2 \triangleright v_4))$ The former has the advantage that extracting the primal and tangent is simple but the disadvantage that extracting the car and cdr requires traversing the data structure. The latter has complementary tradeoffs.

Conceptually, at least, we can use either representation for the bundle space of closures. However, the interleaved representation has an advantage: it is also a closure:

$$\langle \{x_1 \mapsto (v_1 \triangleright v'_1), \ldots, x_n \mapsto (v_n \triangleright v'_n)\}, e \rangle$$

and thus can be invoked by the same evaluation mechanism as ordinary closures for primal values. The non-interleaved representation, however, is not a closure:

$$\langle \{x_1 \mapsto v_1, \ldots, x_n \mapsto v_n\}, e \rangle \triangleright (\ldots, v'_1, \ldots, v'_n, \ldots)$$

It is a primal closure bundled with an element of the tangent space of that closure, whatever that is, and would require a novel evaluation mechanism. This motivates using the interleaved representation, at least for closures.

Conceptually, at least, the above issue affects only closures. One could adopt either representation for other aggregate data. However, we wish our programs to exhibit another desirable property. In the absence of AD, the semantics of a program is unchanged when one replaces a builtin aggregate data type, like pairs, with an encoding as closures, like that of Church or Scott. This implies, that conceptually at least, all aggregate data must use the interleaved representation.

This creates an ambiguity: does $((v_1 \triangleright v_3), (v_2 \triangleright v_4))$ represent a pair of two bundles $(v_1 \triangleright v_3)$ and $(v_2 \triangleright v_4))$ or a bundle of two pairs (v1, v2) and (v3, v4) (that has been interleaved)? To resolve this ambiguity, we introduce the notion of a 'bundled' pair $(v_1 \overrightarrow{\triangleright} v_2)$. We augment our core syntax with expressions $e_1 \overrightarrow{\triangleright} e_2$ to construct bundled pairs. Note that we must support the ability to represent and construct multiply bundled pairs $(v_1 \overrightarrow{\overrightarrow{\triangleright}} v_2), (v_1 \overrightarrow{\overrightarrow{\triangleright}} v_2) \ldots$.

A similar ambiguity arises for closures: does $$\langle \{x_1 \mapsto (v_1 \triangleright v'_1), \ldots, x_n \mapsto (v_n \triangleright v'_n)\}, \lambda x e \rangle$$

represent a primal closure that happens to close over bundle values or a bundled closure? To resolve this ambiguity, we adopt a tagging scheme $\overrightarrow{x}$ for variables x to indicate that they contain bundles. The above would indicate a primal closure (that happens to close over bundle values) while:

$$\langle \{\overrightarrow{x_1} \mapsto (v_1 \triangleright v'_1), \ldots, \overrightarrow{x_n} \mapsto (v_n \triangleright v'_n)\}, \lambda \overrightarrow{x} \overrightarrow{e} \rangle$$

would indicate a bundled closure. We transform the bodies e of the lambda expressions associated with closures to access the suitably tagged variables and also to construct suitably bundled pairs.

The question then arises: what form should the tangent space of aggregate data take? The tangent of a piece of aggregate data must contain the same number of reals as the corresponding primal. Conceptually, at least, one might consider representing the tangent of one object with an object of a different type or shape, e.g., taking the tangent of a closure to be constructed out of pairs. However, one can show that any function $f$ that only rearranges a data structure containing reals to a different data structure containing reals, without performing any operations on such reals, must exhibit the following property:

$((j^* f) x) = (\text{bundle } (f (\text{primal } x)) (f (\text{tangent } x)))$

Since f must perform the same rearrangement on both the primal and the tangent, it must be insensitive to its type or shape. As VLAD functions can be sensitive to their argument's type or shape, this implies that the tangent of an aggregate object must be of the same type and shape as the corresponding primal. This further implies that the tangent of a discrete object such as the empty list, a boolean, or a primitive, must be the same as that object.

We now formalize the above intuition. We introduce a mechanism for creating a new variable $\overrightarrow{x}$ that corresponds to an existing variable x (which may in turn be such a newly created variable). The variable $\overrightarrow{x}$ must be distinct from any existing variable including x. Any variable $\overrightarrow{x}$ will contain an element of the bundle space of the corresponding variable x. Our AD transformations rely on a bijection between the space of variables x and the space of variables $\overrightarrow{x}$.

We introduce the following transformation between the space of expressions e that manipulate primal values to the space of expressions $\overrightarrow{e}$ that manipulate bundle values:

$$\overline{\lambda x e} \rightsquigarrow \lambda \overrightarrow{x}\, \overrightarrow{e}$$
$$\overline{e_1 e_2} \rightsquigarrow \overrightarrow{e_1}\, \overrightarrow{e_2}$$
$$\overline{e_1, e_2} \rightsquigarrow \overrightarrow{e_1} \overrightarrow{\tau} \overrightarrow{e_2}$$

We require this to be a bijection since bundle will map e to $\overrightarrow{e}$ and primal and tangent will map $\overrightarrow{e}$ back to e. Note that the code $\overrightarrow{e}$ is largely the same as the code e except for two differences. First, the variable binders and accesses have been mapped from x to $\overrightarrow{x}$. This is simply α conversion. Second, the cons expressions $e_1$, $e_2$ are mapped to $\overrightarrow{e_1} \overrightarrow{\tau} \overrightarrow{e_2}$ where '$\overrightarrow{\tau}$' denotes a new kind of expression that constructs bundled pairs.

We now can formally define the tangent space of VLAD values:

$$\overrightarrow{v} = v \text{ when } v \text{ is a discrete scalar}$$
$$\overrightarrow{v} \in \mathbb{R} \text{ when } v \in \mathbb{R}$$
$$\overline{\langle\{x_1 \mapsto v_1, \ldots, x_n \mapsto v_n\}, \lambda x e\rangle} =$$
$$\langle\{x_1 \mapsto \overrightarrow{v_1}, \ldots, x_n \mapsto \overrightarrow{v_n}\}, \overline{\lambda x e}\rangle$$
$$\overline{v \triangleright \overrightarrow{v}} = \overrightarrow{v} \triangleright \overrightarrow{\overrightarrow{v}}$$
$$\overline{v_1, \overrightarrow{v_2}} = \overrightarrow{v_1}, \overrightarrow{v_2}$$

and the corresponding bundle space:

$$\overrightarrow{v} = v \triangleright \overrightarrow{v} \text{ when } v \text{ is a non-primitive scalar}$$
$$\overrightarrow{v} = (\sigma, \lambda \overrightarrow{x}\, (\text{bundle } (v\, (\text{primal } \overrightarrow{x}))),$$
$$(*\, ((v'\, 1)(\text{primal} \overrightarrow{x})),$$
$$(\text{tangent } \overrightarrow{x}))))))$$
$$\text{when } v \text{ is a primitive } \mathbb{R} \rightarrow \mathbb{R}$$
$$\overrightarrow{v} = (\sigma, \lambda \overrightarrow{x}(\text{bundle}((v(\text{primal}\overrightarrow{x})),$$
$$(+\, ((*\, ((v^{(1,0)}\, (\text{primal}\, \overrightarrow{x})),$$
$$(\text{car } (\text{tangent } \overrightarrow{x})))),$$
$$(*\, ((v^{(0,1)}\, (\text{primal } \overrightarrow{x})),$$
$$(\text{cdr } (\text{tangent } \overrightarrow{x})))))))))$$
$$\text{when } v \text{ is a primitive } \mathbb{R} \times \mathbb{R} \rightarrow \mathbb{R}$$
$$\overrightarrow{v} = (\sigma, \lambda \overrightarrow{x}\, (j*\, (v\, (\text{primal}\overrightarrow{x}))))$$
$$\text{when } v \text{ is a primitive predicate}$$
$$\overline{\langle\{x_1 \mapsto v_1, \ldots, x_n \mapsto v_n\}, \lambda x e\rangle} =$$
$$\langle\{\overrightarrow{x_1} \mapsto \overrightarrow{v_1}, \ldots, \overrightarrow{x_n} \mapsto \overrightarrow{v_n}\}, \overline{\lambda x e}\rangle$$
$$\overline{v \triangleright \overrightarrow{v}} = \overrightarrow{v} \triangleright \overrightarrow{\overrightarrow{v}}$$
$$\overline{v_1, v_2} = \overrightarrow{v_1}, \overrightarrow{v_2}$$

In the above, we use $v^{(1)}$ to denote the derivative of $v^{(1,0)}$ and $v^{(1,0)}$ to denote the partial derivatives of v with respect to its first and second arguments. A finite number of such explicit derivatives are needed for the finite set of primitives. We only show how to transform arithmetic primitives. Transformations of other primitives, such as if-procedure, car, and cdr, as well as the AD primitives bundle, primal, tangent, and zero themselves, follow from the earlier observation about functions that only rearrange aggregate data. Also note that the environment σ in the closures created for transformed primitives must map all of the free variables to their values in the top-level environment. This includes v itself, as well as primal, tangent, bundle, j*, car, cdr, +, *, and anything need to implement $v^{(1)}$, $v^{(1,0)}$ and $v^{(0,1)}$.

We now can give formal definitions of the AD primitives. The primitive bundle is defined as follows:

$$\text{bundle } v, \overrightarrow{v} \overset{\Delta}{=} v \triangleright \overrightarrow{v} \text{ when } v \text{ is a non-primitive scalar}$$
$$\text{bundle } v, \overrightarrow{v} \overset{\Delta}{=} \overrightarrow{v} \text{ when } v \text{ is a primitive}$$
$$\text{bundle } \langle\{x_1 \mapsto v_1, \ldots, x_n \mapsto v_n\}, \lambda x e\rangle,$$
$$\overline{\langle\{x_1 \mapsto v_1, \ldots, x_n \mapsto v_n\}, \lambda x e\rangle} \overset{\Delta}{=}$$
$$\langle\{\overrightarrow{x_1} \mapsto (\text{bundle } v_1, \overrightarrow{v_1}), \ldots, \overrightarrow{x_n} \mapsto (\text{bundle } v_n, \overrightarrow{v_n})\},$$
$$\overline{\lambda x e}\rangle$$
$$\text{bundle } (v \triangleright \overrightarrow{v}), \overline{(v \triangleright \overrightarrow{v})} \overset{\Delta}{=}$$
$$(\text{bundle } v, \overrightarrow{v}) \triangleright (\text{bundle } \overrightarrow{v}, \overrightarrow{\overrightarrow{v}})$$
$$\text{bundle } (v_1, v_2), \overline{(v_1, v_2)} \overset{\Delta}{=}$$
$$(\text{bundle } v_1, \overrightarrow{v_1}), (\text{bundle } v_2, \overrightarrow{v_2})$$

The primitive primal is defined as follows:

$$\text{primal} \overrightarrow{v} \overset{\Delta}{=} v \text{ when } v \text{ is a primitive}$$
$$\text{primal } \overline{\langle\{x_1 \mapsto v_1, \ldots, x_n \mapsto v_n\}, \lambda x e\rangle} \overset{\Delta}{=}$$
$$\langle\{x_1 \mapsto (\text{primal } \overrightarrow{v_1}), \ldots, x_n \mapsto (\text{primal } \overrightarrow{v_n})\}, \lambda x e\rangle$$
$$\text{primal } (v \triangleright \overrightarrow{v}) \overset{\Delta}{=} v$$
$$\text{primal } \overline{(v_1, v_2)} \overset{\Delta}{=} (\text{primal } \overrightarrow{v_1}), (\text{primal } \overrightarrow{v_2})$$

The primitive tangent is defined as follows:

$$\text{tangent } \vec{v} \triangleq \vec{v} \text{ when } v \text{ is a primitive}$$

$$\text{tangent } \overrightarrow{\langle\{x_1 \mapsto v_1, \ldots, x_n \mapsto v_n\}, \lambda x e\rangle} \triangleq$$
$$\langle\{x_1 \mapsto (\text{tangent } \overrightarrow{v_1}), \ldots, x_n \mapsto (\text{tangent } \overrightarrow{v_n})\}, \lambda x e\rangle$$

$$\text{tangent } \overrightarrow{(v \rhd \vec{v})} \triangleq \vec{v}$$

$$\text{tangent } \overrightarrow{(v_1, v_2)} \triangleq (\text{tangent } \overrightarrow{v_1}), (\text{tangent } \overrightarrow{v_2})$$

And the primitive zero is defined as follows:

$$\text{zero } v \triangleq \vec{v} \text{ when } v \text{ is a discrete scalar}$$

$$\text{zero } v \triangleq \vec{0} \text{ when } v \in \mathbb{R}$$

$$\text{zero } (\{x_1 \mapsto v_1, \ldots, x_n \mapsto v_n\}, \lambda x\ e) \triangleq$$
$$(\{x_1 \mapsto (\text{zero } v_1), \ldots, x_n \mapsto (\text{zero } v_n)\}, \lambda x\ e)$$

$$\text{zero } (v \rhd \vec{v}) \triangleq (\text{zero } v) \rhd (\text{zero } \vec{v})$$

$$\text{zero } (v_1, v_2) \triangleq (\text{zero } v_1), (\text{zero } v_2)$$

Note the reflection on closure environments that occurs in all four of the above primitives. Also note the reflective transformation that is performed on the closure expressions. While the former falls within the conceptual framework of map-closure, the latter transcends that framework.

5-5 Flow Analysis

STALIN∇ performs a polyvariant union-free flow analysis using a formulation based on abstract interpretation. For expository purposes, in the following overview, we omit many details and, at times, give a simplified presentation that differs in technicalities, but not in spirit, from the actual implementation. Inter alia, we omit discussion of letrec, bundled pairs, and primitives.

5-5.1 Concrete Values and Environments

A concrete value v is either a concrete scalar or a concrete aggregate. A concrete environment σ is a (partial) map from variables to concrete values, represented extensionally as a set of bindings x ↦ v. Let $\mathbb{B}$ denote {#t, #f}. A concrete scalar is either ( ), a concrete boolean b ∈ $\mathbb{B}$, a concrete real r ∈ $\mathbb{R}$, or a concrete primitive p. A concrete aggregate is either a concrete closure $\langle\sigma, e\rangle$, a concrete bundle $v_1 \rhd v_2$, (or a concrete pair $(v_1, v_2)$). We assume that the concrete environment of a concrete closure maps precisely the free variables of the expression of that concrete closure. A concrete function is either a concrete primitive or a concrete closure. We use T to refer to the set of all concrete values. We often omit the specifier 'concrete' when it is clear from context.

5-5.2 Concrete Equivalence

Our formulation of flow analysis requires notions of equivalence for expressions, concrete values, and concrete environments. Programming languages typically do not define equivalence for function values. We need such a notion of equivalence for flow analysis since abstract values and environments denote sets of concrete values and environments and flow analysis is formulated in terms of unions and intersections of such sets, and subset and equality relations between such sets, which in turn requires a notion of equivalence between the members of such sets.

Flow analysis typically formulates expression equivalence as equivalence between indices assigned to source-code expressions. This is suitable only in the traditional case where the source program is fixed and explicitly available, in its entirety, prior to the start of flow analysis. In our case, however, application of the AD primitives bundle, primal, and tangent creates new expressions via the transformation $\overrightarrow{e}$ (and its inverse), at least conceptually. Thus we instead use a structural notion of expression equivalence, because in VLAD some expressions are not explicitly available prior to the start of flow analysis and are created during the process of flow analysis.

Expression, value, and environment equivalence are mutual notions. Nominally, expression, environment, and function equivalence are extensional: two expressions are equivalent if they evaluate to equivalent values in equivalent environments, two environments are equivalent if they map equivalent variables to equivalent values, and two functions are equivalent if they yield equivalent result values when applied to equivalent argument values. Equivalence for other values is structural. The extensional notion of expression, environment, and function equivalence is undecidable. Thus we adopt the following conservative approximation. We take two expressions to be equivalent if they are structurally equivalent, take two environments to be equivalent if they map equivalent variables to equivalent values, take primitives to be equivalent only to themselves, and take two closures to be equivalent if they contain equivalent expressions and environments. While we do not currently do so, one can strengthen this approximation with a suitable notion of α-equivalence.

5-5.3 Concrete Evaluation

We develop our abstract evaluator by modifying the following standard eval/apply concrete evaluator:

$$\mathcal{A}(\sigma, \lambda x e) v_2 \triangleq \mathcal{E} e \sigma[x \mapsto v_2]$$

$$\mathcal{E} x \sigma \triangleq \sigma x$$

$$\mathcal{E} (\lambda x e) \sigma \triangleq \langle \sigma, \lambda x e \rangle$$

$$\mathcal{E} (e_1 e_2) \sigma \triangleq \mathcal{A} (\mathcal{E} e_1 \sigma)(\mathcal{E} e_2 \sigma)$$

$$\mathcal{E} (e_1, e_2) \sigma \triangleq (\mathcal{E} e_1 \sigma), (\mathcal{E} e_2 \sigma)$$

The above, however, does not enforce the constraint that the concrete environment of a concrete closure map precisely the free variables of the expression of that concrete closure. We can enforce this constraint, as well as the constraint that σ map precisely the free variables in ∈ in any call $\mathcal{E}$ ∈σ, by judiciously restricting the domains of concrete environments at various places in the above evaluator. So as not to obscure the presentation of our formulation, we omit such restriction operations both above and in similar situations for the remainder of the paper.

A concrete analysis a is a finite extensional partial representation of the concrete evaluator as a set of bindings e ↦ σ ↦ v. A concrete analysis a is sound if for every (e ↦ σ ↦ v)∈a, v=($\mathcal{E}$ e σ).

5-5.4 Abstract Values and Environments

Most standard approaches to flow analysis take the space of abstract values to include unions. This is because they are typically applied to languages whose execution model supports tags and tag dispatching. Since we wish to compile code to a FORTRAN-like execution model that does not support tags and tag dispatching, our space of abstract values does not include unions.

Preclusion of unions further precludes recursive abstract values as such recursion could not terminate. As a consequence, all of our abstract values will correspond to data structures of fixed size and shape in the execution model. This allows our code generator to unbox all aggregate data.

An abstract value $\bar{v}$ is either an abstract scalar or an abstract aggregate. An abstract environment $\bar{\sigma}$ is a (partial) map from variables to abstract values, represented extensionally as a set of bindings $x \mapsto \bar{v}$. An abstract scalar is either a concrete scalar, an abstract boolean $\bar{\mathbb{B}}$, or an abstract real $\bar{\mathbb{R}}$. An abstract aggregate is either an abstract closure $(\bar{\sigma}, e)$, an abstract bundle $\bar{v}_1 \triangleright \bar{v}_2$, an abstract pair $(\bar{v}_1, \bar{v}_2)$, or an abstract top $\top$. We assume that the abstract environment of an abstract closure maps precisely the free variables of the expression of that abstract closure. An abstract function is either a concrete primitive or an abstract closure.

Abstract values and environments denote their extensions, sets of concrete values and environments:

$$EXT\ v = \{v\}$$

$$EXT\ \bar{\mathbb{B}} = \mathbb{B}$$

$$EXT\ \bar{\mathbb{R}} = \mathbb{R}$$

$$EXT\ (\bar{\sigma}, e) = \bigcup_{\sigma \in (EXT\ \bar{\sigma})} \{(\sigma, e)\}$$

$$EXT\ (\bar{v}_1 \triangleright \bar{v}_2) = \bigcup_{v_1 \in (EXT\ \bar{v}_1)} \bigcup_{v_2 \in (EXT\ \bar{v}_2)} \{v_1 \triangleright v_2\}$$

$$EXT\ (\bar{v}_1, \bar{v}_2) = \bigcup_{v_1 \in (EXT\ \bar{v}_1)} \bigcup_{v_2 \in (EXT\ \bar{v}_2)} \{(v_1, v_2)\}$$

$$EXT\ \top = \top$$

$$EXT\ \{x_1 \mapsto \bar{v}_1, \ldots, x_n \mapsto \bar{v}_n\} =$$
$$\bigcup_{v_1 \in (EXT\ \bar{v}_1)} \cdots \bigcup_{v_n \in (EXT\ \bar{v}_n)} \{\{x_1 \mapsto v_1, \ldots, x_n \mapsto v_n\}\}$$

5-5.5 Abstract Subset, Equivalence, Union, and Intersection

Our formulation of flow analysis uses notions of subset and equivalence relations between abstract values and environments as well as unions and intersections of abstract values and environments. We take the subset and equivalence relations between two abstract values or two abstract environments to denote the corresponding relations between their extensions. These relations can be determined precisely:

$$v \subseteq v$$

$$\bar{v} \subseteq \bar{\mathbb{B}}\ \text{when}\ \bar{v} \in (\mathbb{B} \cup \{\bar{\mathbb{B}}\})$$

$$\bar{v} \subseteq \bar{\mathbb{R}}\ \text{when}\ \bar{v} \in (\mathbb{R} \cup \{\bar{\mathbb{R}}\})$$

$$(\bar{\sigma}, e) \subseteq (\bar{\sigma}', e)\ \text{when}\ \bar{\sigma} \subseteq \bar{\sigma}'$$

$$(\bar{v}_1 \triangleright \bar{v}_2) \subseteq (\bar{v}_1' \triangleright \bar{v}_2')\ \text{when}\ (\bar{v}_1 \subseteq \bar{v}_1') \wedge (\bar{v}_2 \subseteq \bar{v}_2')$$

$$(\bar{v}_1, \bar{v}_2) \subseteq (\bar{v}_1', \bar{v}_2')\ \text{when}\ (\bar{v}_1 \subseteq \bar{v}_1') \wedge (\bar{v}_2 \subseteq \bar{v}_2')$$

$$\bar{v} \subseteq \top$$

$$\{x_1 \mapsto \bar{v}_1, \ldots, x_n \mapsto \bar{v}_n\} \subseteq \{x_1 \mapsto \bar{v}_1', \ldots, x_n \mapsto \bar{v}_n'\}$$
$$\text{when}\ (\bar{v}_1 \subseteq \bar{v}_1') \wedge \ldots \wedge (\bar{v}_n \subseteq \bar{v}_n')$$

When $\bar{v} \cup \bar{v}'$ we say that $\bar{v}'$ is wider that $\bar{v}$.

We take the union of two abstract values or two abstract environments to denote the abstract value or the abstract environment whose extension is the union of the extensions of those two abstract values or two abstract environments. Such an abstract value or abstract environment may not exist. We compute a conservative approximation to this notion, widening the result if necessary:

$$v \cup v \Rightarrow v$$

$$b_1 \cup b_2 \Rightarrow \bar{\mathbb{B}}\ \text{when}\ b_1 \neq b_2$$

$$b \cup \bar{\mathbb{B}} \Rightarrow \bar{\mathbb{B}}$$

$$r_1 \cup r_2 \Rightarrow \bar{\mathbb{R}}\ \text{when}\ r_1 \neq r_2$$

$$r \cup \bar{\mathbb{R}} \Rightarrow \bar{\mathbb{R}}$$

$$(\bar{\sigma}, e) \cup (\bar{\sigma}', e) \Rightarrow (\bar{\sigma} \cup \bar{\sigma}', e)$$

$$(\bar{v}_1 \triangleright \bar{v}_2) \cup (\bar{v}_1' \triangleright \bar{v}_2') \Rightarrow ((\bar{v}_1 \cup \bar{v}_1') \triangleright (\bar{v}_2 \cup \bar{v}_2'))$$

$$(\bar{v}_1, \bar{v}_2) \cup (\bar{v}_1', \bar{v}_2') \Rightarrow ((\bar{v}_1 \cup \bar{v}_1'), (\bar{v}_2 \cup \bar{v}_2'))$$

$$\{x_1 \mapsto \bar{v}_1, \ldots, x_n \mapsto \bar{v}_n\} \cup \{x_1 \mapsto \bar{v}_1', \ldots, x_n \mapsto \bar{v}_n'\}$$
$$\Rightarrow \{x_1 \mapsto (\bar{v}_1 \cup \bar{v}_1'), \ldots, x_n \mapsto (\bar{v}_n \cup \bar{v}_n')\}$$

otherwise return $\top$

We take the intersection of two abstract values or two abstract environments to denote the abstract value or the abstract environment whose extension is the intersection of the extensions of those two abstract values or two abstract environments. Such an abstract value or abstract environment may not exist. Our formulation of flow analysis has the property that we only compute such intersections when do they exist. We compute this notion of intersection precisely as follows:

$$\bar{v} \cap \bar{v} \Rightarrow \bar{v}$$

$$b \cap \bar{\mathbb{B}} \Rightarrow b$$

$$r \cap \bar{\mathbb{R}} \Rightarrow r$$

$$(\bar{\sigma}, e) \cap (\bar{\sigma}', e) \Rightarrow (\bar{\sigma} \cap \bar{\sigma}', e)$$

$$(\bar{v}_1 \triangleright \bar{v}_2) \cap (\bar{v}_1' \triangleright \bar{v}_2') \Rightarrow ((\bar{v}_1 \cap \bar{v}_1') \triangleright (\bar{v}_2 \cap \bar{v}_2'))$$

$$(\bar{v}_1, \bar{v}_2) \cap (\bar{v}_1', \bar{v}_2') \Rightarrow ((\bar{v}_1 \cap \bar{v}_1'), (\bar{v}_2 \cap \bar{v}_2'))$$

$$\{x_1 \mapsto \bar{v}_1, \ldots, x_n \mapsto \bar{v}_n\} \cap \{x_1 \mapsto \bar{v}_1', \ldots, x_n \mapsto \bar{v}_n'\}$$
$$\Rightarrow \{x_1 \mapsto (\bar{v}_1 \cap \bar{v}_1'), \ldots, x_n \mapsto (\bar{v}_n \cap \bar{v}_n')\}$$

5-5.6 Abstract Evaluation

An abstract analysis $\bar{a}$ is a set of bindings $e \mapsto \bar{\sigma} \mapsto \bar{v}$. The extension of an abstract analysis $\bar{a}$ is the following set of concrete analyses:

$$cf \left\{ \left\{ e \mapsto \sigma \mapsto v \middle| \left( (\exists \bar{\sigma}, \bar{v}) \begin{pmatrix} ((e \mapsto \bar{\sigma} \mapsto \bar{v}) \in \bar{a}) \wedge \\ (\sigma \in (EXT\bar{\sigma})) \wedge \\ (v \in (EXT\bar{v})) \end{pmatrix} \right) \right\} \middle| \left( (\exists \bar{\sigma}, \bar{v}) \begin{pmatrix} ((e \mapsto \bar{\sigma} \mapsto \bar{v}) \in \bar{a}) \wedge \\ (\sigma \in (EXT\bar{\sigma})) \end{pmatrix} \right) \right\}$$

where cf denotes the set-theoretic choice function, the function that maps a set $s_1$ of sets to a set $s_2$ of all sets that contain one member from each member of $s_1$. An abstract analysis is sound if it contains a sound concrete analysis in its extension.

We need a notion of equivalence for abstract analyses to define the fixpoint of abstract interpretation. Nominally, two abstract analyses are equivalent if their extensions are equivalent. We conservatively approximate this by taking two bindings to be equivalent if their corresponding expressions, abstract environments, and abstract values are equivalent and take two abstract analyses to be equivalent if they contain equivalent bindings.

We compute an abstract analysis with the following abstract evaluator:

$$\overline{\mathcal{E}}_\downarrow e\overline{\sigma a} \triangleq \bigcap_{\substack{(e\mapsto\sigma'\mapsto\overline{v})\in\overline{a} \\ \overline{\sigma}\subseteq\sigma'}} \overline{v}$$

(Note that the above is the only place where the intersection of two abstract values is computed and the algorithm has the property that that intersection exists.)

$$\overline{\mathcal{A}}(\overline{\sigma},\lambda xe)\overline{v}_2\overline{a} \triangleq \begin{cases} \overline{\mathcal{E}}_\downarrow e\overline{\sigma}[x\mapsto\overline{v}_2]\overline{a} & \text{when } \overline{v}_2 \neq \top \\ \top & \text{otherwise} \end{cases}$$

$$\overline{\mathcal{A}}\top\overline{v}_2\overline{a} \triangleq \top$$

$$\overline{\mathcal{E}}\,x\overline{\sigma a} \triangleq \overline{\sigma}x$$

$$\overline{\mathcal{E}}(\lambda xe)\overline{\sigma a} \triangleq (\overline{\sigma},\lambda xe)$$

$$\overline{\mathcal{E}}(e_1e_2)\overline{\sigma a} \triangleq \overline{\mathcal{A}}(\overline{\mathcal{E}}_\downarrow e_1\overline{\sigma a})(\overline{\mathcal{E}}_\downarrow e_2\overline{\sigma a})\overline{a}$$

$$\overline{\mathcal{E}}(e_1,e_2)\overline{\sigma a} \triangleq \begin{cases} (\overline{\mathcal{E}}_\downarrow e_1\overline{\sigma a}),(\overline{\mathcal{E}}_\downarrow e_2\overline{\sigma a}) \\ \quad \text{when } ((\overline{\mathcal{E}}_\downarrow e_1\overline{\sigma a})\neq\top) \\ \quad \wedge ((\overline{\mathcal{E}}_\downarrow e_2\overline{\sigma a})\neq\top) \\ \top \quad \text{otherwise} \end{cases}$$

$$\overline{\mathcal{E}}'_\downarrow e\overline{\sigma a} \triangleq \begin{cases} \{e\mapsto\overline{\sigma}\mapsto\top\} & \text{when } \neg(\exists\overline{v})(e\mapsto\overline{\sigma}\mapsto\overline{v})\in\overline{a} \\ \{\} & \text{otherwise} \end{cases}$$

$$\overline{\mathcal{A}}'(\overline{\sigma},\lambda xe)\overline{v}_2\overline{a} \triangleq \begin{cases} \overline{\mathcal{E}}'_\downarrow e\overline{\sigma}[x\mapsto\overline{v}_2]\overline{a} & \text{when } \overline{v}_2\neq\top \\ \{\} & \text{otherwise} \end{cases}$$

$$\overline{\mathcal{A}}'\top\overline{v}_2\overline{a} \triangleq \{\}$$

$$\overline{\mathcal{E}}'x\overline{\sigma a} \triangleq \{\}$$

$$\overline{\mathcal{E}}'(\lambda xe)\overline{\sigma a} \triangleq \{\}$$

$$\overline{\mathcal{E}}'(e_1e_2)\overline{\sigma a} \triangleq (\overline{\mathcal{E}}'_\downarrow e_1\overline{\sigma a})\cup(\overline{\mathcal{E}}'_\downarrow e_2\overline{\sigma a})$$
$$\cup(\overline{\mathcal{A}}'(\overline{\mathcal{E}}_\downarrow e_1\overline{\sigma a})(\overline{\mathcal{E}}_\downarrow e_2\overline{\sigma a})\overline{a})$$

$$\overline{\mathcal{E}}'(e_1,e_2)\overline{\sigma a} \triangleq (\overline{\mathcal{E}}'_\downarrow e_1\overline{\sigma a})\cup(\overline{\mathcal{E}}'_\downarrow e_2\overline{\sigma a})$$

$$\mathcal{U}\overline{a} \triangleq \bigcup_{(e\mapsto\sigma\mapsto\overline{v})\in\overline{a}} \{e\mapsto\overline{\sigma}\mapsto(\overline{\mathcal{E}} e\overline{\sigma a})\}\cup(\overline{\mathcal{E}}'e\overline{\sigma a})$$

We then compute $\overline{a}=\mathcal{U}^*\overline{a}_0$, where $\overline{a}_0=\{e_0\mapsto\sigma_0\mapsto\top\}$ is the initial abstract analysis, $e_0$ is the program, $\sigma_0$ is the basis, containing inter alia any bindings produced by constant conversion, and $\mathcal{U}^*$ is the least fixpoint of $\mathcal{U}$. The above flow-analysis procedure might not terminate, i.e., the least fixpoint might not exist. It is easy to see that the initial abstract analysis is sound and that $\mathcal{U}$ preserves soundness. Thus by induction, $\overline{a}^*$ is sound when it exists. The algorithm has the property that $\top$ will never appear as the target of an abstract environment binding or as a slot of an abstract aggregate value. The only place in an abstract analysis that $\top$ can appear is as the target of a binding, e.g., $e\mapsto\overline{\sigma}\mapsto\top$. Our code generator only handles abstract analyses where $(\overline{\mathcal{E}}_\downarrow e\,\overline{\sigma a}^*)\neq\top$ for all $e$ and $\sigma$ that would occur as arguments to $\mathcal{E}$ during a concrete evaluation ($\mathcal{E}\,e_0\,\sigma_0$). We abort the compilation if this condition is violated. This can only occur when the union of two abstract values yields $\top$. The only place where the union of two abstract values is computed is between the results of the consequent and alternate of if-procedure.

5-5.7 Imprecision Introduction

The above flow-analysis procedure yields a concrete analysis for any program $e_0$ that terminates. This is equivalent to running the program during flow analysis. To produce a non-concrete analysis, we add a primitive real to the basis that behaves like the identity function on reals during execution but yields $\overline{\mathbb{R}}$ during flow analysis. In the examples in Subsection 5-7, we judiciously annotate our code with a small number of calls to real around constants, so that the programs perform all of the same floating-point computation as the variants in other languages, but leave certain constants as concrete values so that flow analysis terminates and satisfies the non-$\top$ condition discussed above.

5-6 Code Generation

The STALIN∇ code generator generates FORTRAN-like C code given an abstract analysis produced by polyvariant union-free flow analysis. In such an analysis, every application targets either a known primitive or a known lambda expression, potentially one created by flow-analysis-time source-code transformation induced by application of AD primitives. Recent versions of GCC will compile this C code to machine code similar to that generated by good FORTRAN compilers, given aggressive inlining, mediated by 'always inline' directives produced by our code generator, and scalar replacement of aggregates, enabled with the command-line option --param sra-field-structure-ratio=0. For expository purposes, in the following overview, we omit many details and, at times, give a simplified presentation that differs in technicalities, but not in spirit, from the actual implementation. Inter alia, we omit discussion of letrec, bundled pairs, and primitives.

Our code generator produces C code that is structurally isomorphic to the VLAD code. There is a C function for each specialized VLAD function, both closures and primitives. There is a function call in the C code for each application in each specialized closure expression. There are calls to constructor functions in the C code for each lambda expression and cons expression in each specialized closure expression. And there is C code that corresponds to each variable access in each specialized closure expression. The aggregate data is isomorphic as well. There is a C struct for each specialized aggregate data type in the VLAD code, including closures, and a slot in that C struct for each corresponding slot in the VLAD object. (We adopt a flat closure representation. Note that in the absence of mutation and eq?, as is the case for VLAD, all closure representations are extensionally equivalent and reduce to flat closures by unboxing.) One deviation from the above is that void structs, struct slots, arguments, and expressions are eliminated, as well as functions that return void results. The efficiency of the code generated results from polyvariant specialization, the union-free analysis, unboxing of all aggregate data, and aggressive inlining. One could imagine variants of our approach that employ selective unboxing and inlining.

We assume a map X from alpha-converted VLAD variables to unique C identifiers, a map $\mathbb{B}$ from abstract values to unique C identifiers, and a map $\mathcal{F}$ from pairs of abstract values to unique C identifiers.

An abstract value is void when it does not contain any (nested) $\mathbb{B}$ or $\mathbb{R}$ values. Our code generator adopts the following map from non-void abstract values to C specifiers:

$$T\, \overline{v} \triangleq \begin{cases} \text{int when } \overline{v} = \mathbb{B} \\ \text{double when } \overline{v} = \mathbb{R} \\ \text{struct } (\mathcal{S}\, \overline{v}) \\ \text{where struct } si = \{(\mathcal{T}\, \overline{v}_1)\, (X\, x_1); \\ \quad \ldots ; \\ \quad (\mathcal{T}\, \overline{v}_n)\, (X\, x_n);\}; \\ \text{when } \overline{v} = (\{x_1 \mapsto \overline{v}_1, \ldots, x_n \mapsto \overline{v}_n\}, e) \\ \text{where struct } (\mathcal{S}\, \overline{v})\, \{(\mathcal{T}\, \overline{v}_1)\, p;\ (\mathcal{T}\, \overline{v}_2)\, t;\}; \\ \text{when } \overline{v} = (\overline{v}_1 \triangleright \overline{v}_2) \\ \text{where struct } (\mathcal{S}\, \overline{v})\, \{(\mathcal{T}\, \overline{v}_1)\, a;\ (\mathcal{T}\, \overline{v}_2)\, d;\}; \\ \text{when } \overline{v} = (\overline{v}_1, \overline{v}_2) \end{cases}$$

eliminating void struct slots. We also generate C constructor functions ($\mathcal{M}\, \overline{v}$) of the appropriate arity for each non-void abstract aggregate value $\overline{v}$.

Our code generator adopts the following map from VLAD expressions e that evaluate to non-void abstract values in the abstract environment $\overline{\sigma}$ to C expressions:

$$\mathcal{C}\, x\overline{\sigma} \triangleq \begin{cases} (X\, x) & \text{when } x \text{ is bound} \\ c(X\, x) & \text{when } x \text{ is free} \end{cases}$$

$C(\lambda x\, e)\overline{\sigma} \triangleq$ a call to $(\mathcal{M}(\overline{\mathcal{E}}_1(\lambda x\, e)\overline{\sigma} e^*))$ with arguments that have the form of variable accesses $C(e_1 e_2)\overline{\sigma} \triangleq (\mathcal{F}\, (\overline{\mathcal{E}}_1 e_1 \overline{\sigma} a^*)(\overline{\mathcal{E}}_1 e_2 \overline{\sigma} a^*))((C\, e_1\, \overline{\sigma}), (C\, e_2\, \overline{\sigma}))$ $C(e_1, e_2)\overline{\sigma} \triangleq (\mathcal{M}((\overline{\mathcal{E}}_1\, e_1\, \overline{\sigma} a^*), (\overline{\mathcal{E}}_1\, e_2\, \overline{\sigma} a^*)))((C\, e_1\, \overline{\sigma}), (C\, e_2\, \overline{\sigma}))$ eliminating void arguments.

Our code generator generates distinct C functions for each abstract closure $\overline{\sigma}, \lambda x\, e$ that yields a non-void abstract value when called on each abstract value $\overline{v}$:

$(\mathcal{T}\, (\overline{\mathcal{A}}(\overline{\sigma}, \lambda x\, e)\overline{v}a^*))$ $(\mathcal{F}\, (\overline{\sigma}, \lambda x\, e)\overline{v})((\mathcal{T}(\overline{\sigma}, \lambda x\, e))c, (\mathcal{T}\overline{v})(X\, x))$ $\{\text{return } (\mathcal{C}\, \overline{\sigma}[x \mapsto \overline{v}]e);\}$ eliminating void parameters. Finally, we generate a C main function:

int main (void)$\{\mathcal{C}\, e_0 \overline{\sigma}_\theta);$return 0:$\}$

For expository purposes, we omit discussion of the generation of C functions for primitives and constructors. We generate 'always inline' directives on all generated C functions, including those generated for primitives and constructors, except for main and those selected to break cycles in the call graph.

Note that with a polyvariant union-free flow analysis, the target of every call site is known. This allows generating direct function calls or inlined primitives for each call site. Calls to the AD primitives involve nothing more than rearrangements of (aggregate) data structures from one known fixed shape to another known fixed shape. As aggregate data is unboxed and calls to primitives are inlined, this usually gets compiled away.

5-7 Examples

We illustrate the power of our flow-analysis and code-generation techniques for first-class forward AD with two examples. These examples were chosen because they illustrate a hierarchy of mathematical abstractions built on top of a higher-order derivative operator and the utility of nested application of those abstractions. Variants of both examples appear in other papers. However, those papers do not employ either the flow-analysis or code-generation techniques discussed here. We include these examples here to show how our techniques can be used to generate efficient FORTRAN-like code for these examples.

FIG. 9 gives common code shared between these examples. In addition to fairly self-explanatory code, the functions v+ and v− perform vector addition and subtraction, k*v multiplies a vector by a scalar, * returns the i-th basis vector of dimension n, map-n maps a function over the list (0 . . . n−1), and multivariate-argmin implements a multivariate optimizer using adaptive naive gradient descent. This iterates x,+1=η∇f x, until either $\|\nabla f\, x\|$ or $\|x_{i+1} - x_i\|$ is small, increasing η when progress is made and decreasing η when no progress is made.

FIG. 10 contains the first example, saddle, that computes the saddle point of a function:

$$\min_{(x_1, y_1)} \max_{(x_2, y_2)} (x_1^2 + y_1^2) - (x_2^2 + y_2^2)$$

This example uses forward AD instead of reverse AD to compute gradients and naive gradient descent instead of gradient descent with a line search.

FIG. 11 contains the second example, particle, a variant of an example from Siskind and Pearlmutter where the textbook Newton's method for optimization has been replaced with naive gradient descent. (The original example was coded in SCHEME; the variant here is coded in VLAD.) It models a charged particle traveling non-relativistically in a plane with position x⁻(t) and velocity ẋ(t). The particle is accelerated by an electric field formed by a pair of repulsive bodies, $$p(x;\, w) = \|x - (10,\, 10 - w)\|^{-1} + \|x - (10,\, 0)\|^{-1}$$

where w is a modifiable control parameter of the system, and hits the x-axis at position $x(t_f)$. We optimize w so as to minimize $E(w) = x_0(t_f^-)^2$, with the goal of finding a value for w that causes the particle's path to intersect the origin. We use Naive Euler ODE integration:

$$\ddot{x}(t) = -\nabla_x\, p(x)\,|_{x=x(t)}$$

$$\dot{x}(t + \Delta t) = \dot{x}(t) + \Delta t \ddot{x}(t)$$

$$x(t + \Delta t) = x(t) + \Delta t \dot{x}(t)$$

to compute the particle's path. We use linear interpolation to find the point where the particle hits the x-axis:

When $x_1(t + \Delta t) \leq 0$ let: $\Delta t_f = \dfrac{x_1(t + \Delta t) - x_1(t)}{\dot{x}_1(t)}$ $t_f = t + \Delta t_f$ $x(t_f) = x(t) + \Delta t_f \dot{x}(t)$ Error: $E(w) = x_0(t_f)^2$ We minimize E with respect to w using multivariate-argmin. These examples were chosen because they both illustrate several important characteristics of our compilation techniques. First, they use convenient standard vector arithmetic which, without our techniques, would require allocation and reclamation of new vector objects whose size might be unknown at compile time. Furthermore, access to the components of such vectors would require indirection. Second, they use higher-order functions: ones like map and reduce that are familiar to the functional-programming community and ones like derivative, gradient, and multivariate-argmin, that are familiar to mathematicians. Without our techniques, these would require closures and indirect function calls to unspecified targets. Third, they compute nested derivatives, i.e., they take derivatives of functions that take derivatives of other functions. This involves nested application of the AD primitives which, without our techniques, would require run-time code transformation, and bundling and unbundling of values.

We used STALIN∇ to perform a polyvariant union-free flow analysis on both of these examples using the methods of section 5-5 and to generate FORTRAN-like code in light of such analyses using the methods of section 5-6. We then coded variants of these examples in SCHEME, ML, HASKELL, and C++ and ran them with a variety of compilers and AD implementations. For SCHEME, we used two implementations of forward AD. When compiling with MIT SCHEME we used SCMUTILS and when compiling with STALIN, SCHEME->C, CHICKEN, BIGLOO, and LARCENY we used the implementation of forward AD from Siskind and Pearlmutter, an eager variant of a prior implementation from Pearlmutter and Siskind without the tower. For ML, we used a translation of the latter and compiled the code with MLTON and OCAML. For HASKELL, we used the simplified nontower version of the forward AD method from Karczmarczuk (as presented by Siskind and Pearlmutter) and compiled the code with GHC. For C++, we used the FABAD++ implementation of forward AD and compiled the code with G++. In all of the variants, we attempted to be faithful to both the generality of the mathematical concepts represented in the examples and to the standard coding style typically used for each particular language.

cated analyses and transformations with the goal of producing efficient transformed source code. These analyses and transformations mirror the analyses and transformations done by compilers, leading to tremendous redundancy. Furthermore, the AD community is slowly and systematically rediscovering techniques that have been known in the compiler community for years, reimplementing them in various combinations for AD transformers for different programming languages. This motivates including AD in the compiler. Indeed, there is such a commercial effort to incorporate AD into the NAG FORTRAN compiler.

Since at least 1976, the programming-language community has realized the benefits of using variants of the lambda calculus as compiler intermediate languages. However, as of yet, the AD community has not adopted the lambda calculus as the intermediate language for transformation-based AD. For example, OPENAD, a recent framework for integrating compiler optimizations with AD transformations, is not based on the lambda calculus. In contrast, the approach we advocate is illustrated in FIG. 8. VLAD is but one potential front end. Front ends for other languages can be constructed given a suitable extension of the intermediate language. Both AD transformations and compiler analyses and optimizations apply to this intermediate language. Back ends can be constructed to generate either machine code or source code in a variety of languages. This allows the common core of AD techniques to be shared among AD implementations for multiple languages either as part of a compiler or as part of a traditional transformation based preprocessor.

6 Nesting Forward-Mode AD in a Functional Framework

We discuss the implications of the desire to augment a functional-programming language with a derivative-taking operator using forward-mode automatic differentiation (AD). The primary technical difficulty in doing so lies in ensuring correctness in the face of nested invocation of that operator, due to the need to distinguish perturbations introduced by distinct invocations. We exhibit a series of implementations of a referentially-transparent forward-mode AD derivative-taking operator, each of which uses a different non-referentially-transparent mechanism to distinguish perturbations.

TABLE 1

|  | STALIN | SCHEME->C | CHICKEN | BIGLOO | GAMBIT | LARCENY | SCMUTILS | MLTON | OCAML | FADBAD++ |
|---|---|---|---|---|---|---|---|---|---|---|
| saddle | 54.17 | 63.67 | 131.59 | 92.04 | 72.27 | 106.81 | 396.70 | 6.41 | 11.93 | 104.88 |
| particle | 249.99 | 310.76 | 507.20 | 449.21 | 343.75 | 549.47 | 1507.16 | 32.98 | 58.15 | 75.08 |

Table 1 summarizes the run times of our examples normalized relative to a unit run time for STALIN∇. It is difficult to conduct meaningful and precise performance comparisons of multiple implementations of forward AD across multiple implementations of multiple programming languages. Changes in coding style, compiler options, and other aspects of our comparison methodology are likely to affect the run times by perhaps a few tens of percent. Thus we do not wish to draw conclusions from the particular measured run times. However, we consider it unlikely that changes in coding style, compiler options, and other aspects of our comparison methodology would improve run times by an order of magnitude. Thus we consider it significant that STALIN∇ outperforms all of the other systems on both examples by between approximately one and three orders of magnitude.

5-8 Discussion

Early transformation-based AD implementations were simple. Such systems, however, produced inefficient transformed source code. As the field of AD evolved, transformation-based systems started employing increasingly sophisti- Even though the forward-mode AD derivative-taking operator is itself referentially transparent, we hypothesize that one cannot correctly formulate this operator as a function definition in current pure dialects of Haskell.

6-1 Introduction

The ability to nest function invocation is central to functional programming. One would be discontent with a language or implementation that would not allow one to use a nested invocation of Map to compute outer products.

$$\text{Outer Product } fxy \triangleq M_{AP}(\lambda x, M_{AP}(\lambda y, f\ x\ y)y)x$$

In an analogous fashion, one would expect to be able to write:

$$M_{IN}(\lambda x, (f\ x) + M_{IN}(\lambda y, g\ x\ y)) \qquad (1)$$

given a definition for MIN that takes a suitable function $\mathbb{R} \to \mathbb{R}$ as its argument and returns (an approximation to) a (local) minimum of that function. Correct processing of either of the above requires correct handling of nested function invocation. In particular, the outer call to MAP or MIN is passed an outer function that itself calls MAP or MIN on an inner function that depends on the argument x of the outer function.

Suppose our implementation of MIN uses gradient descent. It would be desirable for MIN, which takes f as a functional argument, to be able to use the derivative of f without the caller's knowledge. Thus, it would be advantageous for a system to provide a higher-order function $\mathcal{D}$ that maps functions to their derivatives. With such a facility, (1) would take the form:

$$\ldots \mathcal{D}(\lambda x, \ldots \mathcal{D}(\lambda y, gxy) \ldots ) \ldots$$

This requires that nested invocation of $\mathcal{D}$ operate correctly.

Automatic Differentiation (AD), and in particular forward-mode AD, is one established method for computing derivatives and can be used to implement $\mathcal{D}$. The remainder of this paper discusses issues surrounding such an implementation, and uses $\mathcal{D}$ to refer to the notion of a derivative-taking operator implemented using forward-mode AD. We hypothesize that it is not possible to formulate a $\mathcal{D}$ that properly nests as a function definition in current pure dialects of HASKELL. This is somewhat ironic, as while $\mathcal{D}$ can be implemented using one of several alternate non-referentially-transparent mechanisms, $\mathcal{D}$ itself is referentially transparent.

(There are subtle differences between $\mathcal{D}$ and the classical derivative-taking operator in mathematics. For example, given the definition $f\,x \triangleq$ if x=c then c else x the derivative of f at e is 1, yet $\mathcal{D}$ f c=0. Like all mathematical notions, classical differentiation is referentially transparent, since the derivative of a function is defined on its extension rather than its intension. Furthermore, $\mathcal{D}$ is also referentially transparent in the sense that if $t_1$ and $t_2$ are semantically equivalent, then $\mathcal{D}\,t_1$ and $\mathcal{D}\,t_2$ are also semantically equivalent. Note that the presence of the =predicate in the antecedent of the conditional in the definition of f does not license β-substitution, because that predicate does not necessarily correspond to semantic equivalence.)

The remainder of this paper elaborates on the above observations. We begin with a brief overview of forward-mode AD in Subsection 6-2. We then show how to implement $\mathcal{D}$ as a procedure definition in SCHEME, in a way that can properly nest. To do this we first construct an API to the necessary data structures, in Subsection 6-3, and then use this machinery to build a forward-mode AD engine and drive it using standard SCHEME procedure names via overloading, in Subsection 6-4. This implementation uses only one non-referentially-transparent side effect. We discuss, in Subsection 6-5, a number of alternate non-referentially-transparent mechanisms that suffice to implement $\mathcal{D}$. It is noted in Subsection 6-6 that, in certain cases, static analysis or program transformation can allow nested invocation of $\mathcal{D}$ without non-referentially-transparent mechanisms. We give an example that utilizes nested invocation of $\mathcal{D}$ in Subsection 6-7. We conclude, in Subsection 6-8, with a discussion of the history and implications of the desire to incorporate differentiation into functional programming.

6-2 Forward-Mode AD as Nonstandard Interpretation

Forward-mode AD computes the derivative of a function $f$ at a point e by evaluating f (c+e) under a nonstandard interpretation that associates a conceptually infinitesimal perturbation with each real number, propagates these augmented values according to the rules of calculus, and extracts the perturbation of the result. We use x+x'e to denote a dual number, i.e. x with associated perturbation x', by analogy with the standard notation a+bi for complex numbers. Just as arithmetic on complex numbers a+bi can be defined by taking $j^2=-1$, arithmetic on dual numbers x+x'e can be defined by taking $\in^2=0$ but $\in\neq 0$. Implementations of complex arithmetic typically represent complex numbers a+bi as Argand pairs ⟨a, b⟩, and similarly implementations of forward-mode AD typically represent dual numbers x+x'∈ as tangent-bundle pairs ⟨x, x'⟩. Furthermore, just as implementations of complex arithmetic typically overload the arithmetic primitives to manipulate complex numbers, implementations of forward-mode AD typically overload the arithmetic primitives to manipulate dual numbers. One important difference between complex numbers and dual numbers is that while complex numbers can only have real components, as used here components of members of a new dual-number type can be either reals or members of an existing dual-number type. To see how this works, let us manually apply the mechanism to a simple expression.

$$\frac{d}{dx}x^2 + x + 1 \bigg|_{x=S} = \mathcal{D}(\lambda x, x \times x + x + 1)3$$
$$= \mathcal{E}((\lambda x, x \times x + x + 1)(3 + x))$$
$$= \mathcal{E}((3 + e) \times (3 + e) + (3 + e) + 1)$$
$$= \mathcal{E}((9 + 6e) + (3 + e) + 1)$$
$$= \mathcal{E}(13 + 7e)$$
$$= 7$$

where $\mathcal{E}$ (x+x'∈) $\triangleq$ x' and $\mathcal{D}$ f c $\triangleq$ $\mathcal{E}$ (f (c+∈)). This is the essence of forward-mode AD.

For expository simplicity, we limit our discussion of forward-mode AD to a special case, namely first derivatives of univariate functions $\mathbb{R} \to \mathbb{R}$. However, forward-mode immediately generalizes in two different ways. First, vector functions can be handled with the same efficiency and mechanisms as scalar functions by adopting a directional derivative operator, which finds the directional derivative y': $\mathbb{R}^m$ of f: $\mathbb{R}^n \to \mathbb{R}^m$ at x: $\mathbb{R}^n$ in the direction x': $\mathbb{R}^n$ by calculating $(y_1+y_1'\in_1, \ldots, y_m+y_m'\in)\triangleq f(x_1+x_1'\in, \ldots, x_n+x_n'\in)$ using the same nonstandard interpretation of f on dual numbers as in the scalar case. Second, a dual number can be viewed as a power series that has been truncated at $e^2$. One can extend the notion of dual numbers to allow higher-order terms, either by truncating at a higher order or by representing the coefficients of an infinite power series as a stream, thus computing higher-order derivatives. Nested invocation of a first-order derivative-taking operator can also compute higher-order derivatives. However, nested invocation of a first-order derivative-taking operator can compute things that a single invocation of a higher-order derivative-taking operator cannot.

In order for this mechanism to correctly handle nesting, we must distinguish between different perturbations introduced by different invocations of $\mathcal{D}$. One way to do this is to create a hierarchy of dual number types, distinguished by a distinct e for each distinct invocation of $\mathcal{D}$. The components of a dual-number type created for a non-nested invocation of $\mathcal{D}$ are reals, while the components of a dual-number type created for a nested invocation of $\mathcal{D}$ are members of the dual-number type of the immediately surrounding invocation of $\mathcal{D}$.

The intuition behind the necessity and sufficiency of such an extension is illustrated by the following example.

$$\frac{d}{dx}\left(x\left(\frac{d}{dy}xy\bigg|_{y=2}\right)\right)\bigg|_{x=1} = \mathcal{D}(\lambda x, x \times (\mathcal{D}(\lambda y, x \times y)2))1$$

$$= \mathcal{E}\, e_a((\lambda x, x \times (\mathcal{D}(\lambda y, x \times y)2))(1 + e_a))$$

$$= \mathcal{E}\, e_a((1 + e_a) \times (\mathcal{D}(\lambda y, (1 + e_a) \times y)2))$$

$$= \mathcal{E}\, e_a((1 + e_a) \times (\mathcal{E}\, e_b((\lambda y \times (1 + e_a) \times y)(2 + e_b))))$$

$$= \mathcal{E}\, e_a((1 + e_a) \times (\mathcal{E}\, e_b((1 + e_a) \times (2 + e_b))))$$

$$= \mathcal{E}\, e_a((1 + e_a) \times (\mathcal{E}\, e_b((2 + 2e_a) + (1 + e_a)e_b)))$$

$$= \mathcal{E}\, e_a((1 + e_a) \times (1 + e_a))$$

$$= \mathcal{E}\, e_a(1 + 2e_a)$$

$$= 2$$

where $\in_a$ and $\in_b$ are introduced by the two distinct invocations of $\mathcal{D}$. The accessor $\mathcal{E}$ is defined as $$\mathcal{E}\, e(x + x'e) \stackrel{\Delta}{=} x'$$

and then $\mathcal{D}$ is defined as $$\mathcal{D}\, fc \stackrel{\Delta}{=} \mathcal{E}\varepsilon(f(c + \varepsilon))$$

in which $\in$ is unique to each live invocation of $\mathcal{D}$. As can be seen in the above example, failing to distinguish $\in_a$ from $\in_b$ would lead to an incorrect result: $(1+\in_a) \times (2+\in_b)$ would be interpreted as $(1+\in) \times (2+\in) = 2+3\in$ causing the above expression to evaluate to 3 instead of 2. Furthermore, even if we would distinguish $\in_a$ from $\in_b$ but erroneously take $\in_a \times \in_b = 0$ in a fashion analogous to $\in_a^2 = \in_b^2 = 0$ we would also obtain an incorrect result: $(1+\in_a) \times (2+\in_b)$ would reduce to $1+2\in_a+\in_b$ causing the above expression to evaluate to 1 instead of 2. Any implementation that did not posses a mechanism for properly distinguishing perturbations for different invocations of $\mathcal{D}$ or that failed to preserve nonzero cross perturbations could not support nested invocation of $\mathcal{D}$ or nested invocation of functions like MIN that utilize $\mathcal{D}$.

6-3 An API for Dual Numbers

As we have seen, nested invocations of $\mathcal{D}$ require distinct $\in$ values. The components of a dual-number type created for a non-nested invocation of $\mathcal{D}$ are reals, while the components of a dual-number type created for a nested invocation of $\mathcal{D}$ are members of the dual-number type of the immediately surrounding invocation of $\mathcal{D}$. If "multiplied out," the resulting dual numbers correspond to first-order multinomials where the $\in$ values play the role of variables. This can be seen as a table of real numbers indexed by subsets of the live $\in$ values. If the original nested structure is retained, we have a tree representation of depth $\eta$ when there are $\eta$ nested invocations of $\mathcal{D}$, with each level splitting on the presence of a particular value in the key, and the fringe holding the real numbers. Such tree representations are tempting because perturbations are often zero, and trees admit to a sparser representation where levels corresponding to perturbations of zero are skipped.

We impose an ordering on the $\in$ values such that if $\in$ is generated by an invocation of $\mathcal{D}$ nested inside the invocation of $\mathcal{D}$ that generated $\in'$, then $\in' \prec \in$. Trees representing dual numbers can then obey the invariant that in a dual number $x+x'\in$ the x and x' slots are either reals or dual numbers over some $\in'$ where $\in' \prec \in$, which improves efficiency. This is maintained in exhibited code, but made use of only in tree-based implementations of the following API for manipulating dual numbers:

DUALNUMBER? $p$ returns true iff $p$ is a dual number.

DUALNUMBER $\varepsilon$ $x$ $0 \stackrel{\Delta}{=} x$

DUALNUMBER $\varepsilon$ $x$ $x' \stackrel{\Delta}{=} x + x'\varepsilon$

EPSILON $x + x'\varepsilon \stackrel{\Delta}{=} \varepsilon$

PRIMAL $\varepsilon$ $x \stackrel{\Delta}{=} x$ when $x$ is a real.

PRIMAL $\varepsilon(x + x'\varepsilon) \stackrel{\Delta}{=} x$

PRIMAL $\varepsilon(x + x'\varepsilon') \stackrel{\Delta}{=} x + x'\varepsilon'$ when $\varepsilon' \prec \varepsilon$.

PERTURBATION $\varepsilon$ $x \stackrel{\Delta}{=} 0$ when $x$ is a real.

PERTURBATION $\varepsilon(x + x'\varepsilon) \stackrel{\Delta}{=} x'$

PERTURBATION $\varepsilon(x + x'\varepsilon') \stackrel{\Delta}{=} 0$ when $\varepsilon' \prec \varepsilon$, GENERATE$_\varepsilon$ returns a fresh $\varepsilon$ such that all other live $\varepsilon' \prec \varepsilon$.

FIG. 6 contains an implementation of this API in SCHEME. Note that the pattern of usage, together with the above invariant, imply that PRIMAL $\in (x+x'\in')$ and PERTURBATION $\in (x+x'\in')$ will never be called when $\in \prec \in'$. In particular, PRIMAL and PERTURBATION are only called in the definitions of lift-real->real, lift-real*real->real, and primal* in FIG. 7 and in the variant definitions of derivative in subsections 6-4 and 6-5. In lift-real->real and primal*, all calls pass the $\in$ of the second argument as the first argument. In lift-real*real->real, all calls pass the maximum $\in$ of $p_1$ and $p_2$ as the second argument. In derivative, the call passes the generated $\in$ for that invocation as the second argument.

6-4 An Implementation of $\mathcal{D}$ that Supports Nesting

Computing derivatives with dual numbers requires extensions of the arithmetic primitives. For instance $$(x+x'e)+(y+y'\in)=(x+y)+(x'+y')\in$$

Similarly, since $\in^2=0$ $$(x+x'\in) \times (y+y'\in)=(x \times y)+(x \times y'+x' \times y)\in$$

Note that the x, x', y, and y' values in the above might themselves be dual numbers with a different $e \in$ generated from an earlier invocation of $\mathcal{D}$ than that which generated $\in$.

In the general case, a unary function $f: \alpha \to \alpha$ with derivative $f': \alpha \to \alpha$ is extended to operate on dual numbers whose components are of type $\alpha$ as follows:

$$f(x+x'\in)=(fx)+((f'x) \times x')\in$$

where x: $\alpha \times \alpha \to \alpha$. Similarly, a binary function $f: \alpha \times \alpha \to \alpha$ whose derivatives with respect to the first and second arguments are $f_1: \alpha \times \alpha \to \alpha$ and $f_2: \alpha \times \alpha \to \alpha$ respectively is extended to operate on dual numbers whose components are of type $\alpha$ as follows:

$$f(x+x'\in)(y+y'\in)=(fxy)+((f_1xy) \times x'+(f_2xy) \times y')\in$$

where x: $\alpha \times \alpha \to \alpha$ and +: $\alpha \times \alpha \to \alpha$. The SCHEME code in FIG. 7 implements the above mechanism in a fashion that will generate variants of functions that accept arguments of any dualnumber type in the hierarchy and will automatically coerce elements of a lower type in the hierarchy to a higher type, as necessary, and treat native SCHEME numbers as elements of the base type in the hierarchy. FIG. 3 contains code that uses the code in FIG. 7 to overload some numeric SCHEME primitives.

Given the code in FIGS. 6, 7, and 12, a version of $\mathcal{D}$ that supports nesting can be implemented as:

```
(define (derivative f)
  (lambda (x)
    (let ((e (generate-epsilon)))
      (perturbation e (f (dual-number e x 1))))))
```

The above exposition demonstrates how to implement $\mathcal{D}$ as a referentially transparent defined function that allows nested invocation, in a purely functional style, through the use of a single non-referentially transparent mechanism: the side effect in GENERATE.

6-5 Alternate Mechanisms for Generating Epsilons

One can implement a $\mathcal{D}$ that allows nested invocation using only a single non-referentially-transparent mechanism to generate a new $\in$ for each invocation of $\mathcal{D}$. The implementation in FIG. 1 represents $\in$ values as integers and generates new ones using a non-referentially-transparent side-effect mechanism to increment a global counter.

Whenever a dual number with a non-zero perturbation of $\in$ cannot escape an invocation of $\mathcal{D}$ that generates $\in$, the number of live $\in$ values is bounded by the number of live invocations of $\mathcal{D}$. This is guaranteed to be the case when one refrains from using non-referentially-transparent language features, like side effects, dynamic scoping, locatives, generative types, eq?, fluid-let, call/cc, dynamic-wind, throw, catch, block, return-from, unwind-protect, etc., except to implement $\mathcal{D}$. In such cases, one can fold the generation of $\in$ values into $\mathcal{D}$ as follows:

```
(define derivative
  (let ((e 0))
    (lambda (f)
      (lambda (x)
        (set! e (+ e 1))
        (let ((result
               (perturbation e (f (dual-number e x 1)))))
          (set! e (- e 1))
          result)))))
```

Alternatively, one can replace one non-referentially-transparent mechanism, side effects, with another non-referentially-transparent mechanism, dynamic scoping via fluid-let, which mutates a variable for a constrained dynamic extent. This can generate distinct $\in$ values for distinct dynamically nested invocations of $\mathcal{D}$.

```
(define derivative
  (let ((e 0))
    (lambda (f)
      (lambda (x)
        (fluid-let ((e (+ e 1)))
          (perturbation e (f (dual-number e x 1))))))))
```

When, additionally, the implementation uses a stack for activation records and it can be guaranteed that activation records corresponding to nested invocations will be allocated at increasing addresses, one can alternatively use another non-referentially-transparent mechanism, locatives:

```
(define (derivative f)
  (lambda (x)
    (let ((e (variable-address->integer x)))
      (perturbation e (f (dual-number e x 1))))))
```

In this variation, the alpha renaming that is performed by a typical programming-language implementation as part of beta reduction distinguishes values generated by distinct invocations.

An alternative to representing dual numbers as explicit trees would be to represent their fringe as a (potentially sparse) association list indexed by path. For example, the nested dual-number tree $$((2+2\in_a)+(1+\in_a)\in_b)$$

can be multiplied out as $$2+2\in_a+\in_b+\in_a\in_b$$

which would be represented as the association list $$\{\{\} \mapsto 2, \{\varepsilon_a\} \mapsto 2, \{\varepsilon_b\} \mapsto 1, \{\varepsilon_a, \varepsilon_b\} \mapsto 1\}$$

This strategy eliminates the need for $\in$ values to be ordered by invocation depth, thus admitting an implementation where $\in$ values are unique but not ordered. An implementation of our API for dual numbers that uses such a representation is shown in FIG. 13. This implements $\mathcal{D}$ where $\in$ values are represented as fresh pairs allocated by cons, a referentially-transparent mechanism, in concert with eq?, a non-referentially-transparent mechanism, and is reminiscent of a (non-referentially-transparent) technique used in HASKELL called observable sharing.

Yet another alternative strategy for representing dual numbers is to represent the $\in$ values implicitly as types instead of explicitly as integers, using another non-referentially-transparent mechanism, generative structure types, such as those available in PLT SCHEME. An implementation of this strategy is given in FIG. 14.

As noted by Alex Shafarenko, the need to distinguish the different $\in$ values introduced by different invocations of $\mathcal{D}$ is similar, in some ways, to the need to distinguish different lambda-bound variables with the same name during beta reduction to avoid capturing free variables. The latter is accomplished via the alpha renaming that is performed by a typical programming-language implementation. However, as noted above, the $\in$ values are not represented as programming-language variables, since dual numbers are represented as data structures, not terms. Thus the typical mechanism of alpha-renaming does not suffice to implement a $\mathcal{D}$ that allows nested invocation.

Rewrite systems are often formulated in terms of rules that map source-term patterns to target-term patterns. Such term patterns may contain pattern variables that range over terms. If a pattern variable in the target pattern appears in the source pattern, it is bound, during rewrite, to the subterm matching the pattern variable in the source term. If a pattern variable in the target pattern does not appear in the source pattern, it is free. Some rewrite systems take free pattern variables to denote the generation of a fresh variable in the term language. This constitutes a form of alpha renaming. Unrestricted use of such a facility would not be referentially transparent. However, one can formulate a $\mathcal{D}$ that is referentially transparent and that allows nested invocation as a rewrite rule in such a rewrite system $$\mathcal{D} \, fc \overset{\wedge}{\rightarrow} \mathcal{E}\varepsilon(f(c+\varepsilon))$$

where f, c, and $\in$ are pattern variables.

A similar capability exists in PROLOG. Variables in the right-hand side of a clause that do not appear in the left-hand side generate logic variables. These are implemented in a distinct fashion from those that do appear in the left-hand side. Proper implementation requires both kinds of variables to be alpha renamed during resolution. Pure PROLOG, including logic variables and their requisite alpha renaming, is referentially transparent. However, implementing a $\mathcal{D}$ that uses logic variables to distinguish $\in$ values requires the use of a non-referentially transparent extra-logical primitive to prevent unification of such logic variables.

6-6 Eliminating Run-Time Generation of $\in$ Values

Implementing a $\mathcal{D}$ that allows nested invocation requires that each nested invocation of $\mathcal{D}$ have a new $\in$ value. This can be done dynamically using a single non-referentially-transparent mechanism. However static mechanisms can be used instead under special circumstances, namely when static analysis can determine sufficient information about the dynamic call graph involving $\mathcal{D}$ to allow static allocation of $\in$ values.

The static analyses and transformations can be manually simulated by a programmer. To do this, one must expose $\in$ as a parameter to $\mathcal{D}$ $$\mathcal{D}\varepsilon fc \overset{\Delta}{=} \mathcal{E}\varepsilon(f(c+\varepsilon))$$

and require the programmer to guarantee that each nested invocation of $\mathcal{D}$ is supplied with a distinct $\in$ and that these obey the $\prec$ invariant. In the general case, this requires that each function, such as MIN, that calls $\mathcal{D}$, directly or indirectly, also expose $\in$ as a parameter. This would be a serious violation of modularity and separation of concerns: in general, the caller of a higher-order function like MIN should be oblivious to whether or not that higher-order function uses $\mathcal{D}$ internally. Such a discipline would also make expressions involving the $\mathcal{D}$ operator extremely fragile.

6-7 Example

The ability to next invocation of $\mathcal{D}$ is useful in numerical simulation of physical systems, as is illustrated by the following example. Consider a charged particle traveling non-relativistically in a plane with position x(t), velocity x(t), initial position x(0)=(0,8), and initial velocity x(0)=(0.75.0). It is accelerated by an electric field formed by a pair of repulsive bodies, $$p(x;w) = \|x-(10,10-w)\|^{-1} + \|x-(10,0)\|^{-1}$$

where w is a modifiable control parameter of the system. The particle hits the x-axis at position $x(t_f)$. We use a textbook implementation of Newton's method to optimize w so as to minimize $E(w) = x_0(t_f)^2$, with the goal of finding a value for w that causes the particle's path to intersect the origin.

We use Naïve Euler ODE integration $$\ddot{x}(t) = -\nabla_x p(x)|_{x=x(t)}$$
$$\dot{x}(t+\Delta t) = \dot{x}(t) + \Delta t \, \ddot{x}(t)$$
$$x(t+\Delta t) = x(t) + \Delta t \, \dot{x}(t)$$

to compute the particle's path, taking $\Delta t = 10^{-1}$. We use linear interpolation to find the point where the particle hits the x-axis.

When $x_1(t + \Delta t) \le 0$ $$\text{let: } \Delta t_f = \frac{x_1(t+\Delta t) - x_1(t)}{\dot{x}_1(t)}$$
$$t_f = t + \Delta t_f$$
$$x(t_f) = x(t) + \Delta t_f \dot{x}(t)$$
Error: $E(w) = x_0(t_f)^2$ We use $\mathcal{D}$ to calculate $\nabla x \, p(x)$ and also to calculate the first and second derivatives of E with respect to w when minimizing E using Newton's method.

$$w^{(i+1)} = w^{(i)} - \frac{E'(w^{(i)})}{E''(w^{(i)})}$$

Note that computing E invokes $\mathcal{D}$ to compute $\nabla_x p(x)$ and thus computing E' and E'' involve nested invocation of $\mathcal{D}$. We start the minimization process at $w^{(j)} = 0$ and terminate the minimization when $|E'(w)^{(i)}| < 10^{-1}$. Code that implements this example is given in FIG. 15.

6-8 Discussion

It is quite natural to consider augmenting a functional-programming language with a derivative-taking operator like $\mathcal{D}$. Indeed, derivative-taking operators were used as a motivation for the lambda calculus.

We have explored issues that arise when implementing $\mathcal{D}$, a derivative-taking operator that uses forward-mode AD. Interestingly, we found no way to implement $\mathcal{D}$ in a pure lambda calculus, and a simple example seems to show that $\mathcal{D}$ cannot be formulated in Church's original untyped lambda calculus. Consider $\mathcal{D}(\lambda x, x \times (\mathcal{D}(\lambda y, \boxed{x}) c))c$ versus $\mathcal{D}(\lambda x, x \times (\mathcal{D}(\lambda y, \boxed{y}) c))c$. In the untyped lambda calculus, the boxed x and y must have the same value, since the only operation $\mathcal{D}$ can perform on the function it receives as its first argument is to call it with some argument. That being so, the inner calls to $\mathcal{D}$ in the two cases evaluate to the same value. But for the results to be correct (0 for the expression on the left, 1 for that on the right), the inner calls must evaluate to correct values, with the inner call on the left evaluating to 0 and that on the right evaluating to 1.

We were, however, able to implement $\mathcal{D}$, which is itself pure, using any one of a variety of impure mechanisms.

Techniques roughly similar to those in FIG. 4 were used to implement a nestable version of $\mathcal{D}$ in the undocumented internals of SCMUTILS, a software package accompanying a textbook on classical mechanics. On the other hand, previous implementations of forward-mode AD in pure HASKELL do not include mechanisms that would support implementation of a nestable $\mathcal{D}$. Indeed, we hypothesize that a nestable $\mathcal{D}$ cannot be formulated as a function definition in current pure dialects of HASKELL.

While all known techniques for implementing a nestable $\mathcal{D}$ use nonreferentially-transparent mechanisms, $\mathcal{D}$ itself is referentially transparent. This motivates inclusion of $\mathcal{D}$, or similar functionality, as a primitive feature of pure functional-programming languages whose intended uses include numeric computing.

7 Lazy Multivariate Higher-Order Forward-Mode AD

A method is presented for computing all higher-order partial derivatives of a multivariate Function $\mathbb{R}^{n} \to \mathbb{R}$. This method works by evaluating the function under a nonstandard interpretation, lifting reals to multivariate power series. Multivariate power series, with potentially an infinite number of terms with nonzero coefficients, are represented using a lazy data structure constructed out of linear terms. A complete implementation of this method in SCHEME is presented, along with a straightforward exposition, based on Taylor expansions, of the method's correctness.

7-1 Introduction

Forward-Mode Automatic Differentiation, or forward AD, is a method for adapting a program that computes a function to yield one that computes its derivatives. Karczmarczuk has presented an implementation of forward AD in HASKELL. This implementation had a novel characteristic: it adapted a program that computed a univariate function $f: \mathbb{R} \to \mathbb{R}$ to yield one that produced an infinite stream of higher-order derivatives $(f(x), f'(x), f''(x), \ldots)$. However, Karczmarczuk provided the details for his method only for univariate functions. Karczmarczuk hinted at a generalization to multivariate functions but did not provide the details. Here, we present the details of a novel generalization of Karczmarczuk's method to the multivariate case. In part, we use methods previously developed for implementing nestable first-order forward AD in a functional framework. A crucial additional insight here, both for developing the extension and for demonstrating its correctness, involves reformulating Karczmarczuk's method using Taylor expansions instead of the chain rule. This requires dealing with the requisite factorial factors.

7-2 Univariate First-Order Forward AD

The Taylor expansion of $f(c+\in)$ with respect to $\in$ is $$f(c+\varepsilon) = \sum_{i=0}^{\infty} \frac{1}{i!} \frac{d^i f(x)}{dx^i}\bigg|_{x=c} \varepsilon^i$$

This implies that one can compute the i-th derivative of a univariate function $f$ at a scalar point c by evaluating by evaluating $f(c+\in)$ under a nonstandard interpretation replacing real numbers with univariate power series in $\in$ extracting the coefficient of $\in^i$ in the result, and multiplying this by $i!$. Traditional forward AD truncates the Taylor expansions at $i>1$, thus computing a representation that contains only the first derivative.

Such truncated Taylor expansions are dual numbers. We denote a dual number p as $x+x'\in$, by analogy with the standard notation $a+bi$ for complex numbers. Just as arithmetic on complex numbers $a+bi$ can be defined by taking $i^2=-1$, arithmetic on dual numbers $x+x'\in$ can be defined by taking $\in^2=0$ but $\in \neq 0$. Furthermore, just as implementations of complex arithmetic typically represent complex numbers $a+bi$ as Argand pairs $<a,b>$, implementations of forward AD typically represent dual numbers $x+x'\in$ as tangent-bundle pairs $(x, x')$. Finally, just as implementations of complex arithmetic typically overload the arithmetic primitives to manipulate complex numbers, implementations of forward AD typically overload the arithmetic primitives to manipulate dual numbers.

We use $\mathcal{E} \in p$ to denote the coefficient of $\in$ in the dual number p $$\mathcal{E}\varepsilon(x + x'\varepsilon) \triangleq x' \qquad (1)$$

and $\mathcal{D}$ f c to denote the value of the first derivative of a univariate function $f$ at a scalar point c. Forward AD computes $\mathcal{D}$ f c by evaluating $f(c+\in)$ under a nonstandard interpretation replacing real numbers with dual numbers and extracting the coefficient of $\in$ in the result.

$$\mathcal{D} f c \triangleq \mathcal{E}\varepsilon(f(c + \varepsilon)) \qquad (2)$$

The $\in$s introduced by nested invocations of $\mathcal{D}$ must be distinct.

To see how this works, let us manually apply the mechanism to a simple example: computing the first derivative of $f(x)=x^4+2x^3$ at $x=3$. To do this, we first evaluate $f(3+\in)$.

$$f(3 + \varepsilon) = (3 + \varepsilon)^4 + 2(3 + \varepsilon)^3$$
$$= (81 + 108\varepsilon) + 2(27 + 27\varepsilon)$$
$$= 135 + 162\varepsilon$$

From this we can extract the derivative: $\in \in (135+162\in)=162$.

$$\frac{df(x)}{dx}\bigg|_{x=3} = 4x^3 + 6x^2 \big|_{x=3} = 162 = \mathcal{E}\,\varepsilon(f(3+\varepsilon))$$

Note that the above makes use of the restriction that $\in^2=0$ when evaluating $(3+\in)^3=27+27\in$ and $(3+\in)^4=81+108\in$, dropping the $\in^2, \in^3$, and $\in^4$ terms. this is the essence of traditional forward AD when limited to the case of univariate derivatives.

7-3 Univariate Higher-Order Forward AD

While the above nominally computes only first derivates, straightforward repeated application of $\mathcal{D}$ allows computation of higher-order derivatives. We use $\mathcal{D}$ f to denote partial application of $\mathcal{D}$, i.e., $\lambda c. (\mathcal{D}\ f\ c)$, and $\mathcal{D}^i$ f c to denote the value of the i-th derivative of a univariate function $f$ at a scalar point c.

$$\mathcal{D}^0 f \triangleq f \qquad (3)$$

$$\mathcal{D}^i f \triangleq \mathcal{D}^{i-1}(\mathcal{D} f) \text{ when } i > 0 \qquad (4)$$

We refer to the above method for computing higher-order derivatives as the repetition method.

Karczmarczuk has also presented an alternate method for computing higher-order univariate derivatives. His method can be viewed as computing non-truncated Taylor expansions, removing the restriction that $\in^2=0$, and generalizing dual numbers to univariate power series in $\in$. To accomplish this, we first extend the definition of $\in$ from (1) so that $\mathcal{E}\ \in^i$ p yields $i!$ times the coefficient of $\in^i$ in the power series p.

$$\mathcal{E}\varepsilon^0 p \triangleq \mathcal{R}\varepsilon p \qquad (5)$$

$$\mathcal{E}\varepsilon^i p \triangleq i \times \mathcal{E}\varepsilon^{i-1}(\mathcal{Q}\varepsilon p) \text{ when } i > 0 \qquad (6)$$

In the above and throughout this paper, $\mathcal{Q} \in p$ and $\mathcal{R} \in p$ destructure a power series: $p=(\mathcal{R} \in p)+(\mathcal{Q} \in p)\in$. Given the above, Karczmarczuk's method can be viewed as computing $\mathcal{D}^i$ f c by evaluating f $(c+\in)$ under a nonstandard interpretation replacing real numbers with univariate power series in $\in$, extracting the coefficient of $\in^i$ in the result, and multiplying this by $i!$.

$$\mathcal{D}^i f \varepsilon \triangleq \mathcal{E}\varepsilon^i(f(c+\varepsilon)) \qquad (7)$$

To see how this works, let us manually apply the mechanism to a simple example: computing all of the higher-order derivatives of $f(x=x^4 \ 2x^3$ at $x=3$. to do this, we first evaluate $f(3+\in)$.

$$f(3+\varepsilon) = (3+\varepsilon)^4 + 2(3+\varepsilon)^3$$
$$= (81 + 108\varepsilon + 54\varepsilon^2 + 12\varepsilon^3 + \varepsilon^4) +$$
$$2(27 + 27\varepsilon + 9\varepsilon^2 + \varepsilon^3)$$
$$= 135 + 162\varepsilon + 72\varepsilon^2 + 14\varepsilon^3 + \varepsilon^4$$

From this we can extract all of the higher-order derivatives.

$$f(x)\big|_{x=3} \ x^4 + 2x^3 \big|_{x=3} = 135 = 0! \times 135 = \mathcal{E}\varepsilon^0(f(3+\varepsilon))$$
$$\frac{df(x)}{dx}\bigg|_{x=3} = 4x^3 + 6x^2 \big|_{x=3} = 162 = 1! \times 162 = \mathcal{E}\varepsilon^1(f(3+\varepsilon))$$
$$\vdots$$
$$\frac{d^4 f(x)}{dx^4}\bigg|_{x=3} = 24 \big|_{x=3} \ 24 = 4! \times 1 = \mathcal{E}\varepsilon^4(f(3+\varepsilon))$$

7-4 Lazy Univariate Higher-Order Forward AD

The input to the nonstandard interpretation will always be a polynomial $c+\in$, an entity with a finite number of terms with nonzero coefficients. In the above example, the output of the nonstandard interpretation was also a polynomial. However, some functions, such as sin, yield a result entity with an infinite number of terms with nonzero coefficients, i.e., a power series, even when applied to an input polynomial. Karczmarczuk addressed this by representing univariate power series as lazy unidimensional streams. We refer to this as a tower method. Karczmarczuk presented the details of his tower method only for univariate functions. The remainder of this paper presents the details of a novel tower method that generalizes to the multivariate case.

7-5 Multivariate Higher-Order Forward AD

We use $\mathcal{D}^{(i_1,\ldots,i_n)} f(c_1, \ldots, c_n)$ to denote the value of $$\frac{\partial^{i_1+\ldots+i_n} f(x_1, \ldots, x_n)}{\partial x_1^{i_1} \ldots \partial x_n^{i_n}}\bigg|_{x_1=c_1,\ldots,x_n=c_n}$$

i.e., the value of a higher-order partial derivative of a multivariate function $f$ at a multidimensional point $(c_1, \ldots, c_n)$. One can generalize the repetition method to the multivariate case.

$$\mathcal{D}^{(0,\ldots,0)} f \triangleq f \quad (8)$$

$$\mathcal{D}^{(i_1,\ldots,i_n)} f \triangleq \quad (9)$$
$$\mathcal{D}^{(i_1,\ldots,i_{l-1},i_l-1,i_{l+1},\ldots,i_n)}$$
$$\lambda(c_1,\ldots,c_n) \cdot \mathcal{D}(\lambda u \cdot f(c_1,\ldots,c_{l-1},u,c_{l+1},\ldots,c_n))c_l$$
when $i_l > 0$ Again, each nested invocation of $\mathcal{D}$ must use a distinct $\in$.

One can formulate a multivariate tower method by generalizing univariate power series to multivariate power series. To accomplish this, we first note that the multivariate Taylor expansion of $f((c_1+\in_1), \ldots, (c_n+\in_n))$ with respect to ("1,...,"n) is $$\sum_{i_1=0}^{\infty} \cdots \sum_{i_n=0}^{\infty} \frac{1}{i_1! \cdots i_n!} \frac{\partial^{i_1+\ldots+i_n} f(x_1, \ldots, x_n)}{\partial x_1^{i_1} \cdots \partial x_n^{i_n}}\bigg|_{x_1=c_1,\ldots,x_n=c_n} \varepsilon_1^{i_1} \ldots \varepsilon_n^{i_n}$$

We therefore extend the definition of $\in$ from (5-6) to the multivariate case so that $\mathcal{E} \in_1{}^{i_1} \ldots \in_n{}^{i_n}$ in p yields $i_1! \ldots i_n!$ times the coefficient of $\in_1{}^{i_1} \ldots \in_n{}^{i_n}$ in n in the power series p.

$$\mathcal{E} \ 1 p \triangleq p \quad (10)$$

$$\mathcal{E} \varepsilon_1^{i_1} \ldots \varepsilon_n^{i_n} p \triangleq \mathcal{E} \ \varepsilon_2^{i_2} \ldots \varepsilon_n^{i_n} (\mathcal{E} \varepsilon_1^{i_1} p) \quad (11)$$

Given the above, one can compute $\mathcal{D}^{(i_1,\ldots,i_n)} f(c_1, \ldots c_n)$ by evaluating $f((c_1+\in_1), \ldots, (c_n+\in_n))$ under a nonstandard interpretation replacing real numbers with multivariate power series in distinct $\in_1, \ldots, \in_n$, extracting the coefficient of $\in_1{}^{i_1} \ldots \in_n{}^{i_n}$ in the result, and multiplying this by $i_1! \ldots i_n!$.

$$\mathcal{D}^{(i_1,\ldots,i_n)} f(c_1,\ldots,c_n) \triangleq \mathcal{E}\varepsilon_1^{i_1} \ldots \varepsilon_a^{i_a}(f((c_1+\varepsilon_1),\ldots,(c_a+\varepsilon_n))) \quad (12)$$

In the above, the $\in 1$ must be distinct from each other and from any other $\in$ used by nested invocations of any form of $\mathcal{D}$.

To see how this works, let us manually apply the mechanism to a simple example: computing all of the higher-order partial derivatives of $g(x,y)=x^3y+x^2y^2$ at $x=2$ and $y=3$. To do this, we first evaluate $g((2+\in_x), (3+\in_y))$.

$$g((2+\varepsilon_x), (3+\varepsilon_y)) = (2+\varepsilon_x)^3(3+\varepsilon_y) + (2+\varepsilon_x)^2(3+\varepsilon_y)^2$$
$$= (8 + 12\varepsilon_x + 6\varepsilon_x^2 + \varepsilon_x^3)(3+\varepsilon_y) +$$
$$(4 + 4\varepsilon_x + \varepsilon_x^2)(9 + 6\varepsilon_y + \varepsilon_y^2)$$
$$= (24 + 36\varepsilon_x + 8\varepsilon_y + 18\varepsilon_x^2 + 12\varepsilon_x\varepsilon_y +$$
$$3\varepsilon_x^3 + 6\varepsilon_x^2\varepsilon_y + \varepsilon_x^3\varepsilon_y) + (36 + 36\varepsilon_x +$$
$$24\varepsilon_y + 9\varepsilon_x^2 + 24\varepsilon_x\varepsilon_y + 4\varepsilon_y^2 + 6\varepsilon_x^2\varepsilon_y +$$
$$4\varepsilon_x\varepsilon_y^2 + \varepsilon_x^2\varepsilon_y^2)$$
$$= (60 + 72\varepsilon_x + 32\varepsilon_y + 27\varepsilon_x^2 + 36\varepsilon_x\varepsilon_y +$$
$$4\varepsilon_y^2 + 3\varepsilon_x^3 + 12\varepsilon_x^2\varepsilon_y + 4\varepsilon_x\varepsilon_y^2 +$$
$$\varepsilon_x^3\varepsilon_y + \varepsilon_x^2\varepsilon_y^2)$$

From this we can extract all of the higher-order partial derivatives.

$$g(x,y)\big|_{x=2,y=3} = x^3 y + x^2 y^2 \big|_{x=2,y=3} = 60 = 0! \times 0! \times 60$$
$$= \mathcal{E}\varepsilon_x^0\varepsilon_y^0(g((2+\varepsilon_x),(3+\varepsilon_y)))$$

$$\frac{\partial g(x,y)}{\partial x}\bigg|_{x=2,y=3} = 3x^2 y + 2xy^2 \big|_{x=2,y=3} = 72 = 1! \times 0! \times 72$$
$$= \mathcal{E}\varepsilon_x^1\varepsilon_y^0(g((2+\varepsilon_x),(3+\varepsilon_y)))$$

$$\vdots$$

$$\frac{\partial^4 g(x,y)}{\partial x^3 \partial y}\bigg|_{x=2,y=3} = 6\big|_{x=2,y=3} = 6 = 3! \times 1! \times 1$$
$$= \mathcal{E}\varepsilon_x^3\varepsilon_y^1(g((2+\varepsilon_x),(3+\varepsilon_y)))$$

-continued $$\left.\frac{\partial^4 g(x, y)}{\partial x^2 \partial y^2}\right|_{x=2, y=3} = 4|_{x=2, y=3} = 4 = 2! \times 2! \times 1$$

$$= \mathbf{E} \varepsilon_x^2 \varepsilon_y^2 (g((2 + \varepsilon_x), (3 + \varepsilon_y)))$$

Two difficulties arise when attempting to implement the above. First, there is the need to maintain the distinction between the different ∈s, addressed in previous work [6]. Second, there is a need to generalize lazy unidimensional streams to the multidimensional case to represent multivariate power series. We address this in the next section.

7-6 Lazy Multivariate Higher-Order Forward AD

A univariate polynomial $x_0 + x_1 \in + x_2 \in^2 + \ldots + x_{n-1} \in^{n-1} + x_n \in^n$ can be evaluated using Horner's method as $$x_0 + (x_1 + (x_2 + \ldots + (x_{n-1} + x_n \in) \in \ldots) \in) \in$$

This indicates that univariate polynomials can be represented as nested dual numbers. Multivariate polynomials can be represented as nested tagged dual numbers, i.e., triples of the form h ∈, x, x'), with potentially distinct ∈s, to represent x+x'∈. We assume that there is a total order ≺ over the ∈s and refer to such tagged dual numbers as linear terms. Power series can be represented as binary trees whose nodes are linear terms with a lazy x' slot. As illustrated in the code accompanying this paper, we constrain such representations to maintain the following invariants:

I-1 In any linear term x+x'∈, the x slot is either real, or a linear term over ∈' where ∈' ≺ ∈.

I-2 In any linear term x+x'∈, the x' slot is either real, a linear term over ∈' where ∈' ≺ ∈, or a linear term over ∈.

These ensure that the coefficient of each term in a multivariate series is stored in at most one leaf. They also simplify proofs of termination of the derivative-taking code and lower the time bound on access to a multivariate power series.

FIG. 1 contains a SCHEME implementation of an API for manipulating multivariate power series represented as lazy linear terms. Central to this API are mechanisms $\mathcal{Q} \in p$ and $\mathcal{R} \in p$ for computing the quotient and remainder when dividing the power series p by the variable ∈.

$$\mathcal{R} \, \varepsilon \, r \stackrel{\Delta}{=} r \text{ when } r \in \mathbb{R} \tag{13}$$

$$\mathcal{R} \, \varepsilon \, (x + x'\varepsilon') \stackrel{\Delta}{=} x + x'\varepsilon' \text{ when } \varepsilon' \prec \varepsilon \tag{14}$$

$$\mathcal{R} \, \varepsilon \, (x + x'\varepsilon) \stackrel{\Delta}{=} x \tag{15}$$

$$\mathcal{R} \, \varepsilon \, (x + x'\varepsilon') \stackrel{\Delta}{=} (\mathcal{R} \, \varepsilon \, x) + (\mathcal{R} \, \varepsilon \, x')\varepsilon' \text{ when } \varepsilon \neq \varepsilon' \tag{16}$$

$$\mathcal{Q}\varepsilon \, r \stackrel{\Delta}{=} 0 \text{ when } r \in \mathbb{R} \tag{17}$$

$$\mathcal{Q}\varepsilon \, (x + x'\varepsilon') \stackrel{\Delta}{=} 0 \text{ when } \varepsilon' \prec \varepsilon \tag{18}$$

$$\mathcal{Q}\varepsilon \, (x + x'\varepsilon) \stackrel{\Delta}{=} x' \tag{19}$$

$$\mathcal{Q}\varepsilon \, (x + x'\varepsilon') \stackrel{\Delta}{=} (\mathcal{Q}\varepsilon \, x) + (\mathcal{Q}\varepsilon \, x')\varepsilon' \text{ when } \varepsilon \neq \varepsilon' \tag{20}$$

Cases (14) and (18) and the simplifications in cases (15) and (19) are valid because of the invariants. Note that, unlike an analogous earlier API, the above correctly handles linear terms x+x'∈ where x' may itself be a linear term in the same ∈. Also note that, because of laziness, unlike that earlier API, there is no easy way to implement the simplification rule x+0∈ ⇝ x.

To perform the nonstandard interpretation, we need to extend the numeric primitives to apply to power series. For simplicity, we do this only for univariate and bivariate primitives. We can assume that the power series arguments to such primitives take the form of a linear term x+x'∈. The extension of a univariate primitive f applied to a linear term x+x'∈" can be derived via a univariate Taylor expansion about x in terms of x'∈.

$$f(x + x'\varepsilon) = \sum_{i=0}^{\infty} \frac{f^{(i)}(x)}{i!}(x'\varepsilon)^i \tag{21}$$

$$= f(x) + \sum_{i=1}^{\infty} \frac{f^{(i)}(x)x'^i}{i!}\varepsilon^i$$

$$= f(x) + \left(\sum_{i=1}^{\infty} \frac{f^{(i)}(x)x'^{i-1}}{i!}\varepsilon^{i-1}\right)x'\varepsilon$$

$$= f(x) + \left(\sum_{i=0}^{\infty} \frac{f^{(i+1)}(x)x'^i}{(i+1)!}\right)x'\varepsilon$$

In the above, $f^{(i)}$ denotes the i-th derivative of f. Note that $$f'(x + x'\varepsilon) = \sum_{i=0}^{\infty} \frac{f^{(i+1)}(x)x'^i}{i!}\varepsilon^i \tag{22}$$

Also note that the right hand side of (22) is similar to the coefficient of x'∈ in (21), differing only in that the derivatives in the power series are divided by (i+1)! instead of i!. The coefficient of x'∈ in (21) can be derived from the right hand side of (22) by postulating an operator $C_\in 0$ to adjust the coefficients.

$$\sum_{i=0}^{\infty} \frac{f^{(i+1)}(x)x'^i}{(i+1)!}\varepsilon^i = C_\varepsilon 0 \sum_{i=0}^{\infty} \frac{f^{(i+1)}(x)x'^i}{i!}\varepsilon^i \tag{23}$$

(As a formal power series operator, $$C_\varepsilon \alpha f(\varepsilon) = \frac{1}{\varepsilon} \int_0^\varepsilon f(\varepsilon) d\varepsilon.)$$

This operator can be defined as follows:

$$C_{\varepsilon^s} r \stackrel{\Delta}{=} \frac{r}{i+1} \text{ when } r \in \mathbb{R} \tag{24}$$

$$C_{\varepsilon^s}(x + x'\varepsilon) \stackrel{\Delta}{=} (C_{\varepsilon^s} x) + (C_{\varepsilon^{s+1}} x')\varepsilon \tag{25}$$

$$C_{\varepsilon^s}(x + x'\varepsilon') \stackrel{\Delta}{=} (C_{\varepsilon^s} x) + (C_{\varepsilon^s} x')\varepsilon' \text{ when } \varepsilon \neq \varepsilon' \tag{26}$$

Note that x' in (23) can contain ∈. This is a problem because $C_{\in i}$ operates by counting instances of ∈, and has no way to distinguish the ∈s in x' that should not be counted. We solve this by renaming ∈ to a fresh ∈' prior to calling $C_{\in i}$ and renaming ∈' back to ∈ in the result. For the cases that arise in this paper, such renaming can be accomplished with the following:

$$p[\varepsilon \mapsto \varepsilon] \stackrel{\Delta}{=} p \qquad (27)$$

$$r[\varepsilon_1 \mapsto \varepsilon_2] \stackrel{\Delta}{=} r \text{ when } r \in \mathbb{R} \qquad (28)$$

$$(x + x'\varepsilon')[\varepsilon_1 \mapsto \varepsilon_2] \stackrel{\Delta}{=} x + x'\varepsilon' \text{ when } \varepsilon' \prec \varepsilon_1 \qquad (29)$$

$$(x + x'\varepsilon_1)[\varepsilon_1 \mapsto \varepsilon_2] \stackrel{\Delta}{=} (\mathcal{R}\varepsilon_2 \ x) + ((\mathcal{Q}\varepsilon_2 \ x) + x'[\varepsilon_1 \mapsto \varepsilon_2])\varepsilon_2 \qquad (30)$$

This yields the following method for extending univariate primitives $$f(x + x'\varepsilon) \stackrel{\Delta}{=} (fx) + ((\mathcal{C}_{\varepsilon_0}(f'(x + x'\varepsilon)[\varepsilon \mapsto \varepsilon']))[\varepsilon' \mapsto \varepsilon] \times x')\varepsilon \qquad (31)$$

This requires supplying f′, the first derivative of each univariate primitive f.

Bivariate primitives can be extended when the first argument is a linear term over $\in$ and the second argument is either a real or a linear term over $\in'$ where $\in' \prec \in$ by performing a univariate Taylor expansion around the first argument.

$$f((x + x'\varepsilon), y) \stackrel{\Delta}{=}$$
$$(f(x, y)) + ((\mathcal{C}_{\varepsilon_0}(f_1((x + x'\varepsilon)[\varepsilon \mapsto \varepsilon'], y)))[\varepsilon' \mapsto \varepsilon] \times x')\varepsilon \qquad (32)$$

Analogously, bivariate primitives can be extended when the second argument is a linear term over " and the first argument is either a real or a linear term over $\in'$ where $\in' \prec \in$ by performing a univariate Taylor expansion around the second argument.

$$f(x, (y + y'\varepsilon)) \stackrel{\Delta}{=}$$
$$(f(x, y)) + ((\mathcal{C}_{\varepsilon_0}(f_2(x, (y + y'\varepsilon)[\varepsilon \mapsto \varepsilon'])))[\varepsilon' \mapsto \varepsilon] \times y')\varepsilon \qquad (33)$$

This requires supplying $f_1$ and $f_2$, the partial first derivatives of each bivariate primitive f with respect to its first and second arguments respectively.

To handle the case when both arguments are linear terms over the same $\in$ we rename the $\in$ in one argument to a fresh $\in'$, reducing this case to either (32) or (33), and then rename $\in'$ back to $\in$ in the result.

$$f((x + x'\varepsilon), (y + y'\varepsilon)) \stackrel{\Delta}{=} (f((x + x'\varepsilon), (y + y'\varepsilon)[\varepsilon \mapsto \varepsilon']))[\varepsilon' \mapsto \varepsilon] \qquad (34)$$

These techniques are implemented in FIG. 16 and used to overload some SCHEME primitives in FIG. 17. FIG. 18 completes the implementation. Note that the computational efficiency of this implementation relies on the fact that standard SCHEME memorizes the results of forcing promises.

7-7 Discussion

Forward AD is typically formulated using very different machinery than that used above. The univariate first-order case is usually formulated as a transformation of a program whose program points compute values f(x) of the program input x to one whose program points compute values (f(x), f′(x)). Since the program is a composition of primitives, the program transformation, as well as the transformation of the primitives, are formulated as applications of the chain rule. Karczmarczuk formulated the univariate higher order case as a similar transformation to a program whose program points compute stream values (f(x), f′(x), f″(x), . . . ) via the chain rule, though he did not present a derivation of the transformations of the primitives.

The streams we have used are instead of the form $(f(x)/0!, f'(x)/1!, f''(x)/2!, \ldots, f^{(b)}(x)/1!, \ldots )$ These Taylor series streams simplify some bookkeeping, in particular allowing the use of Taylor expansions instead of the chain rule in the derivations. This makes the multivariate higher-order case more straightforward to derive and justify. However, since each representation can be converted to the other (using operators that are similar to C) we do not consider this a fundamental difference.

Karczmarczuk hinted at a formulation of the multivariate higher-order case using the chain rule, where lazy unidimensional streams are replaced with lazy trees, but did not present a derivation or justification of the method's correctness. That method redundantly represents identical cross derivatives, i.e., $\partial^2 f/\partial x_i \partial x_j = \partial^2 f/\partial x_j \partial x_i$. Our method avoids that inefficiency. Moreover, although nesting is not our topic, the code presented does allow the derivative-taking constructs to nest correctly.

Laziness is particularly useful when representing and manipulating power series, in contexts beyond those considered here. For instance it can be used to define a power series with a recurrence relation. Such power series arise naturally in related contexts, such as differential equations that cannot be solved in closed form. Formulating nestable multivariate higher-order forward AD in terms of lazy power-series representations can allow forward AD to inter-operate with such other applications of power series.

8 Sample Implementation of VLAD

A sample implementation of VLAD appears below. VLAD incorporates a concrete syntax for an untyped lambda calculus with an eager evaluation semantics (sometimes called "core SCHEME") along with first-class forward-mode and reverse-mode AD operators, called *J and J* respectively in the language, along with the basis set required to support these operators, and a standard numeric basis.

VLAD Interpreter

Code for an interpreter for VLAD, written with correctness and clarity in mind. This is a working interpreter, and can be used to run programs written in VLAD that make free use of the *J and J* operators, including both nested use of these operators, and application of these operators to any value in the language including even to themselves.

VLAD Optimizing Compiler

An optimizing compiler for VLAD. The compiles the same source language as the VLAD interpreter, but is a proof-of-concept research compiler, and does not handle the full generality of the VLAD language. It does however use extremely aggressive optimization techniques, including polyvariant flow analysis and other methods, to generate (for VLAD programs which it is able to compile) extremely fast object code. This is a demonstration in principle that the techniques we describe in the claims are able to achieve extreme speedups compared to previously available techniques. A document included in the application describes the methods used, and the speedups achieved, in further detail. Said document includes a table of benchmarks against other systems with speedups ranging from 10-1000×.

MAP-CLOSURE Implementation

Code for a complete implementation incorporating a general-purpose dynamic nestable nonstandard interpretation construct called MAP-CLOSURE. This construct has many applications beyond AD, and this implementation supports such applications. Implementations of a restricted version, used only for Automatic Differentiation, are incorporated in the VLAD interpreter and compiler.

9 Hardware

All of the software execution, compiling, interpretation, and other activities described in this disclosure are implemented on computing devices. For example, FIG. 19 shows a system 100 with a computer 105 and storage 110 connected to a data network (not shown). Computer 105 in this embodiment includes processor 120, memory 125, network interface 130, input interface 135, and output interface 140 as will be understood by those skilled in the art. Power, ground, clock, sensors, and other signals and circuitry are omitted for clarity, but will be understood and easily implemented by those skilled in the art.

Network interface 130 in this embodiment connects computer 105 to network 115 for communication of data between server 105 and other devices attached to the data network. Input interface 135 manages communication between processor 120 and one or more push-buttons, UARTs, IR and/or RF receivers or transceivers, decoders, or other devices, as well as traditional keyboard and mouse devices. Output interface 140 provides a video signal to display 145, and may provide signals to one or more additional output devices such as LEDs, LCDs, or audio output devices, or a combination of these and other output devices and techniques as will occur to those skilled in the art.

Processor 120 in some embodiments is a microcontroller or general purpose microprocessor that reads its program from memory 125. Processor 120 may be comprised of one or more components configured as a single unit. Alternatively, when of a multi-component form, processor 120 may have one or more components located remotely relative to the others. One or more components of processor 120 may be of the electronic variety including digital circuitry, analog circuitry, or both. In one embodiment, processor 120 is of a conventional, integrated circuit microprocessor arrangement, such as one or more PENTIUM 4 or XEON processors from INTEL Corporation of 2200 Mission College Boulevard, Santa Clara, Calif. 95052, USA, or ATHLON XP or OPTERON processors from Advanced Micro Devices, One AMD Place, Sunnyvale, Calif. 94088, USA. In alternative embodiments, one or more application-specific integrated circuits (ASICs), general-purpose microprocessors, programmable logic arrays, or other devices may be used alone or in combination as will occur to those skilled in the art.

Likewise, memory 125 in various embodiments includes one or more types such as solid-state electronic memory, magnetic memory, or optical memory, just to name a few. By way of non-limiting example, memory 125 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge media; or a combination of these memory types. Also, memory 125 is volatile, nonvolatile, or a hybrid combination of volatile and nonvolatile varieties.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A computing system, comprising a processor; and a memory in communication with the processor, the memory comprising instructions executable with the processor, the instructions comprising:
a first programmatic function written in a formal language; and
an automatic differentiation (AD) application programmer Interface (API) configured to accept the first programmatic function as an input argument and to return a second programmatic function as an output object based on a source-to-source transformation of the first programmatic function,
wherein the second programmatic function is configured to calculate the derivative of the first programmatic function when executed,
wherein the AD API is implemented by reflection, and
wherein the first programmatic function, the AD API, and the second programmatic function returned by the AD API are invokable by a program at run-time.

2. The computing system of claim 1, wherein the AD API is configured to generate the second programmatic function based on a source-to-source transformation of the first programmatic function when the first programmatic function includes closures.

3. The computing system of claim 2, wherein the AD API is implemented by run-time reflection in which the reflection performs a recursive traversal of program data structures included in the first programmatic function in order to transform all accessible nested code and data.

4. The computing system of claim 1, wherein the AD API is configured to generate the second programmatic function based on a source-to-source transformation of the first programmatic function when the first programmatic function includes lambda calculus expressions.

5. The computing system of claim 3 wherein the AD API includes a forward AD basis comprising:
a forward zero function that retains the shape of an input of the forward zero function, converting any real-number component of that input to the real number zero, wherein the set of valid inputs includes opaque objects;
a primal function that (a) returns the primal portion of a given primal-tangent pair, (b) returns the corresponding primal basis function when given a forward transformed basis function as input, and (c) applies the inverse of the forward transform when given a closure as input;
a tangent function that returns the tangent portion of a given primal-tangent pair;
a bundle function that (a) returns a pair of a given primal and tangent; (b) returns the corresponding forward transformed basis function when given a primal basis function as input, and (c) applies the forward transform when given a closure as input; and
a j*function that bundles an input of the j*function with the result of the forward zero function applied to the input of the j*function.

6. The computing system of claim 4 wherein the AD API includes a reverse AD basis comprising:
a reverse zero function that retains the shape of an input of the reverse zero function, converting any real-number component of that input to the real number zero;

a plus function that takes two input arguments of the same shape and produces an output result of the same shape as the input arguments wherein real number components of the output are derived by summing the corresponding real number components of the input arguments, wherein the set of valid inputs includes opaque objects;

a *j function that (a) returns the corresponding reverse transformed basis function when given a primal basis function as input and (b) applies the reverse transform when given a closure as input; and a *j-inverse function that (a) returns the corresponding primal basis function when given a reverse transformed basis function as input and (b) applies the inverse of the reverse transform when given a closure as input.

7. The computing system of claim 1, wherein the AD API is implemented by run-time reflection.

8. The computing system of claim 7, wherein the reflection used by the AD API is accomplished by a program language construct that takes a function and an input closure as input arguments, wherein the input closure includes a body and an environment, and produces an output result closure comprising:
　a body that is the same as the body of the input closure, and
　an environment that is derived from the environment of the input closure by a processing of values in the environment of the input closure by the input function.

9. The computing system of claim 7, wherein the run-time reflection is migrated to compile time by the use of abstract interpretation.

10. The computing system of claim 9, wherein the abstract interpretation is used to eliminate at least one of non-numeric computations associated with performing numeric computation in the formal language, wherein the formal language in which the first programmatic function is written incorporates aggregate data structures,
　non-numeric computations associated with performing numeric computation in a higher-order functional or dynamic language, and
　non-numeric computations associated with AD.

11. The computing system of claim 7, wherein the run-time reflection is implemented by run-time compilation.

12. The computing system of claim 1, wherein the AD API comprises a reverse-mode transformation that, when given a first "primal" function value as input, returns a function value that, when invoked, returns both
　the value returned when said primal function is invoked, and
　a "backpropagator" function value, closed over intermediate values calculated during invocation of the primal function,
　wherein the backpropagator function value, when invoked with a sensitivity of the output of the primal function, returns both a sensitivity of the input to the primal function and a representation of the sensitivities of any involved relevant free variables over which the primal function was closed; and
　wherein the backpropagator function value is constructed by augmenting the primal function by associating a partial backpropagator with each value computed during the primal computation, and these partial backpropagators are combined to form the final backpropagator.

13. The computing system of claim 1, wherein the AD API is generalized to operate on any program that is valid under the formal language in which the first programmatic function is written.

14. The computing system of claim 13, wherein the AD API includes at least one of
　a function that accepts a higher-order function as an argument, and
　a function that returns a higher-order function.

15. The computing system of claim 1, wherein the AD API is optimized by applying general-purpose optimizing compiler techniques.

16. The computing system of claim 1, wherein a formal system comprises the formal language in which the first programmatic function is written, and the formal system uses a monad construct to include mutable variables and update-in-place components of aggregate data objects.

17. A computing system, comprising a processor and a memory in communication with the processor, the memory storing programming instructions executable by the processor to:
　accept a first programmatic function as an input parameter to an automatic differentiation (AD) application programmer Interface (API), the first programmatic function written in a formal language; and
　automatically process the first programmatic function to yield, via the AD API, an output result comprising a second programmatic function that is configured to calculate a derivative of the first programmatic function, wherein the first programmatic function includes at least one forward-mode automatic differentiation (AD) construct that determines a derivative of a third programmatic function and that generates a lazy stream of higher-order derivatives of the third programmatic function.

18. A computing system, comprising a processor; and a memory in communication with the processor, the memory comprising instructions executable with the processor, the instructions comprising:
　a first programmatic function; and
　an automatic differentiation (AD) application programmer Interface (API) configured to generate a second programmatic function from the first programmatic function, wherein the second programmatic function is executable to calculate the derivative of the first function, wherein the first programmatic function is written in a formal language that includes an intrinsic operation for which a corresponding operation is defined that performs a forward-mode and/or a backward-mode AD transform of the intrinsic operation; and
　wherein the AD API correctly applies the corresponding operation in the second programmatic function
　when the first programmatic function comprises an invocation of the AD API in which the AD API is passed a third function that includes the intrinsic operation, or
　when the second programmatic function generated by the AD API calculates a higher-order derivative of the first programmatic function and the first programmatic function includes the intrinsic operation.

19. The computing system of claim 18, wherein the corresponding operation is a numeric fixed point construct.

20. A computing system, comprising a processor and a memory, the memory in communication with the processor, the memory comprising:
　an automatic differentiation (AD) application programmer Interface (API) having an AD construct that, when executed by the processor, generates a derivative programmatic function from a programmatic function passed as an input argument of the AD construct, the programmatic function written in a formal language, wherein the derivative programmatic function calculates a derivative of the programmatic function that is passed as the input argument of the AD construct, the AD construct, when passed a first programmatic function as the input argument of the AD construct, generates a second programmatic function that calculates a derivative of the first programmatic function even when:

the first programmatic function passed to the AD construct includes a cascaded use of the AD construct, with or without intermediate operations on a value resulting from use of the AD construct in the first programmatic function; or code included in the first programmatic function invokes the AD construct.

21. The computing system of claim 20, wherein the AD construct includes a forward AD basis comprising:

a forward zero function that retains the shape of an input of the forward zero function, converting any real-number component of that input to the real number zero, wherein the set of valid inputs contains opaque objects;

a primal function that (a) returns the primal portion of a given primal-tangent pair, (b) returns the corresponding primal basis function when given a forward transformed basis function as input, and (c) applies the inverse of the forward transform when given a closure as input;

a tangent function that returns the tangent portion of a given primal-tangent pair;

a bundle function that (a) returns a pair of a given primal and tangent; (b) returns the corresponding forward transformed basis function when given a primal basis function as input, and (c) applies the forward transform when given a closure as input; and a j*function that bundles an input argument of the j*function with the result of forward zero function applied to that argument.

22. The computing system of claim 20, wherein the AD construct includes a reverse AD basis comprising:

a reverse zero function that retains the shape of an input argument of the reverse zero function, converting any real-number component of that input to the real number zero;

a plus function that takes two input arguments of the same shape and produces an output result of the same shape as the input arguments wherein real number components of the output are derived by summing the corresponding real number components of the input arguments, wherein the set of valid inputs includes opaque objects;

a *j function that (a) returns the corresponding reverse transformed basis function when given a primal basis function as input and (b) applies the reverse transform when given a closure as input; and a *j-inverse function that (a) returns the corresponding primal basis function when given a reverse transformed basis function as input and (b) applies the inverse of the reverse transform when given a closure as input.

23. The computing system of claim 20, wherein the AD construct is optimized through application of general-purpose optimizing compiler techniques.

24. The computing system of claim 20, wherein the first programmatic function uses a monad construct to include mutable variables and update-in-place components of aggregate data objects.

* * * * *